H. D. COLMAN.
WINDER.
APPLICATION FILED JUNE 28, 1913.

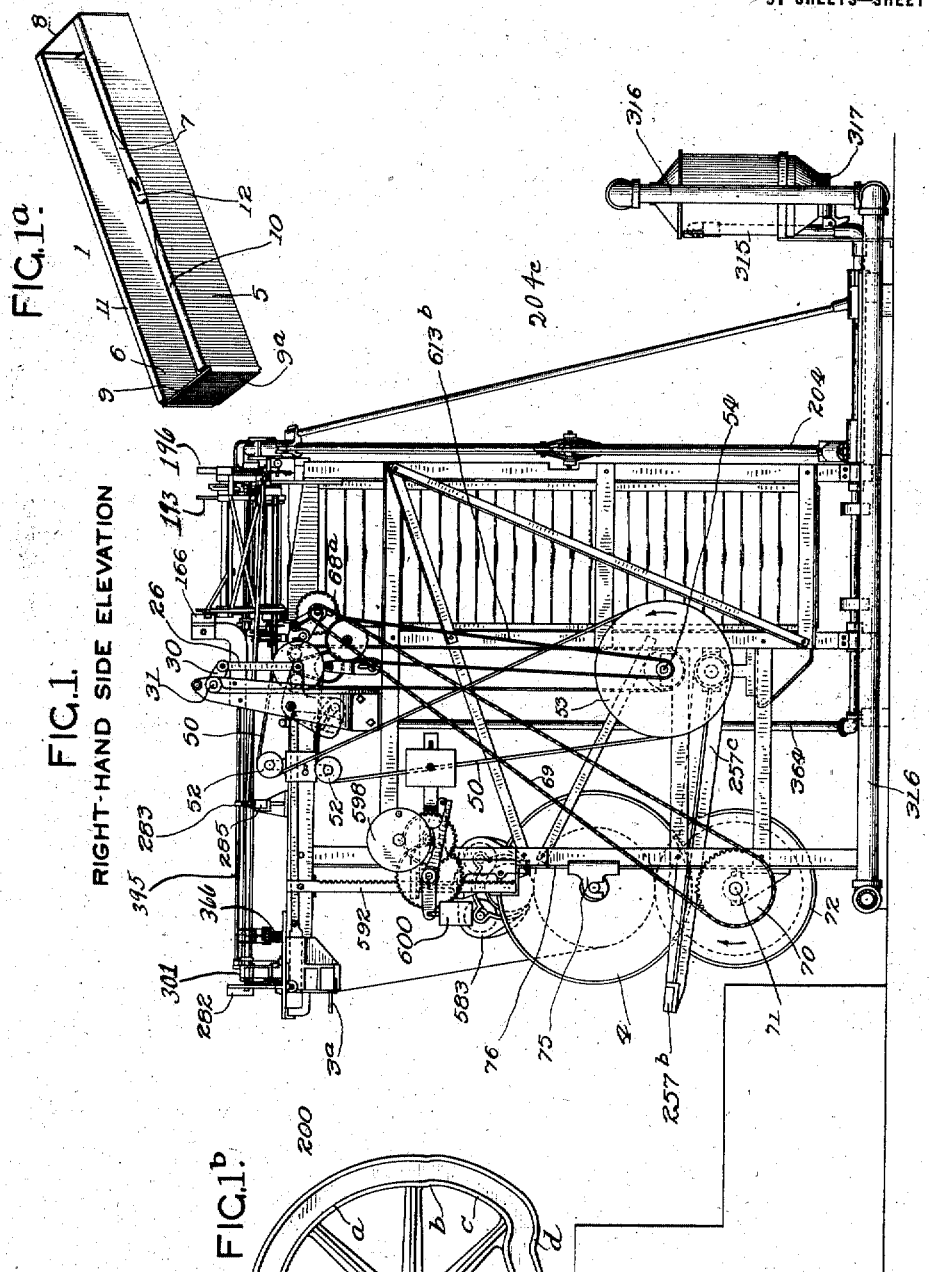
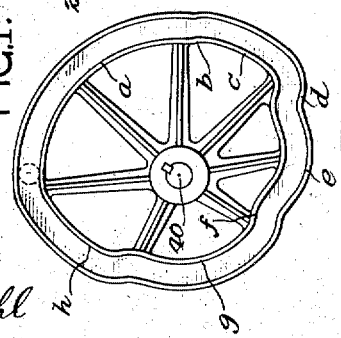

1,239,670.

Patented Sept. 11, 1917
57 SHEETS—SHEET 2.

FIG. 2.
FRONT VIEW

FIG. 2a.

Witnesses:
J. C. Devick.
George L. Chindahl

Inventor:
Howard D. Colman
By Luther L. Miller
Atty.

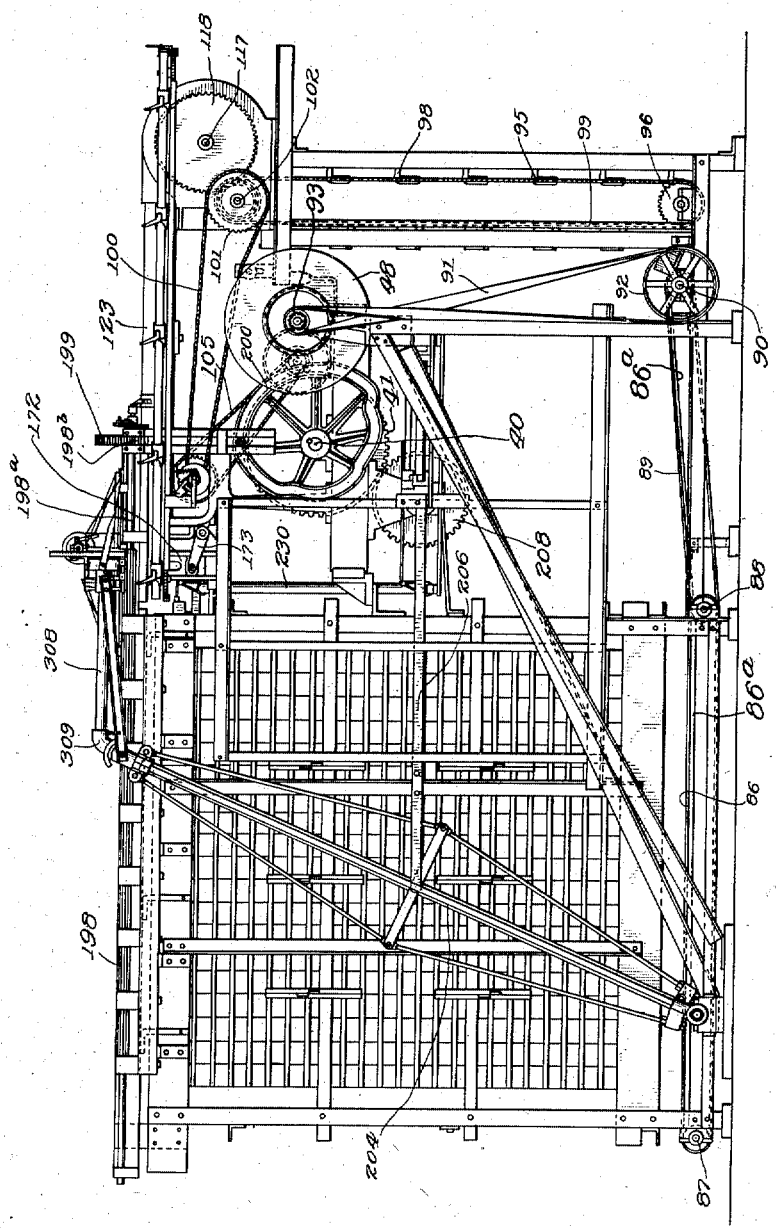

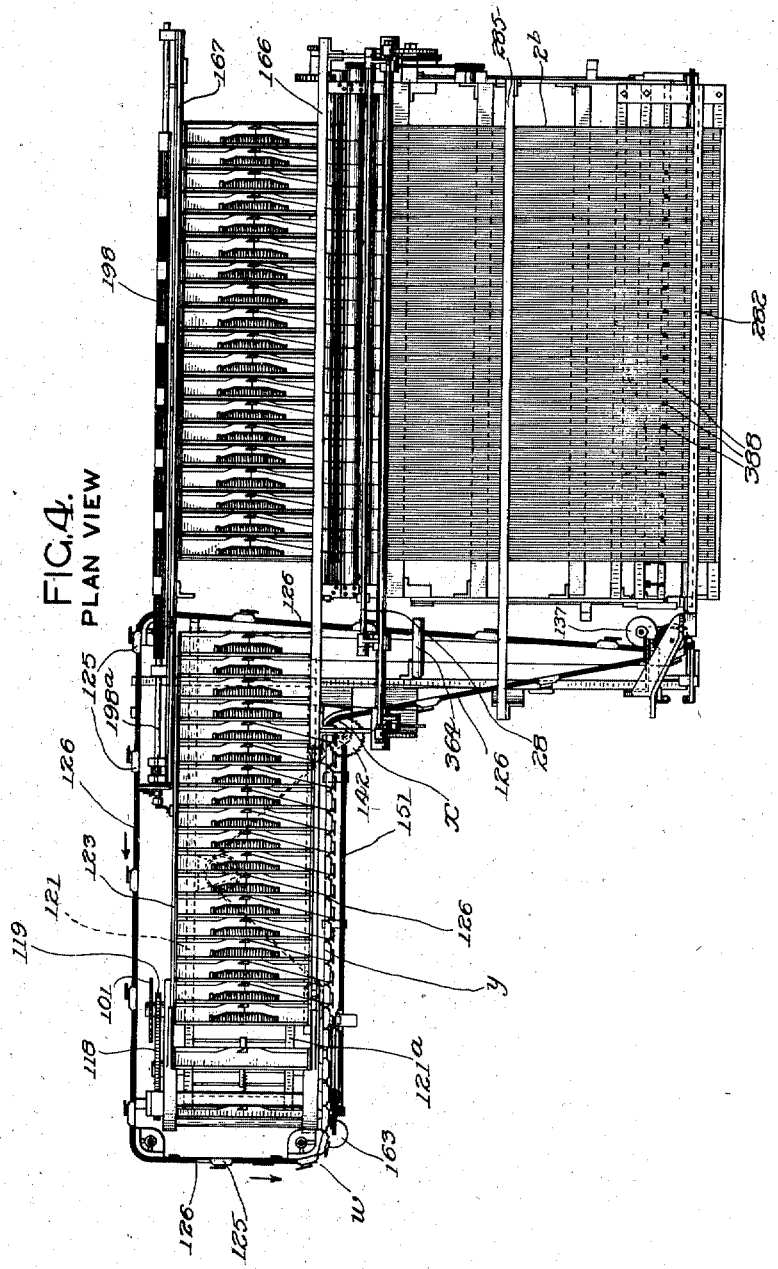

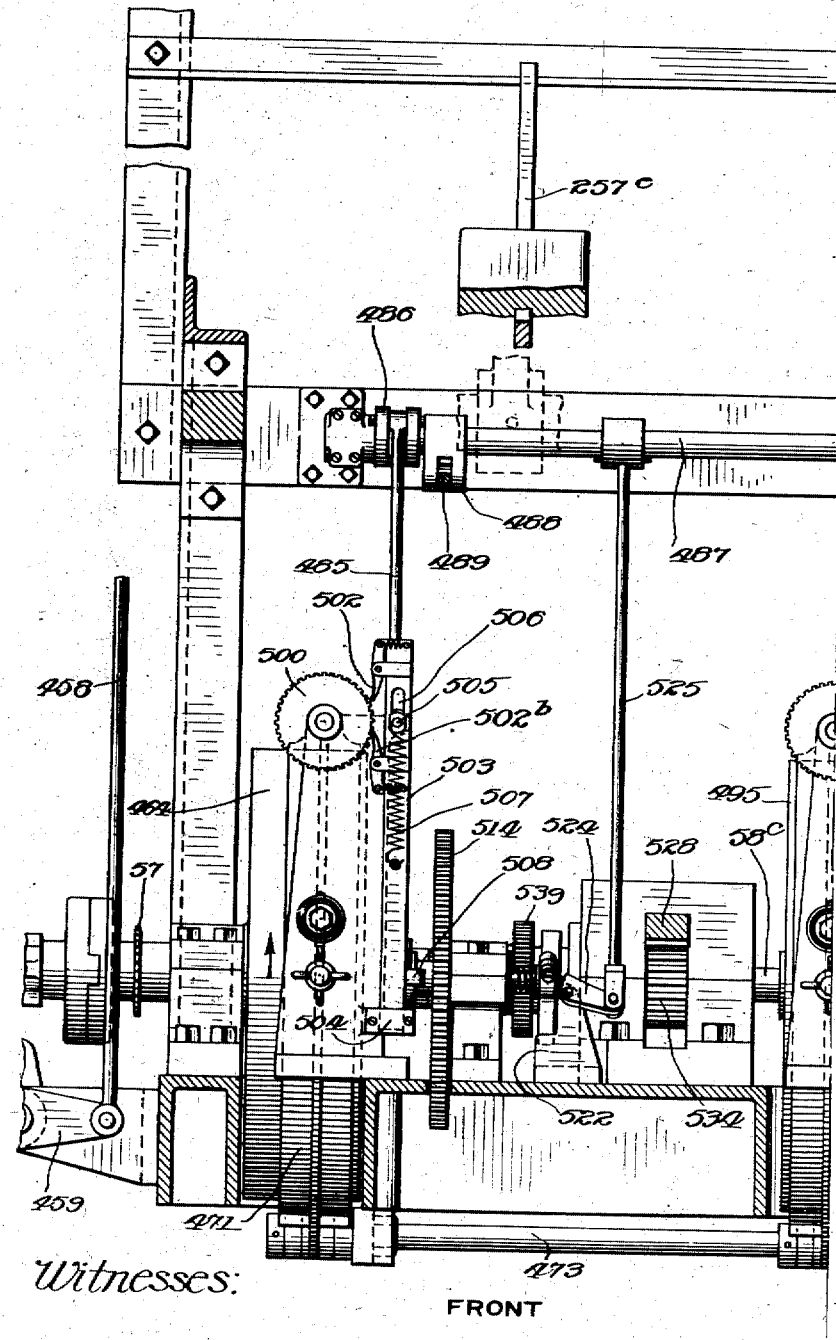

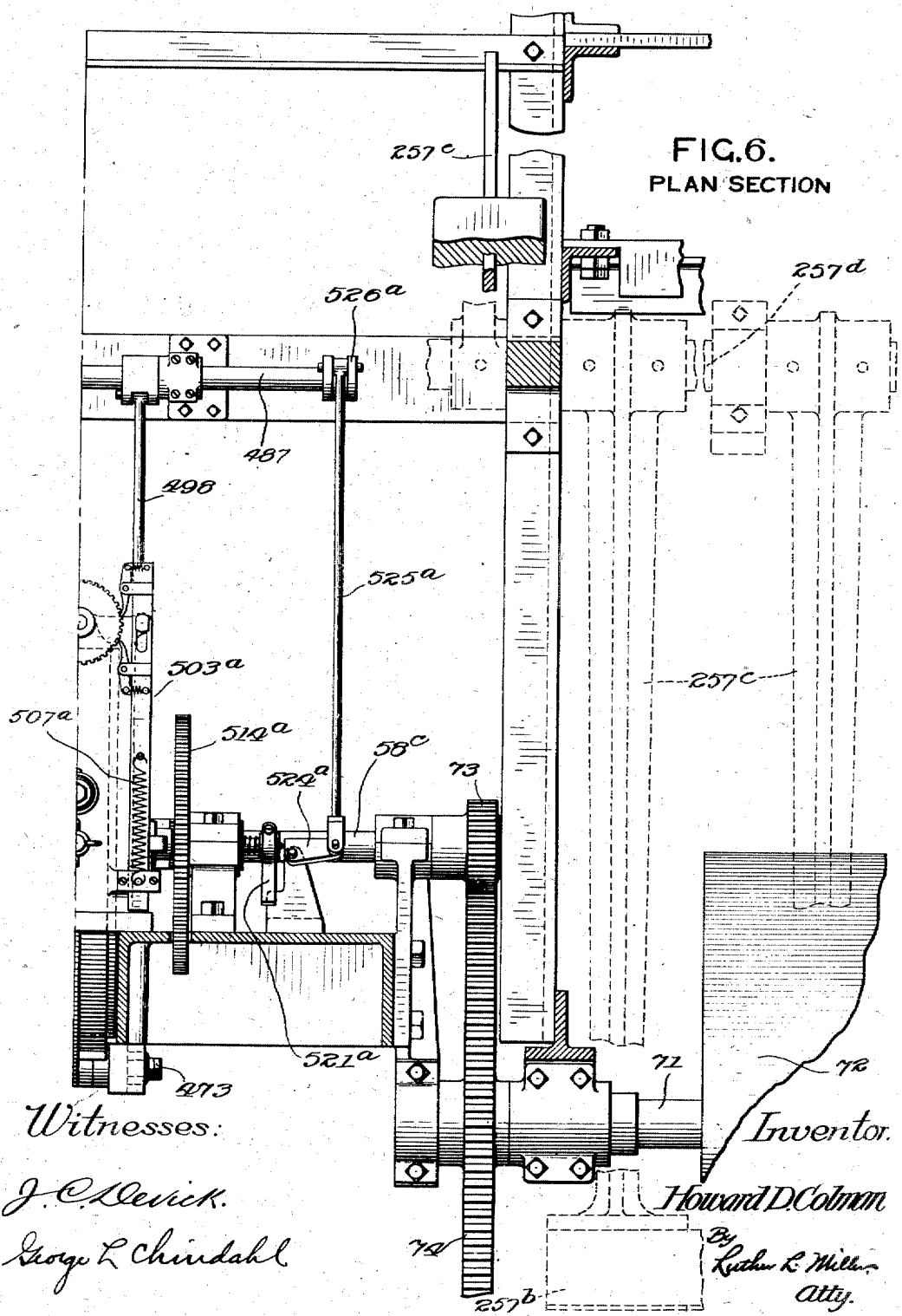

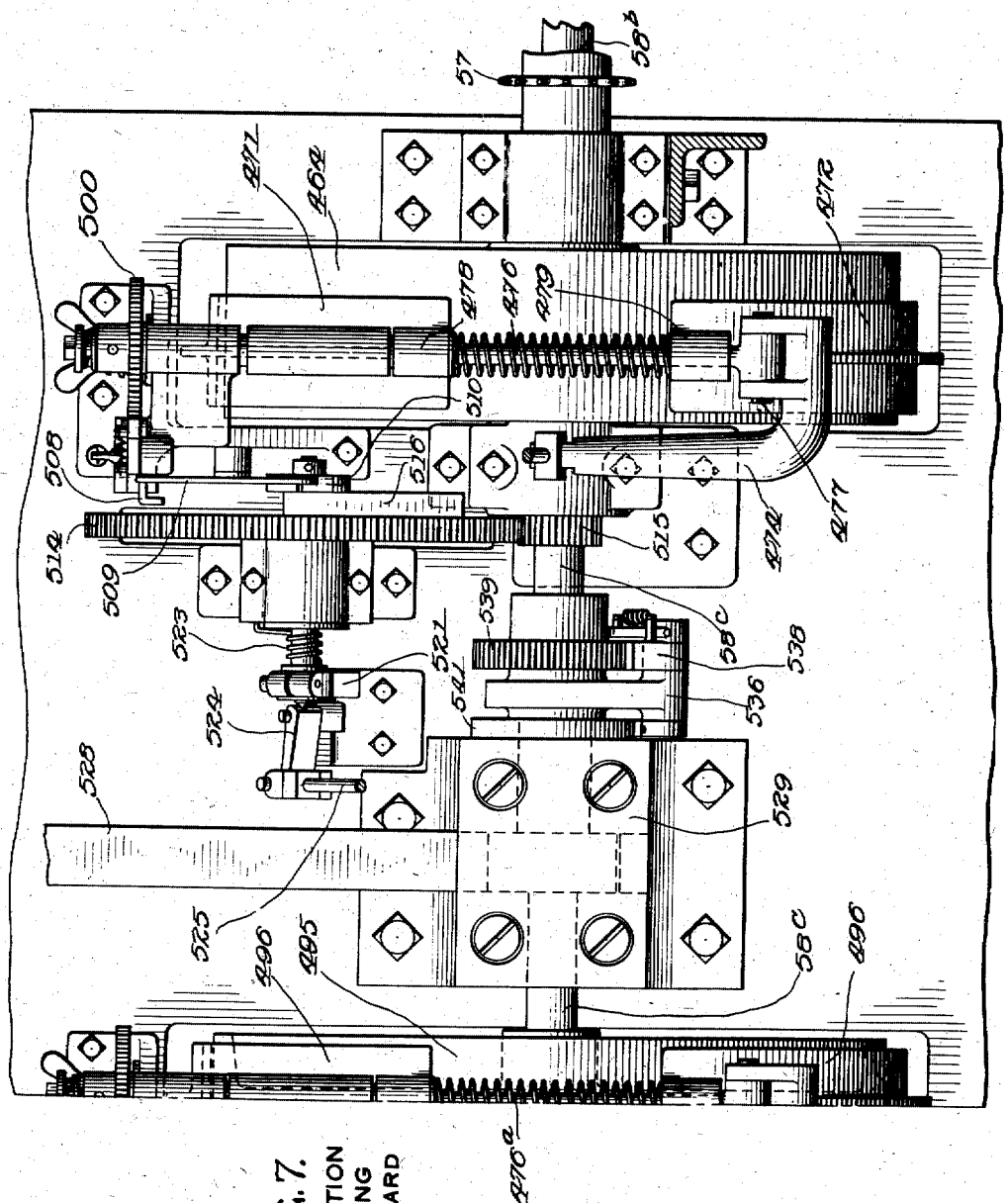

H. D. COLMAN.
WINDER.
APPLICATION FILED JUNE 28, 1913.
1,239,670.
Patented Sept. 11, 1917.
57 SHEETS—SHEET 8.
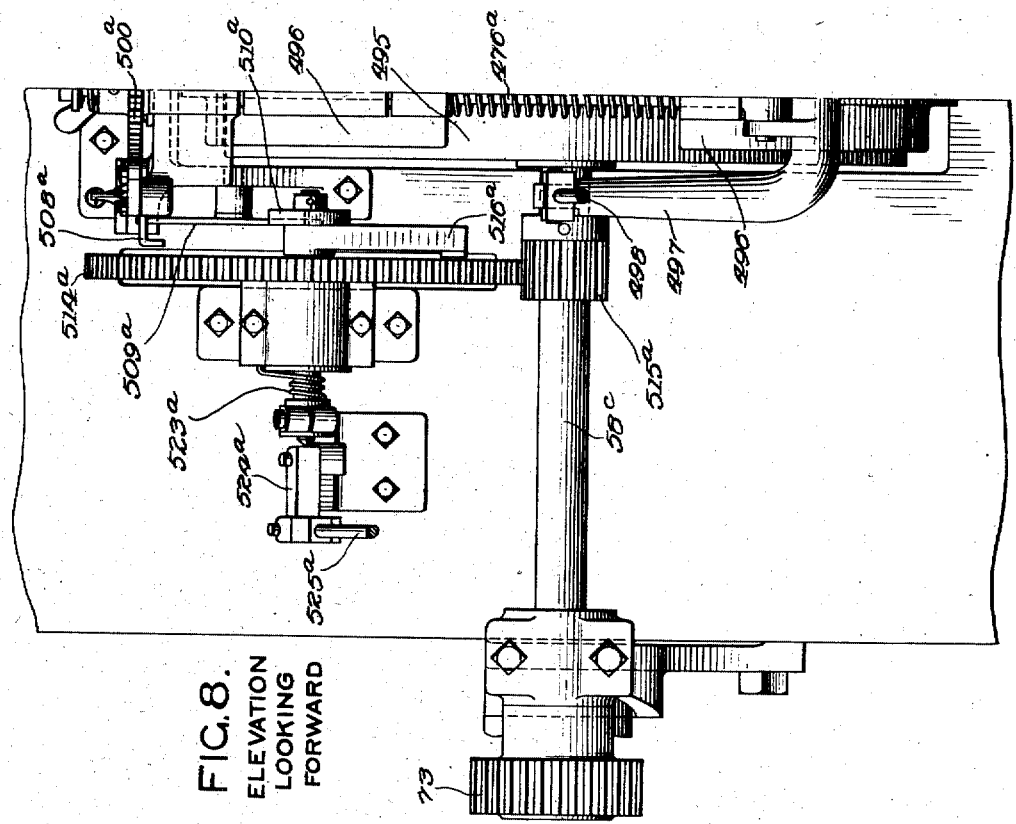
FIG. 8.
ELEVATION LOOKING FORWARD
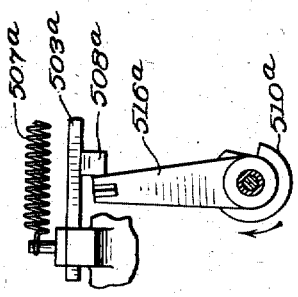
FIG. 10.
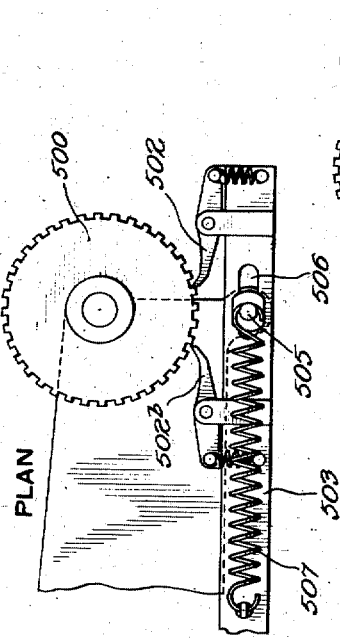
FIG. 9.
PLAN
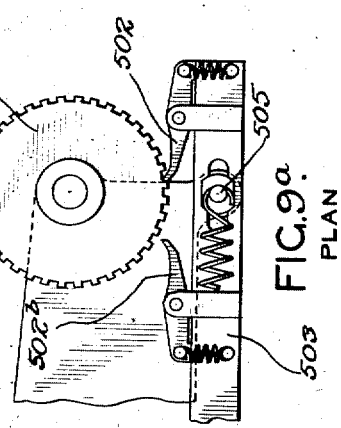
FIG. 9ª.
PLAN
Witnesses:
J. C. Devick.
Geo. L. Chindahl
Inventor:
Howard D. Colman
By Luther L. Miller
Atty.

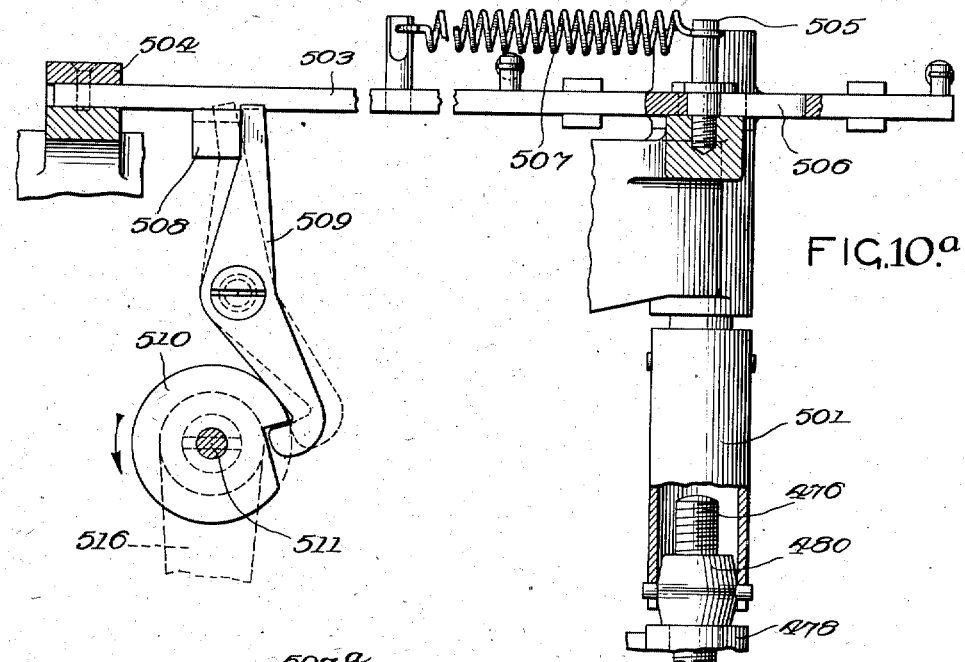
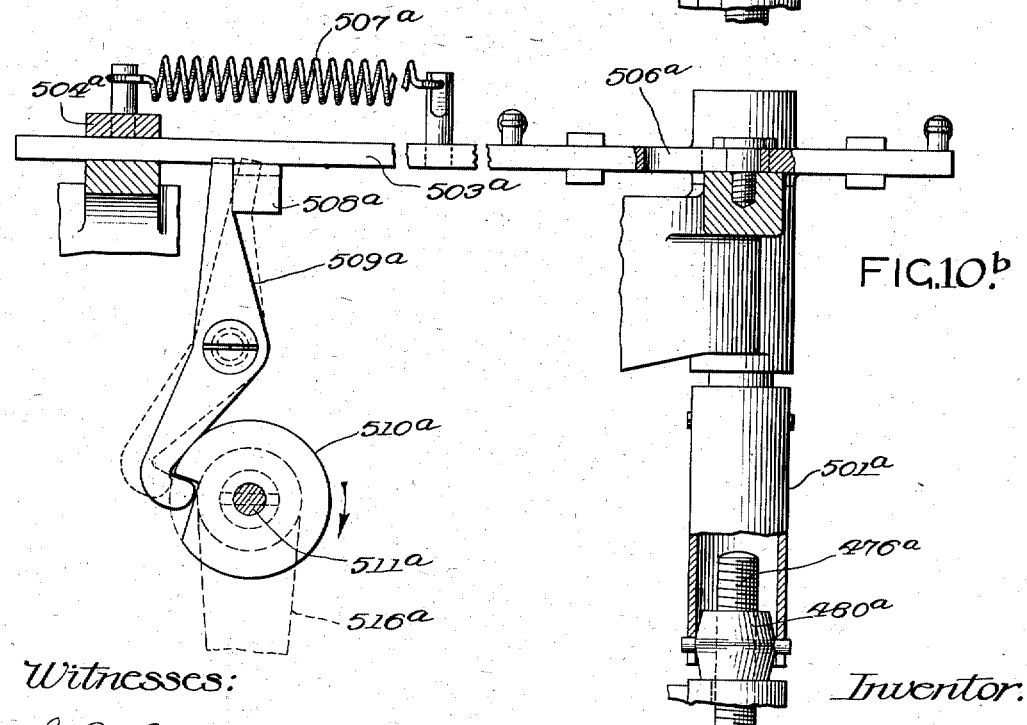

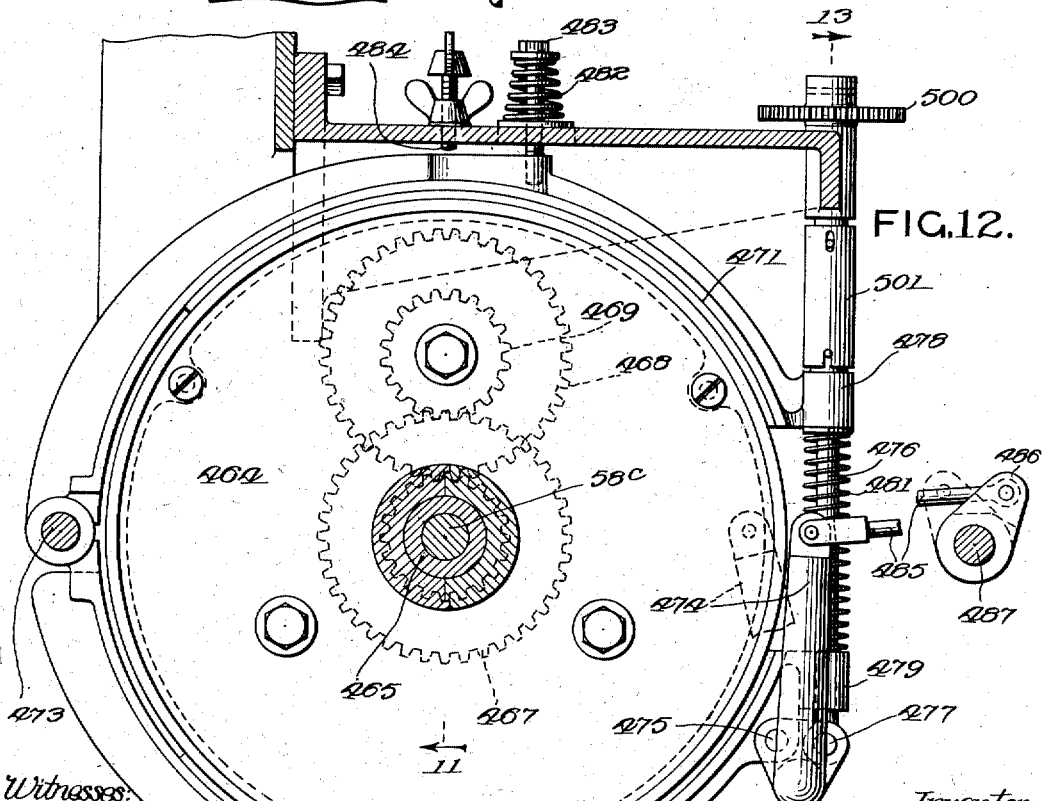

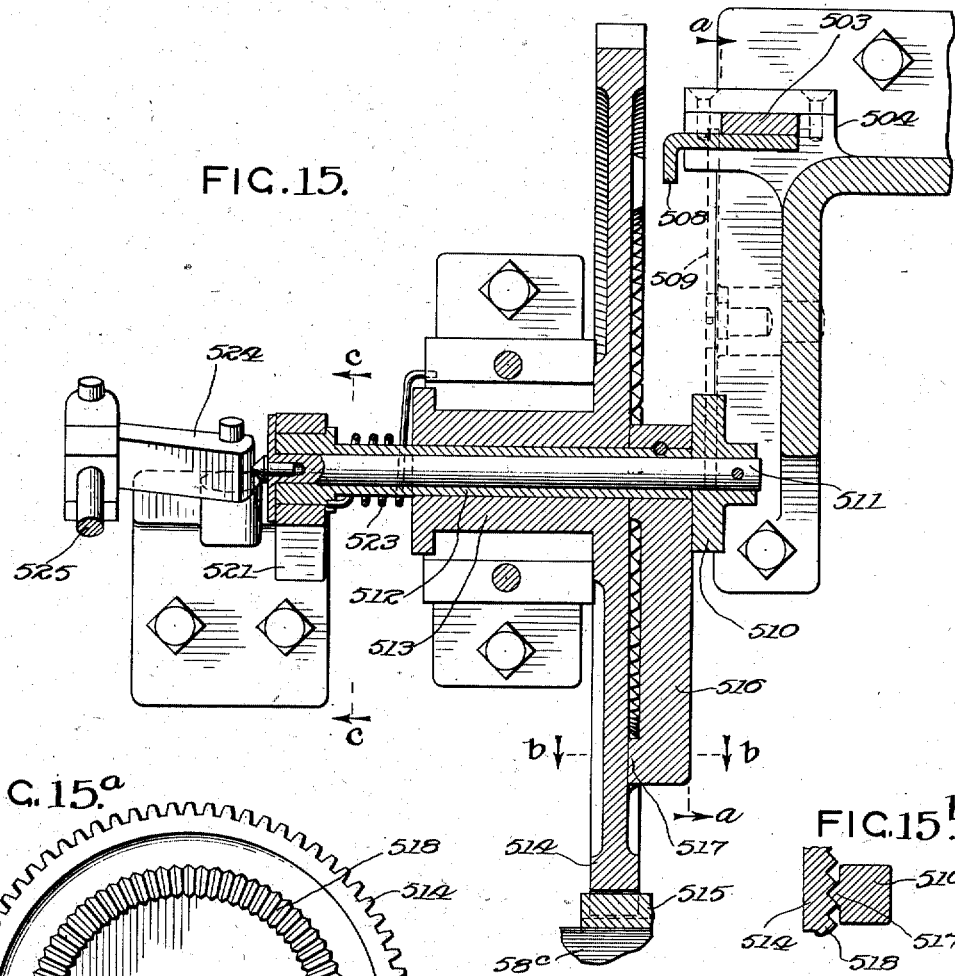
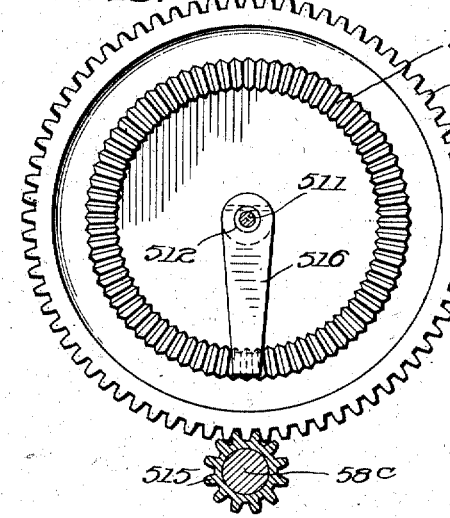
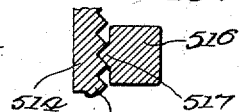
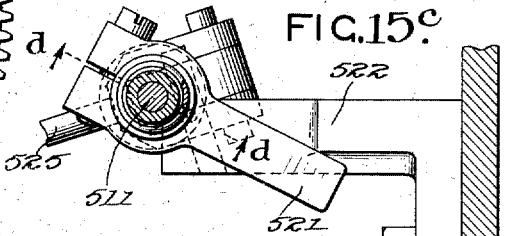
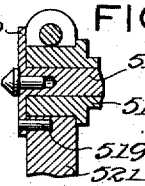

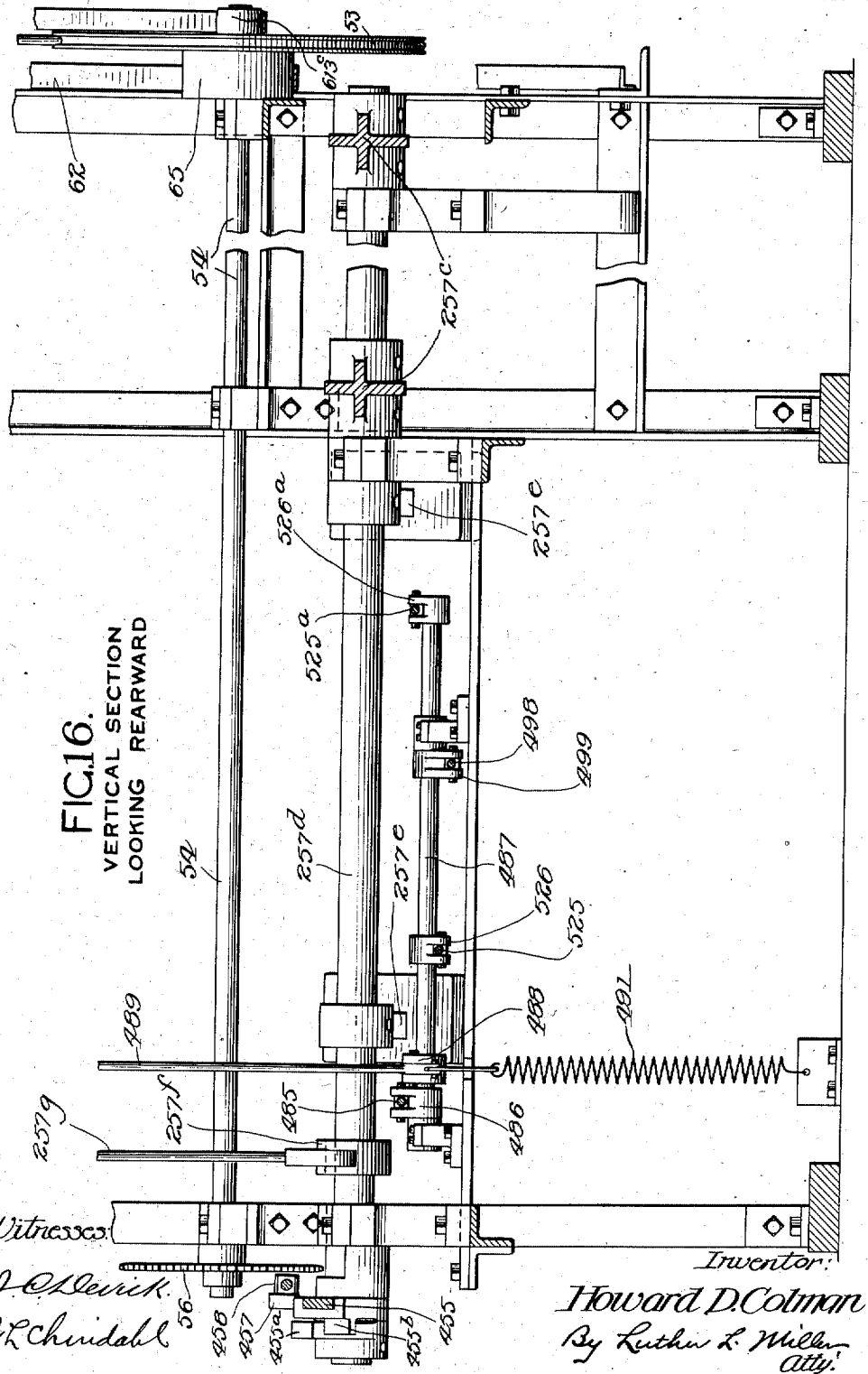

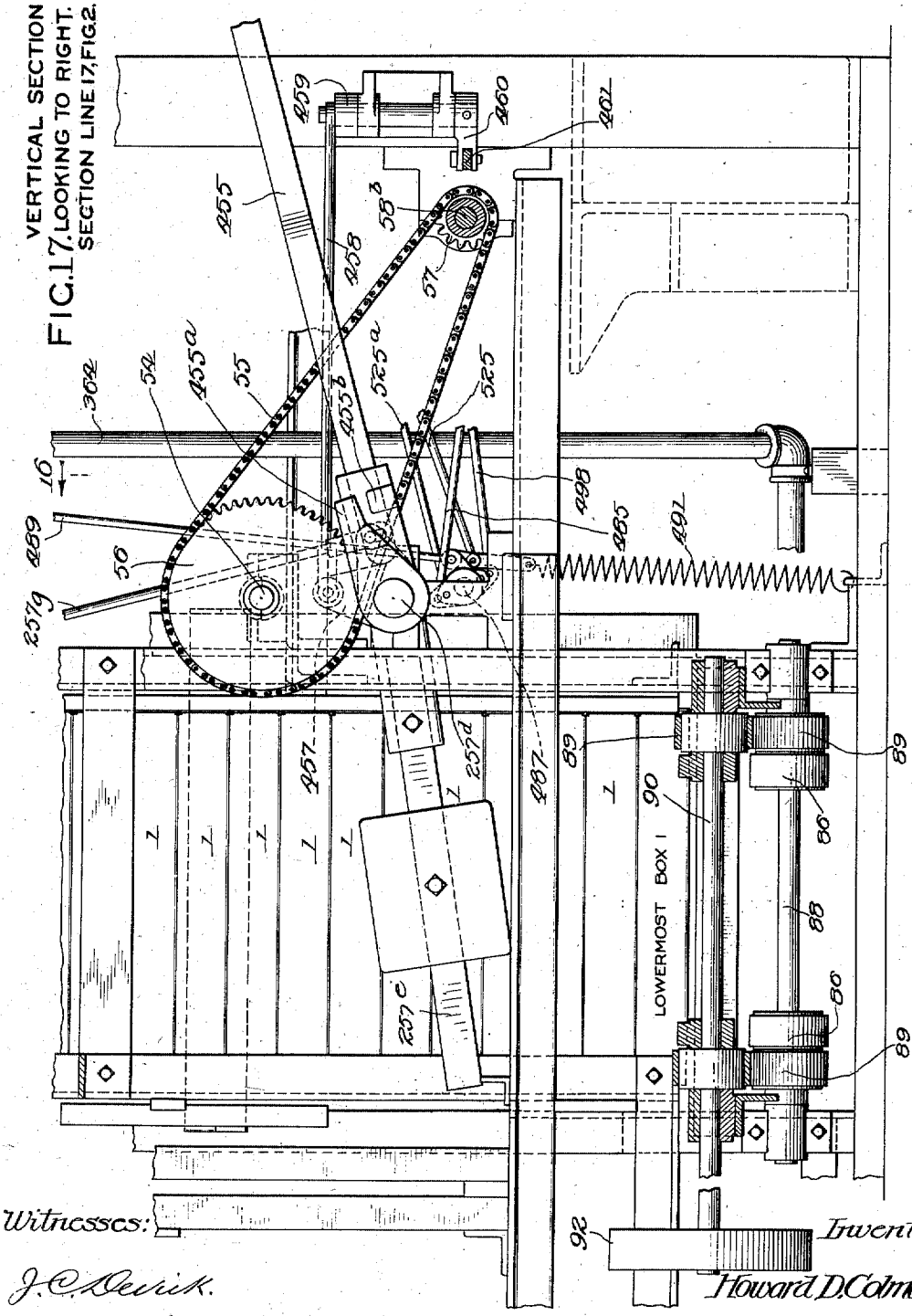

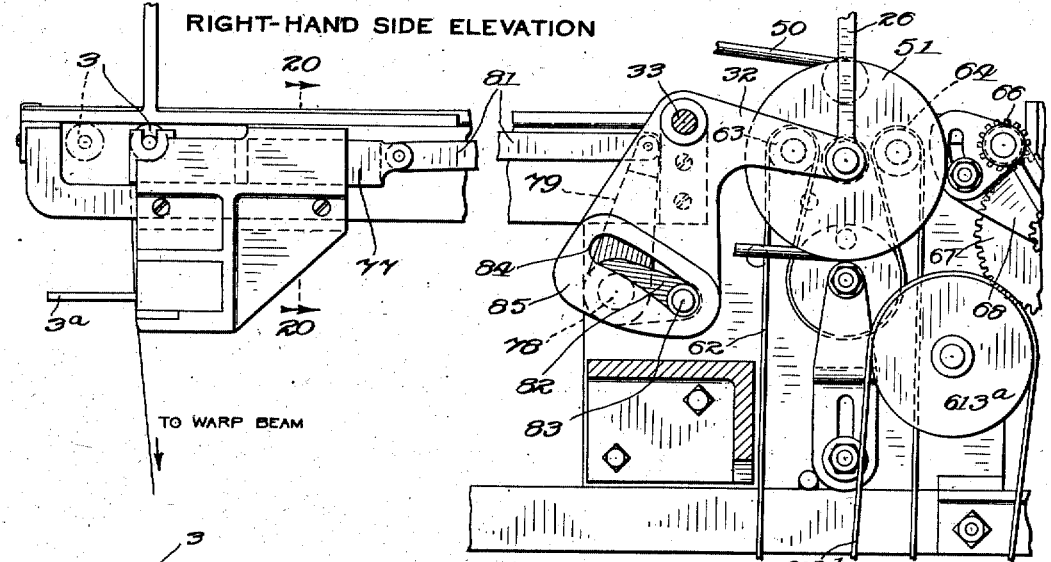

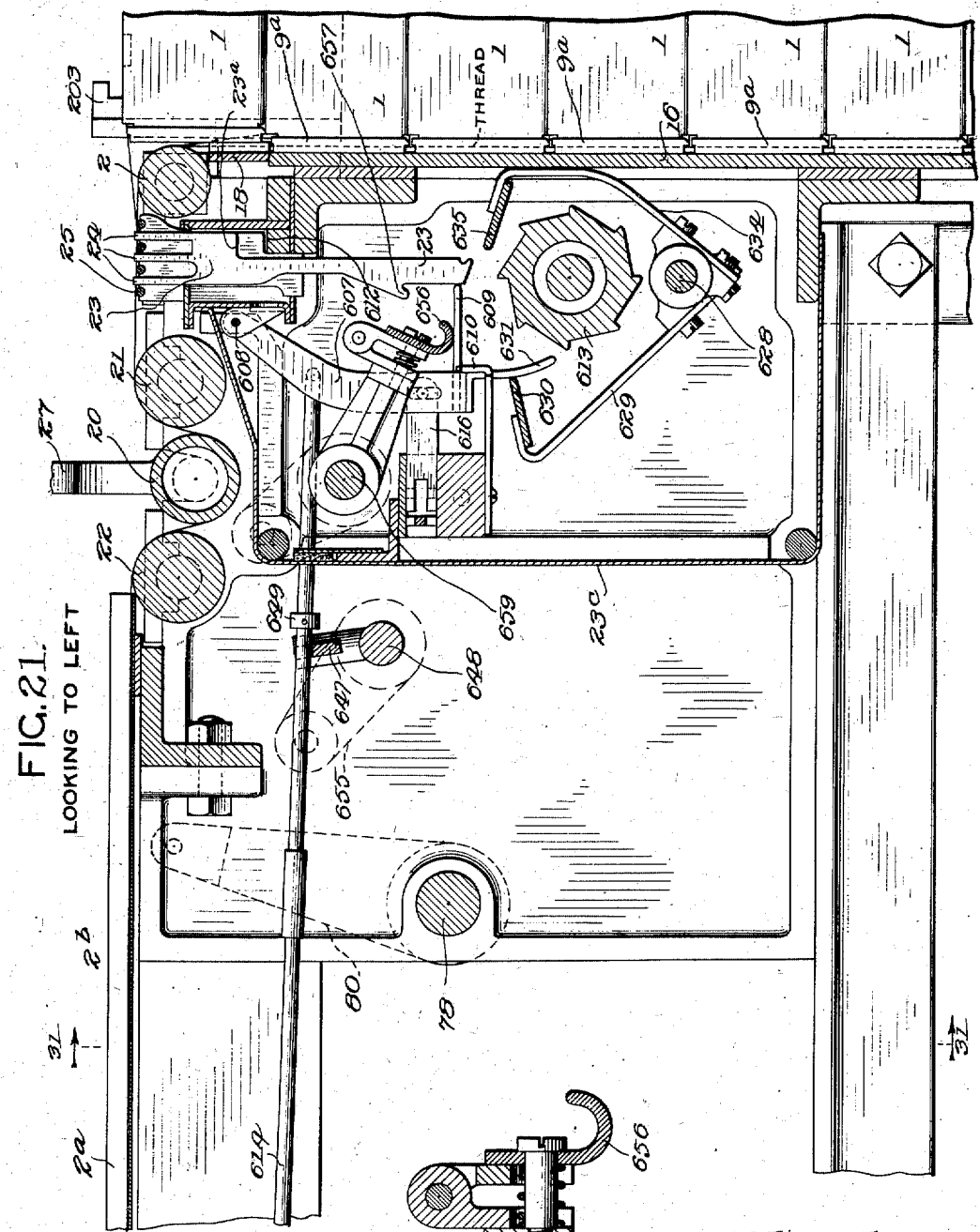
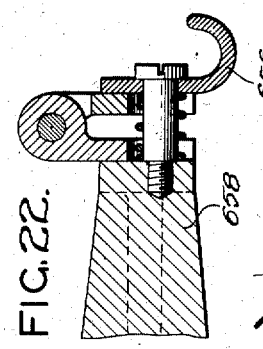

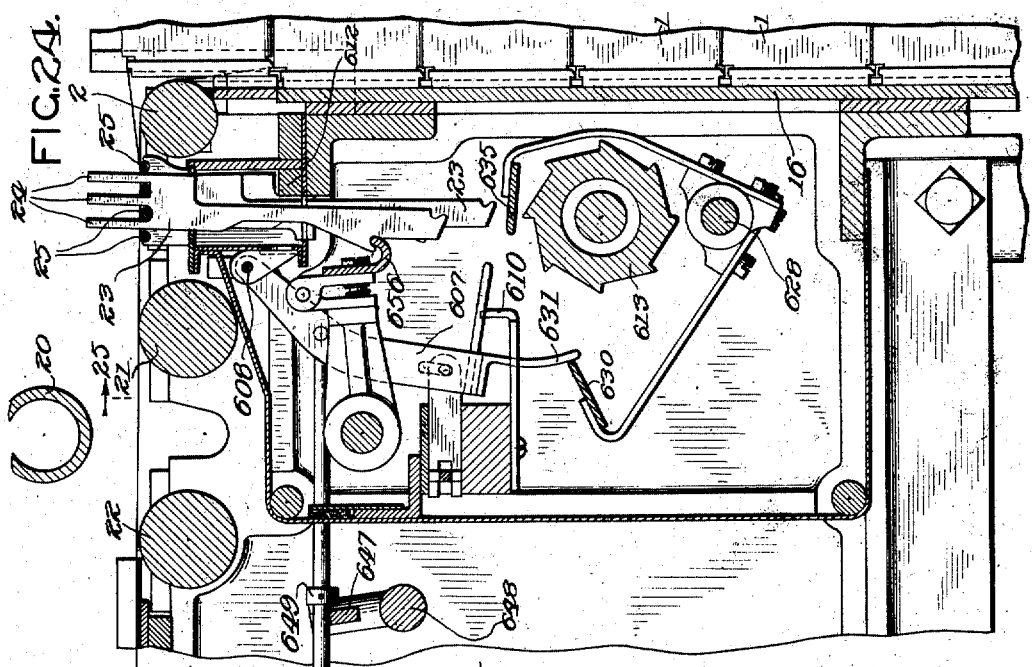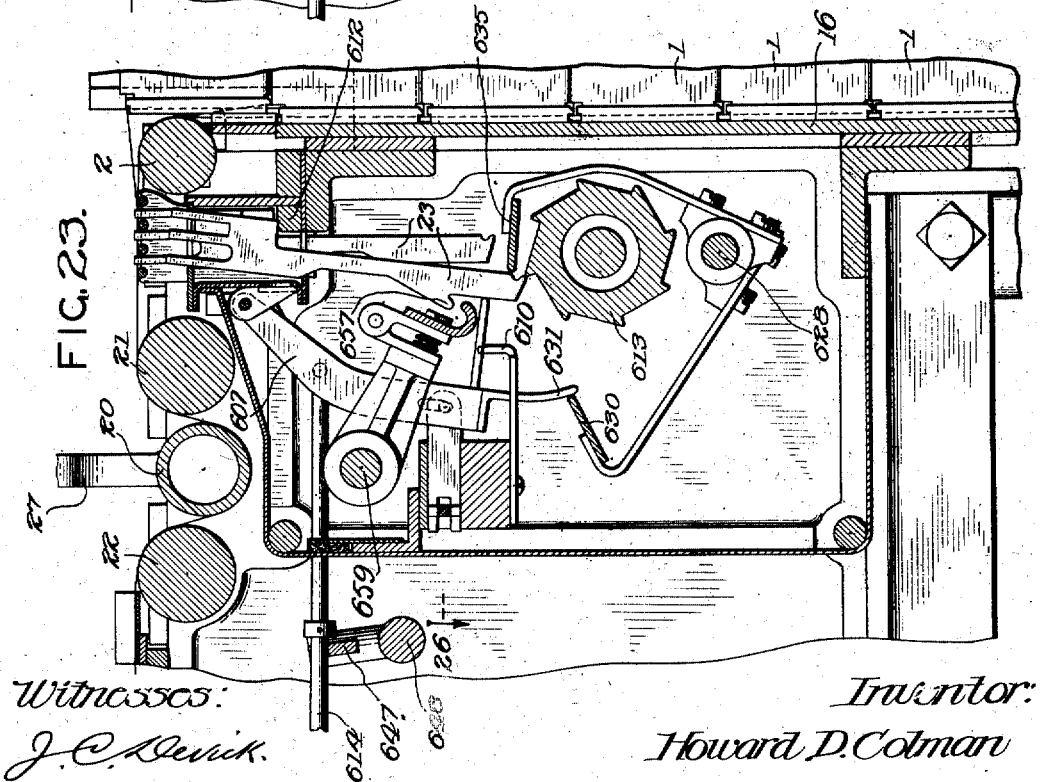

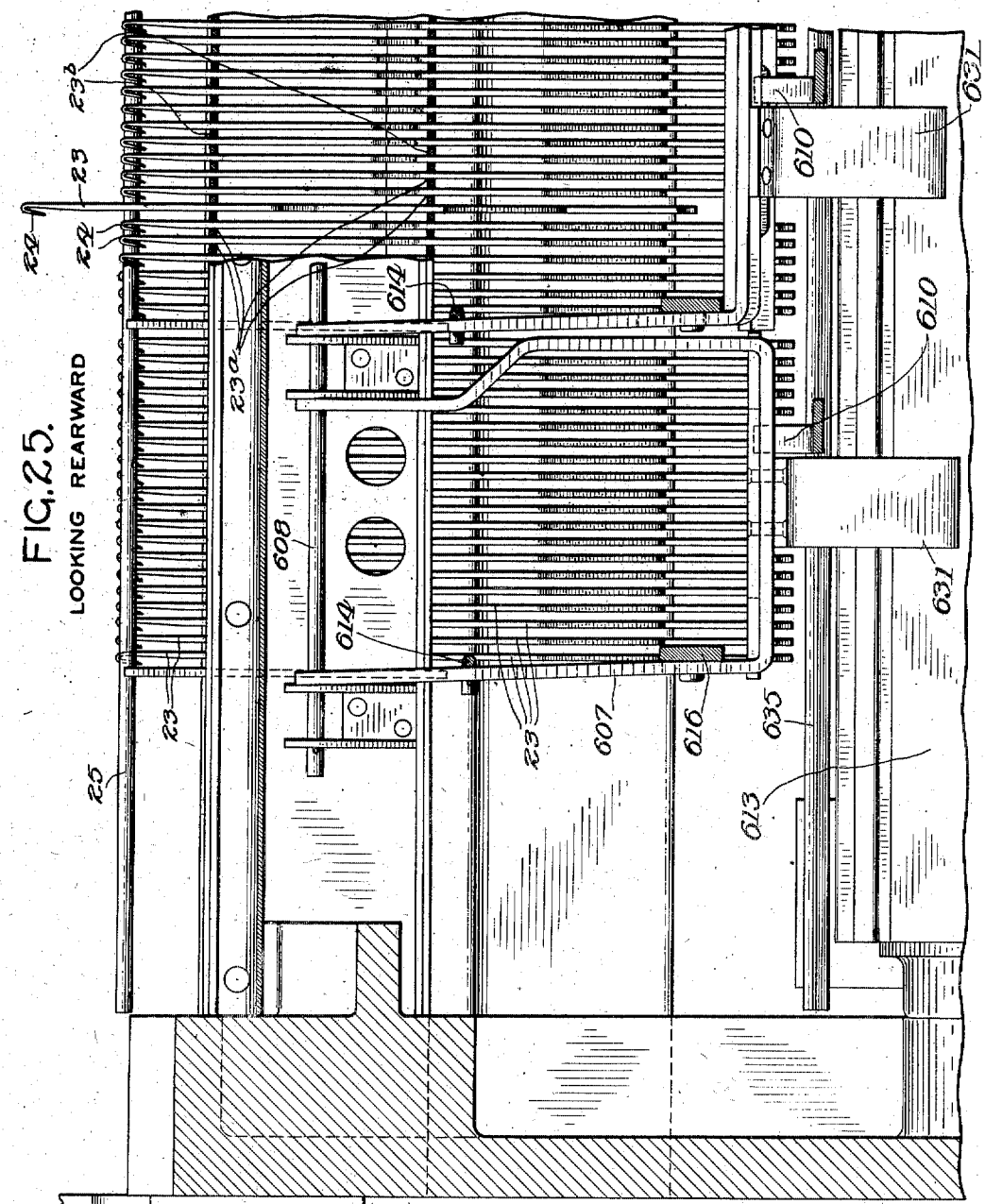

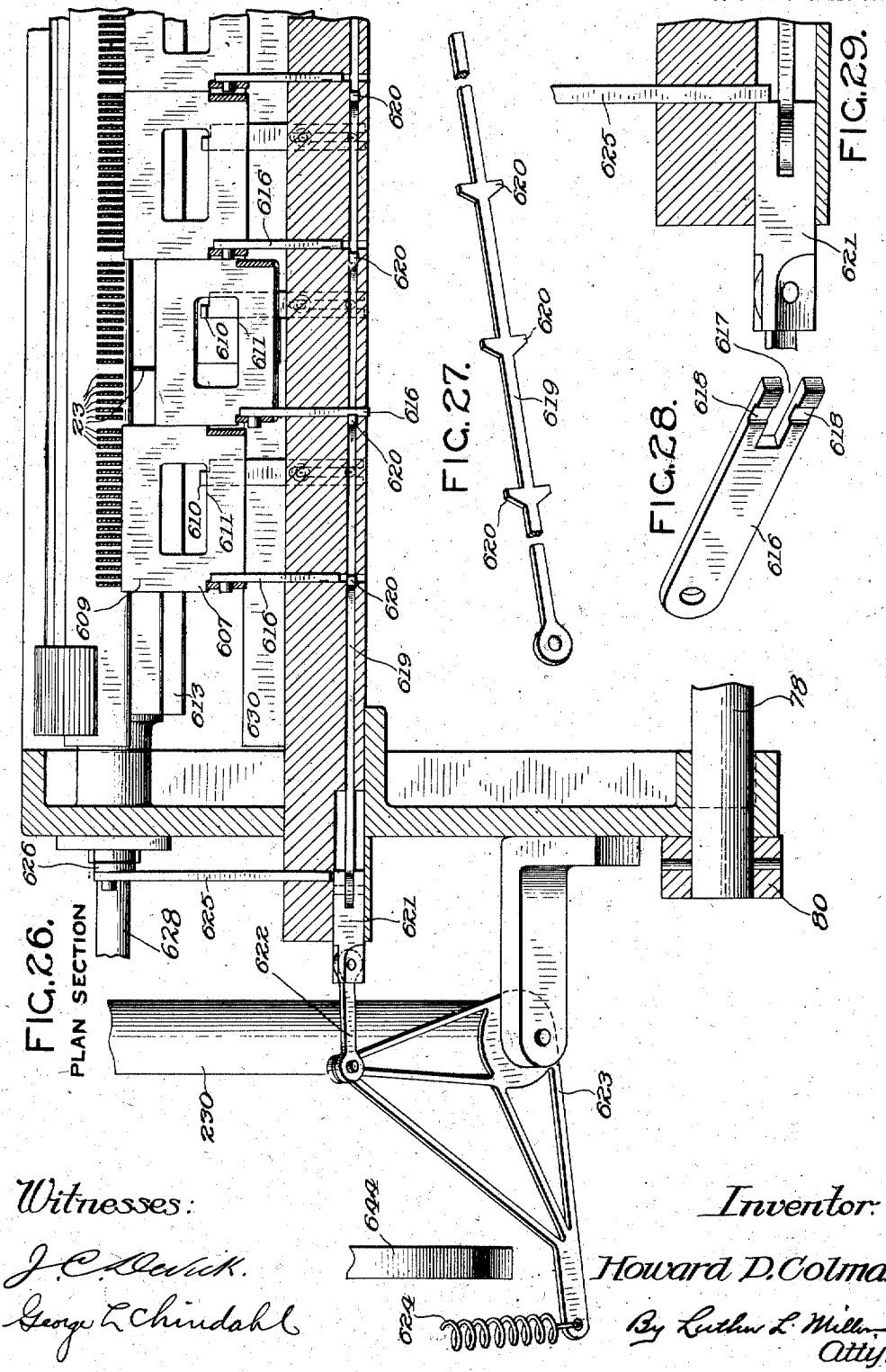

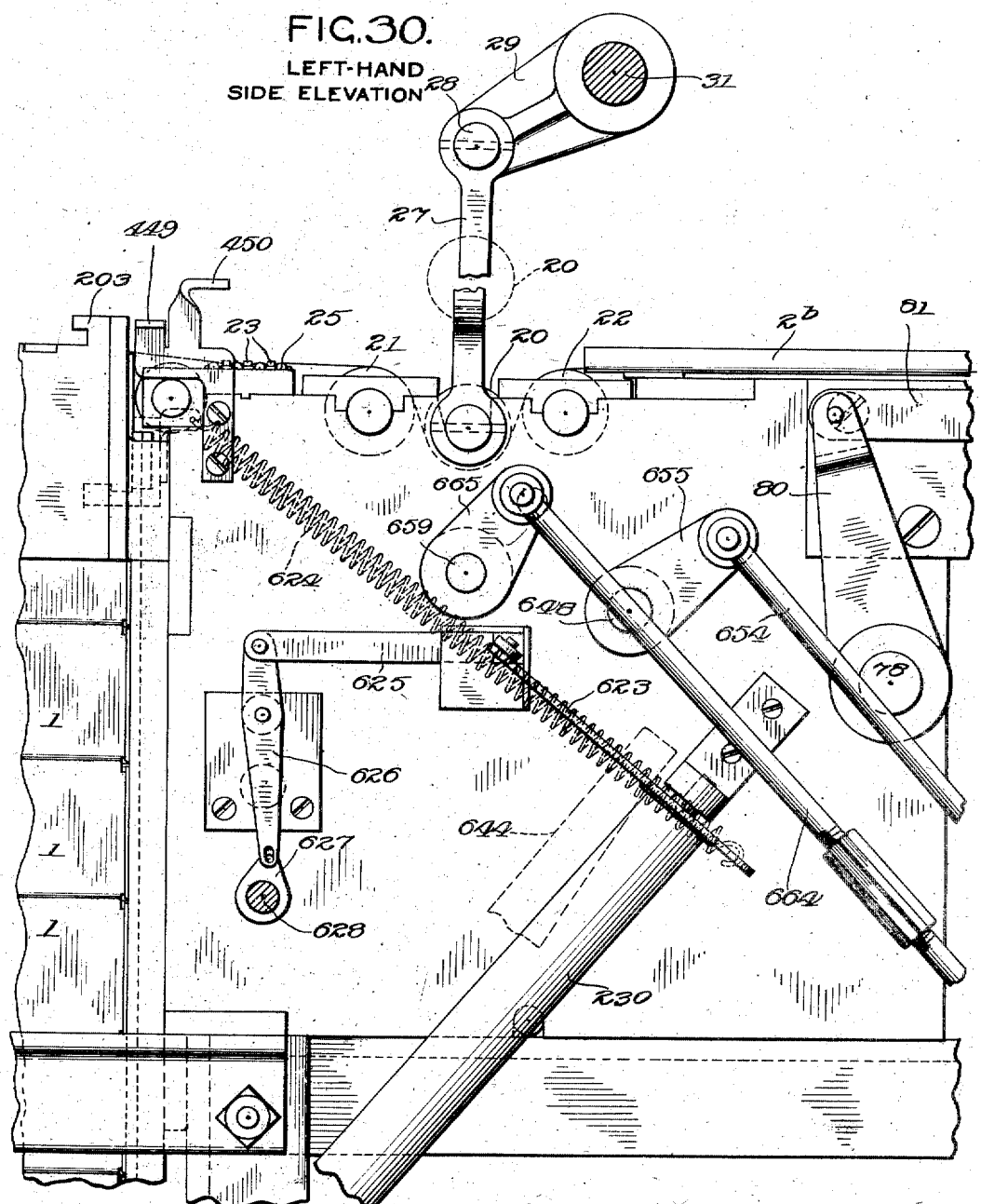

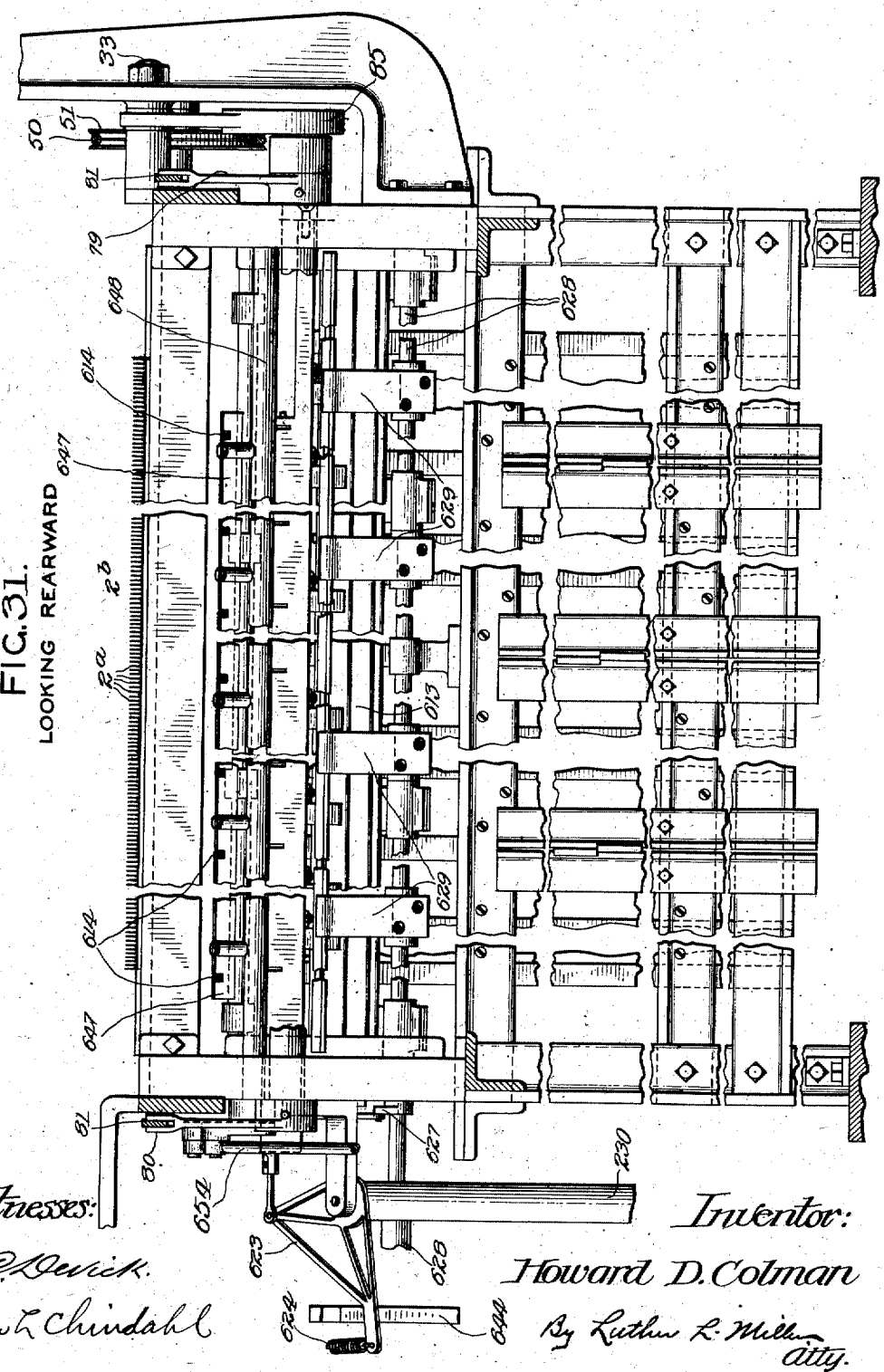

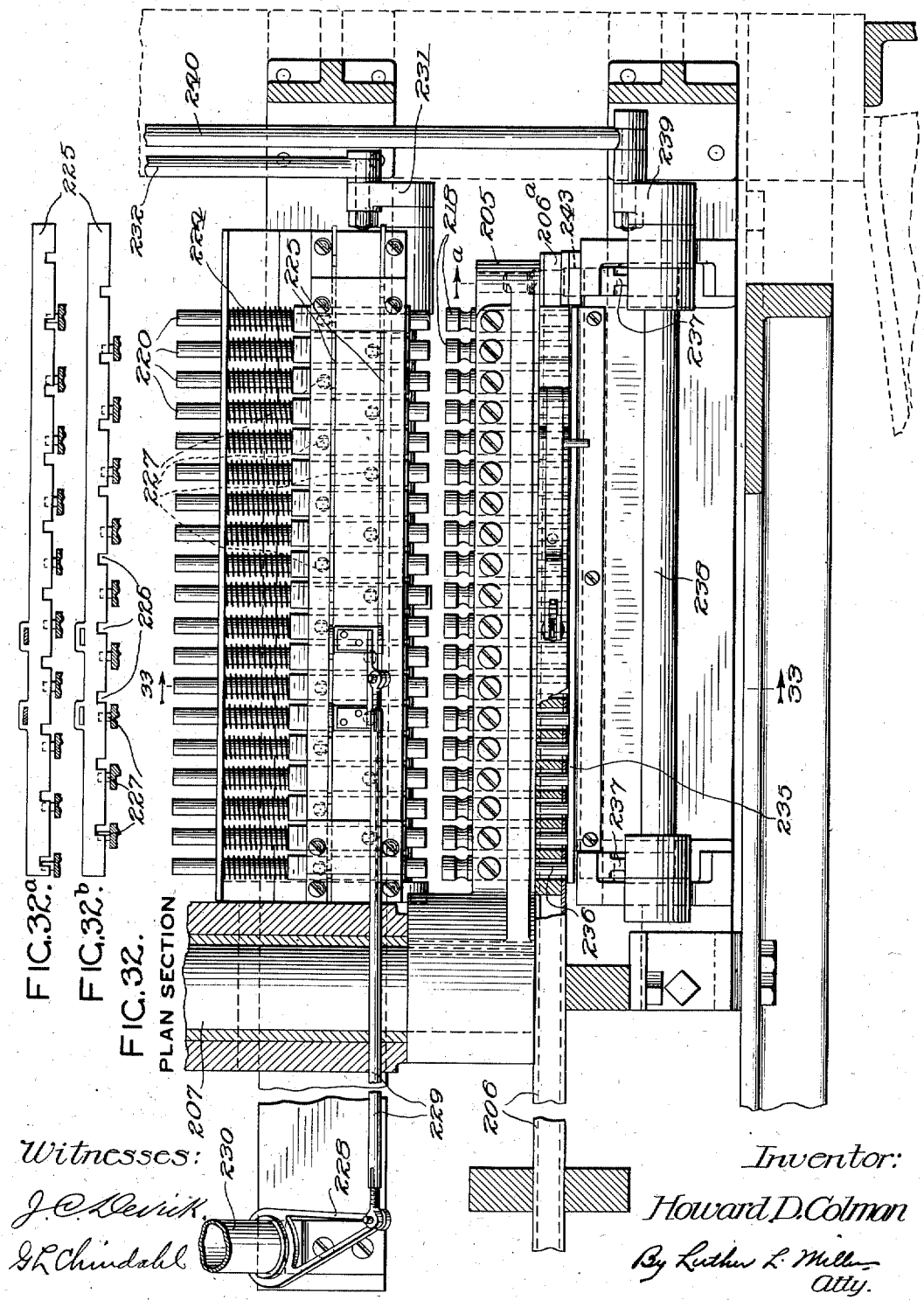

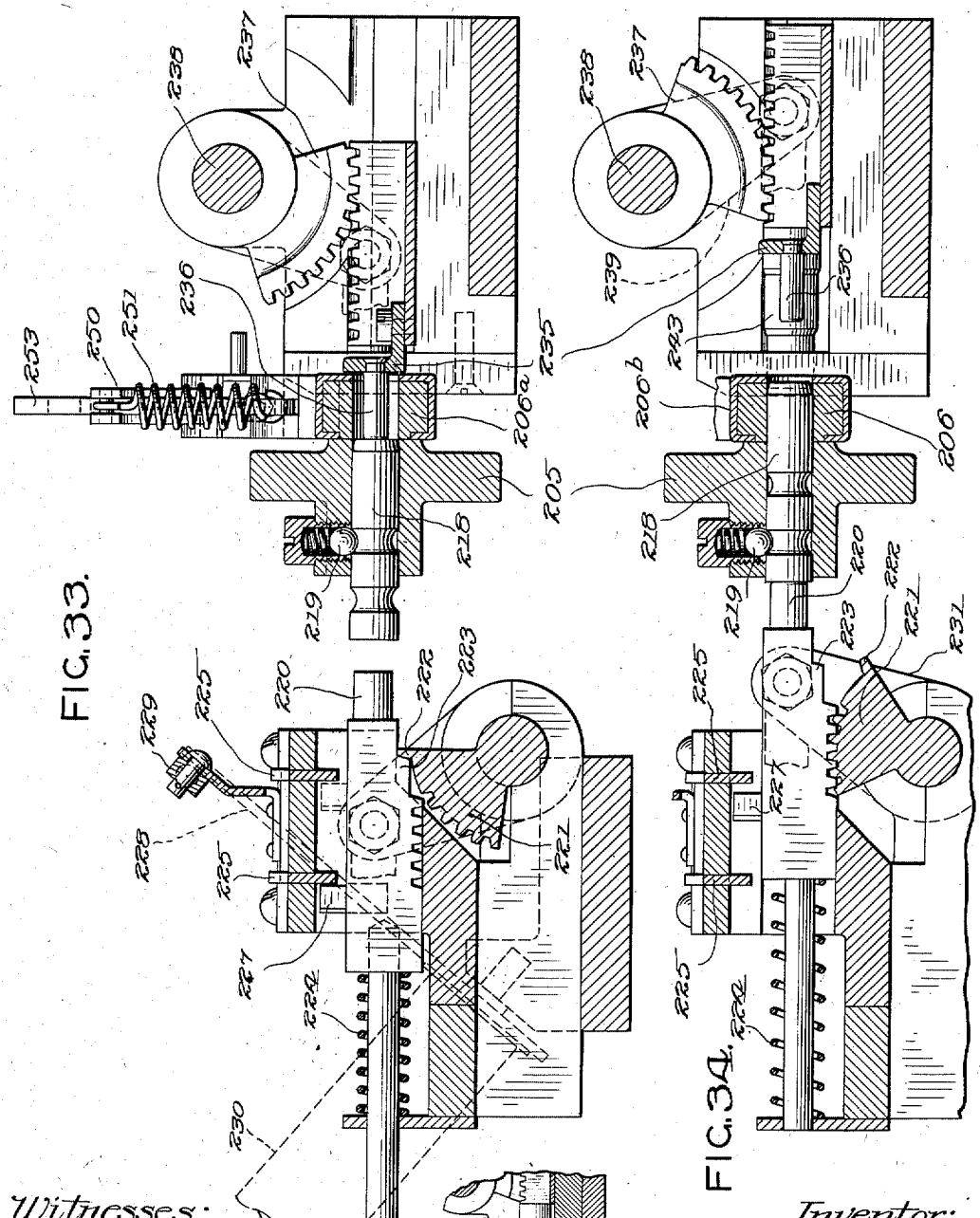

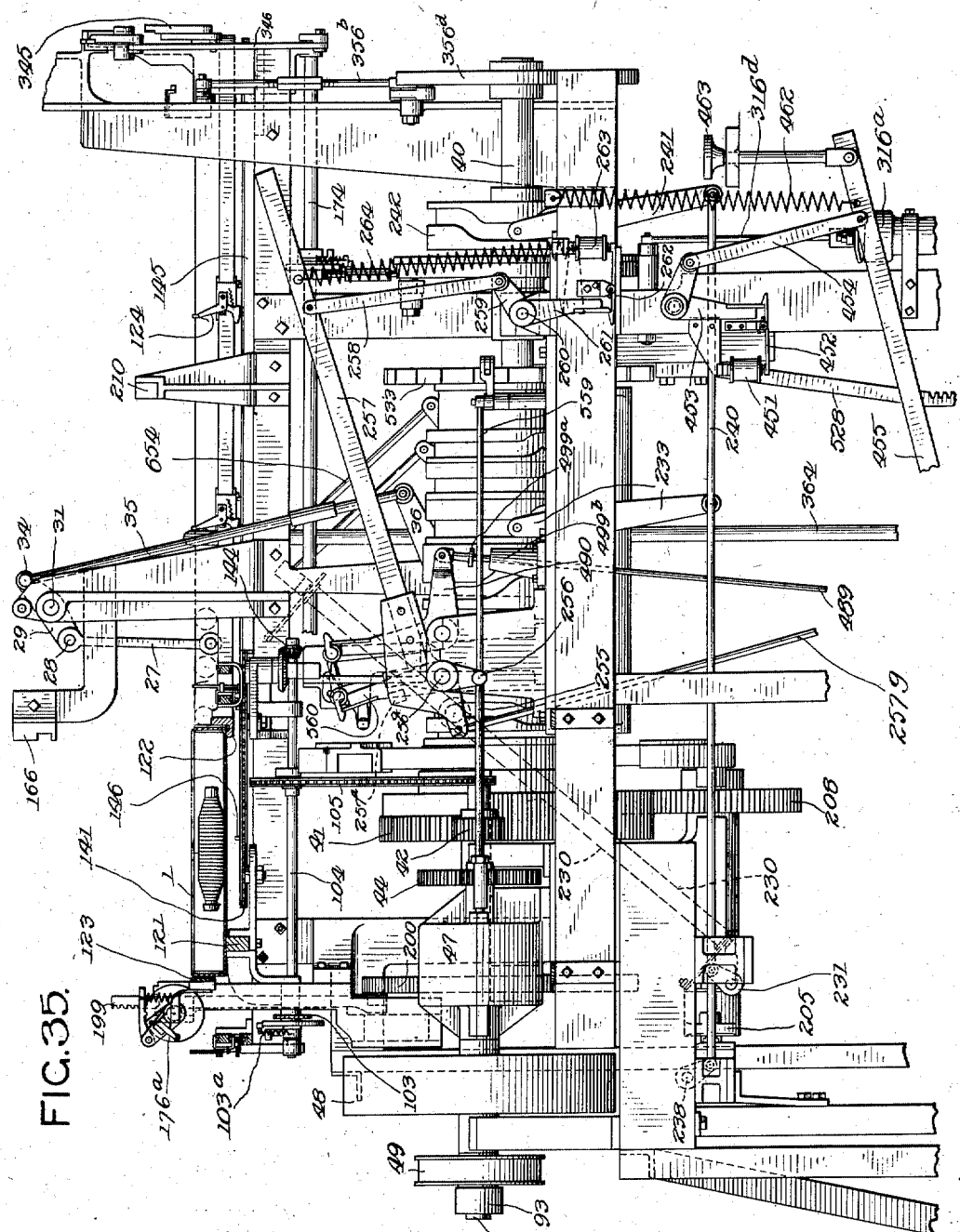

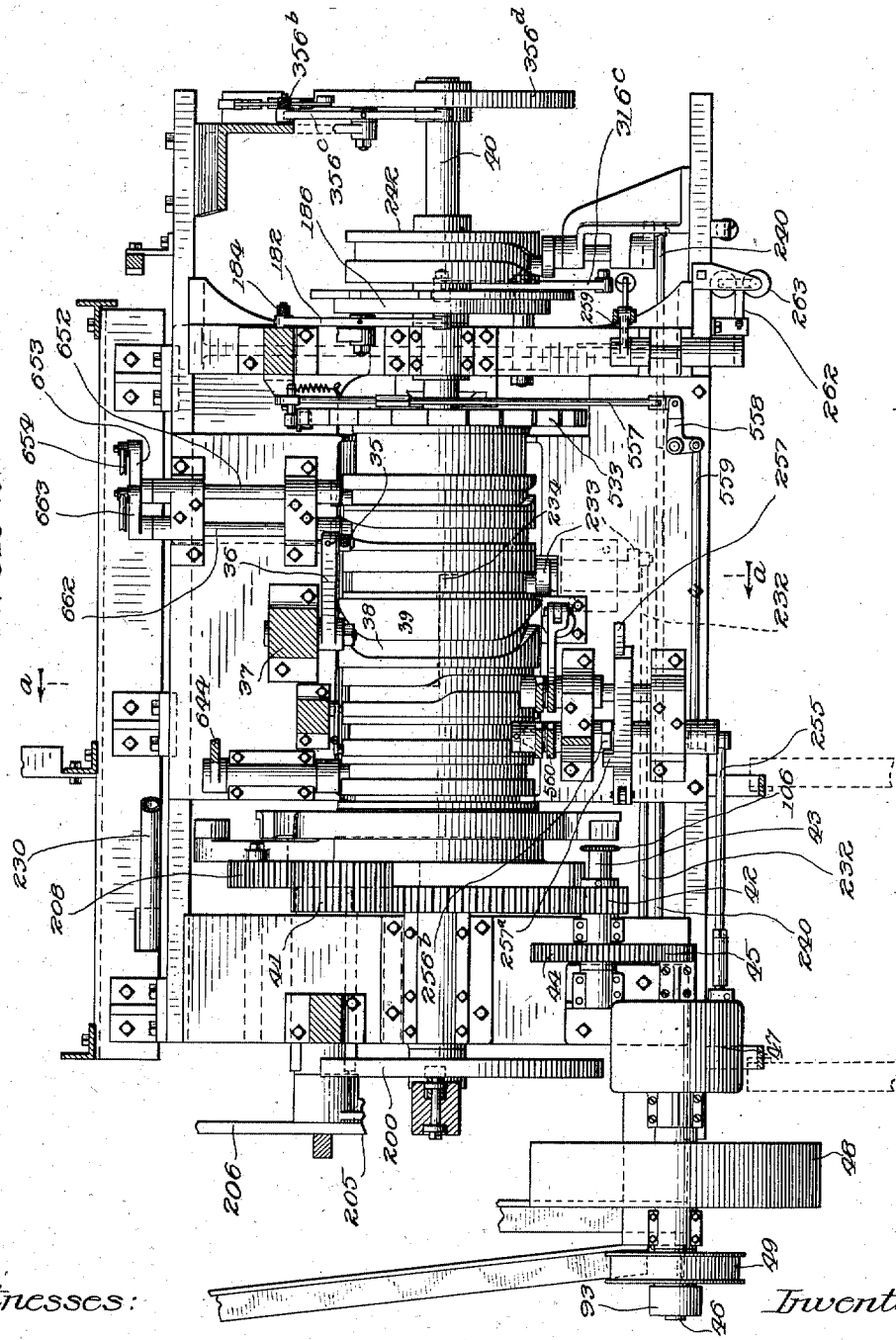

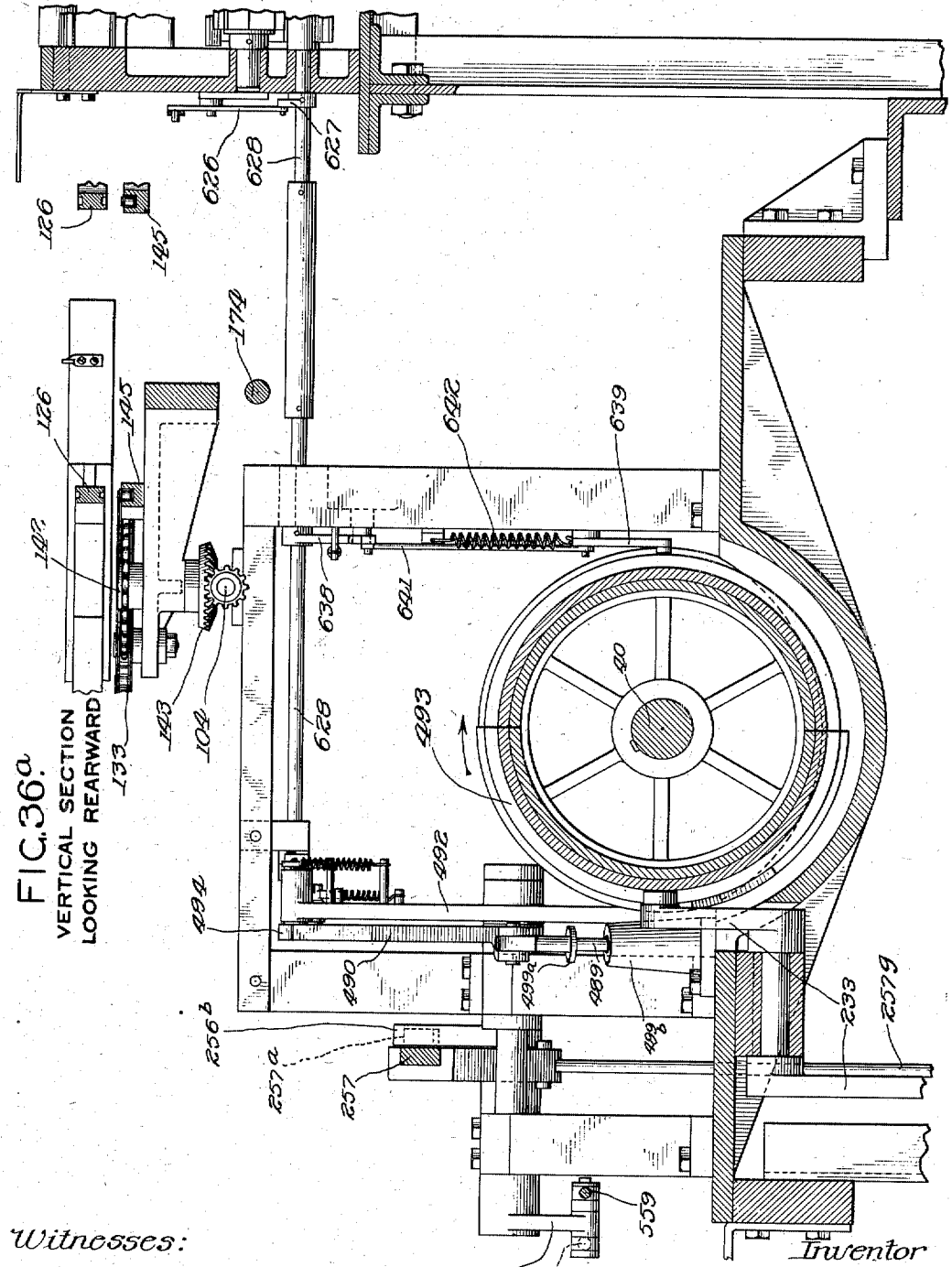

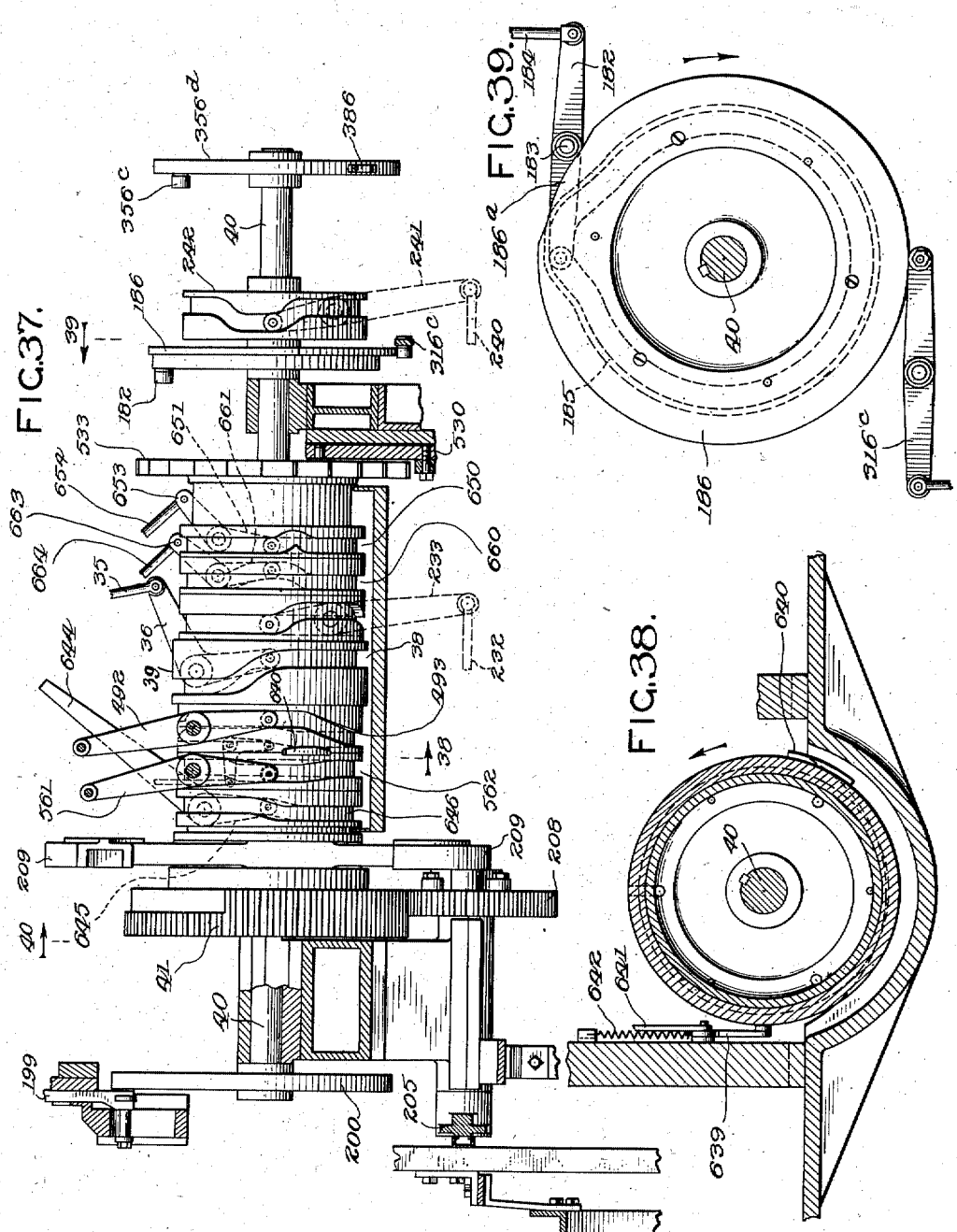

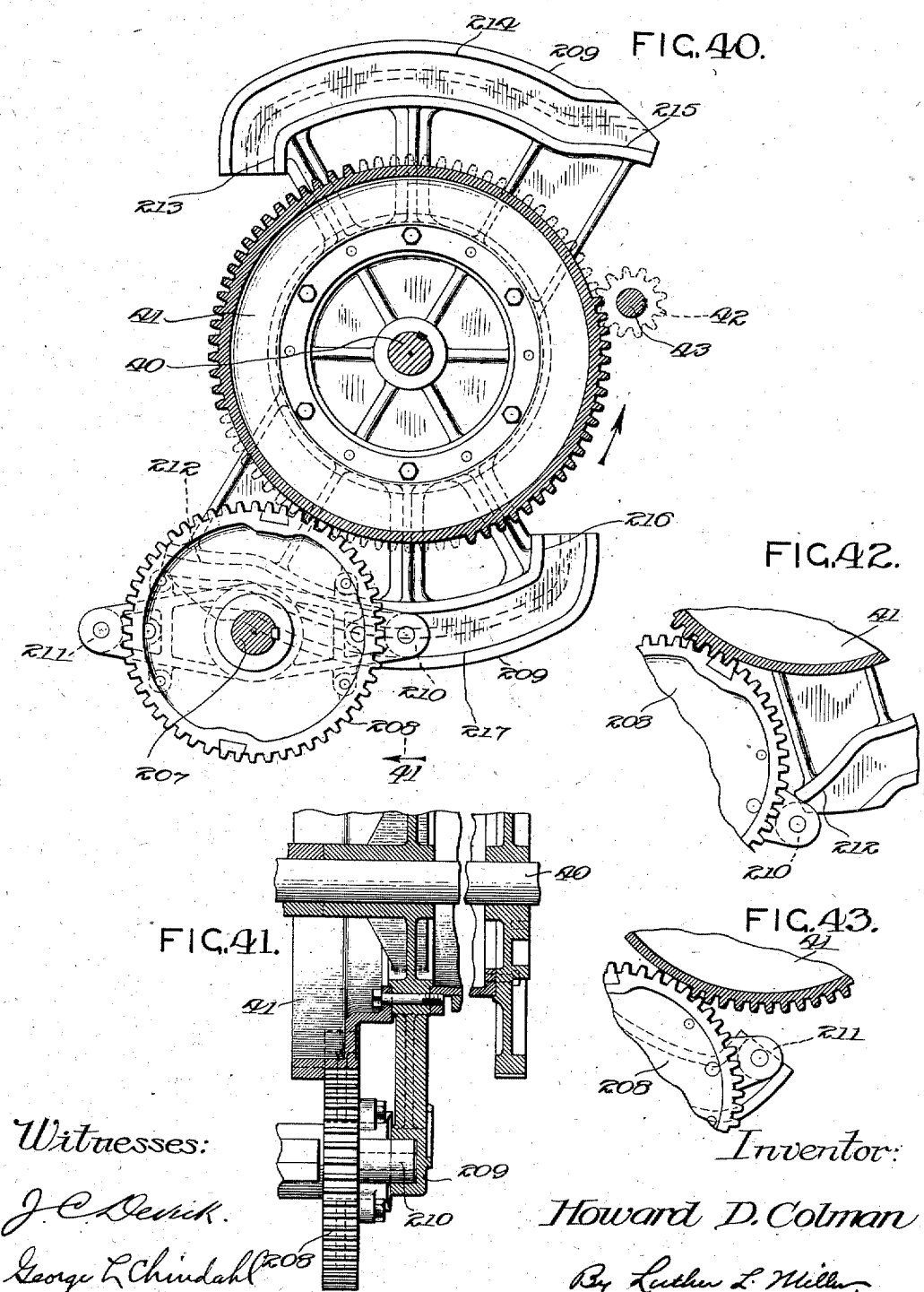

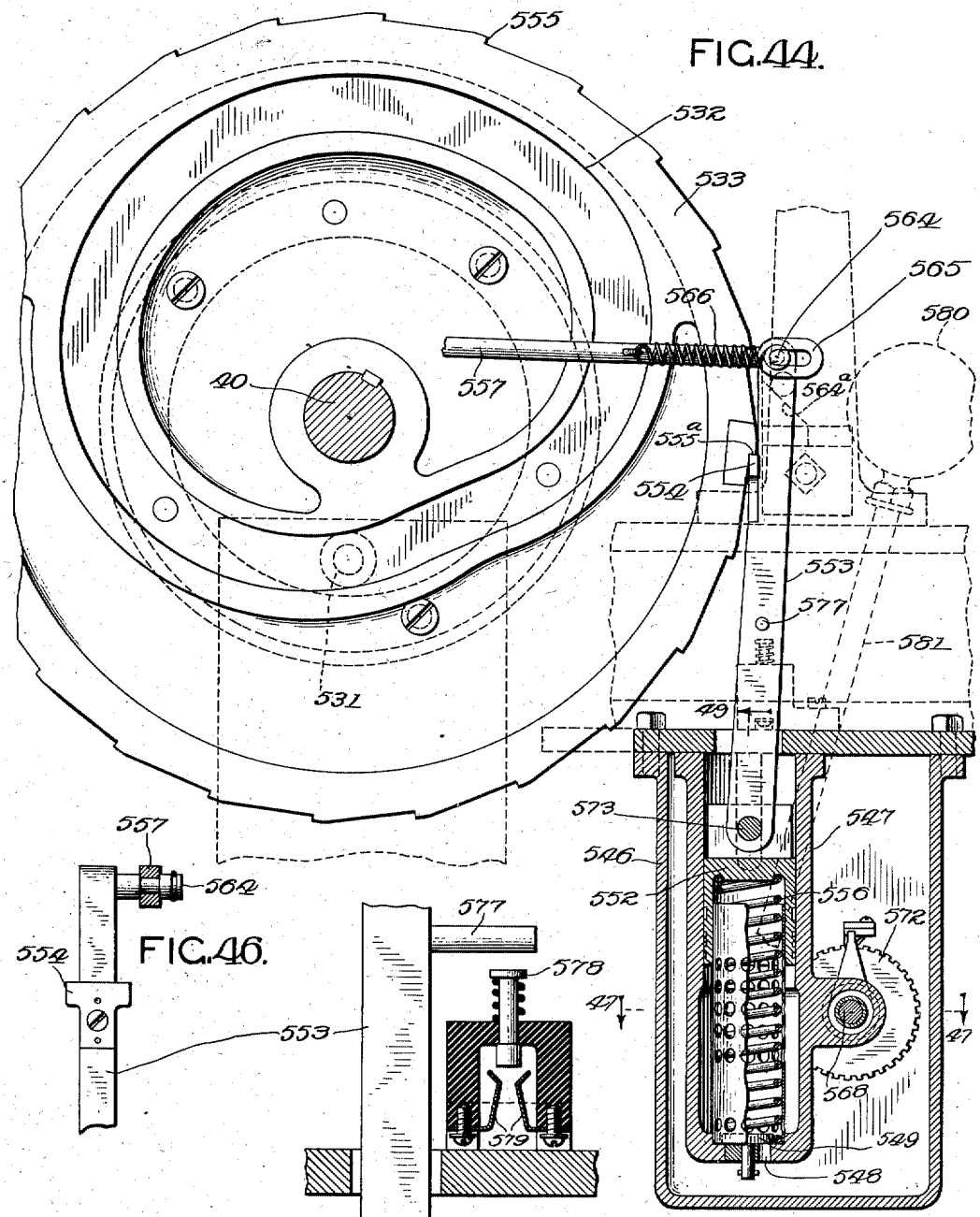

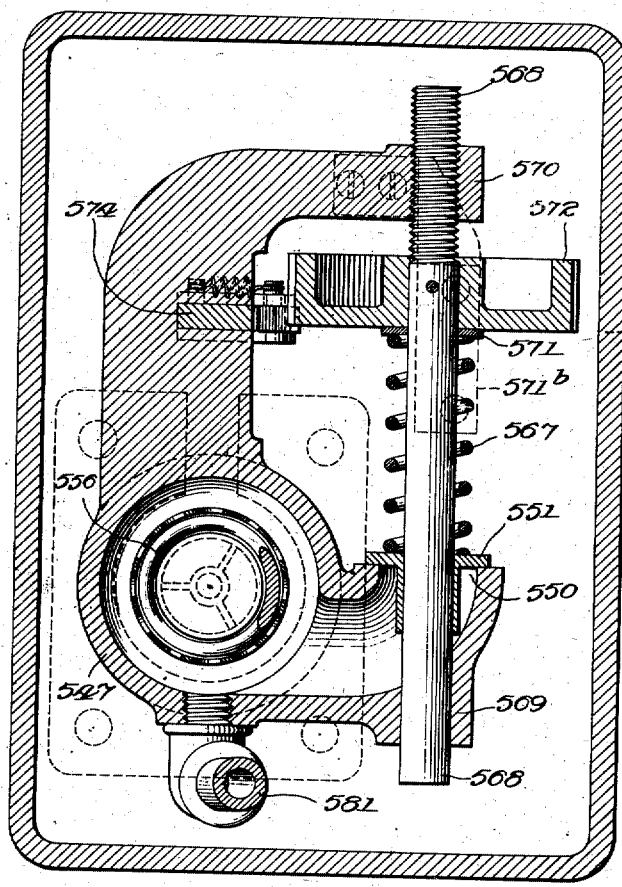
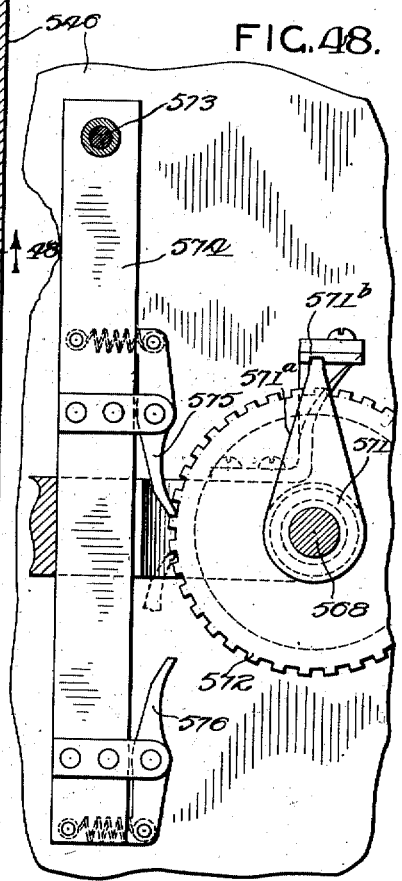
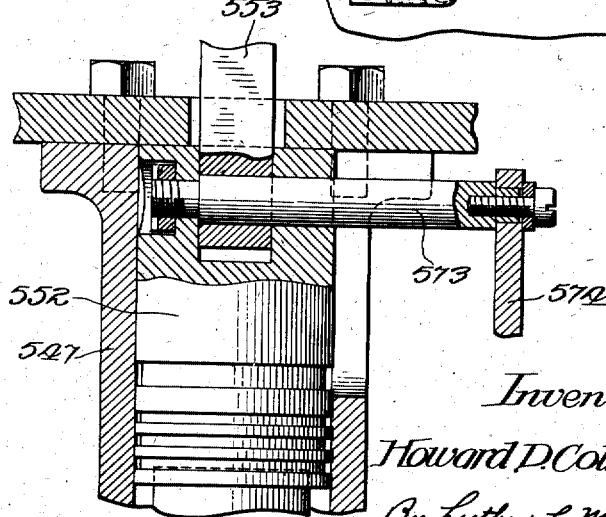

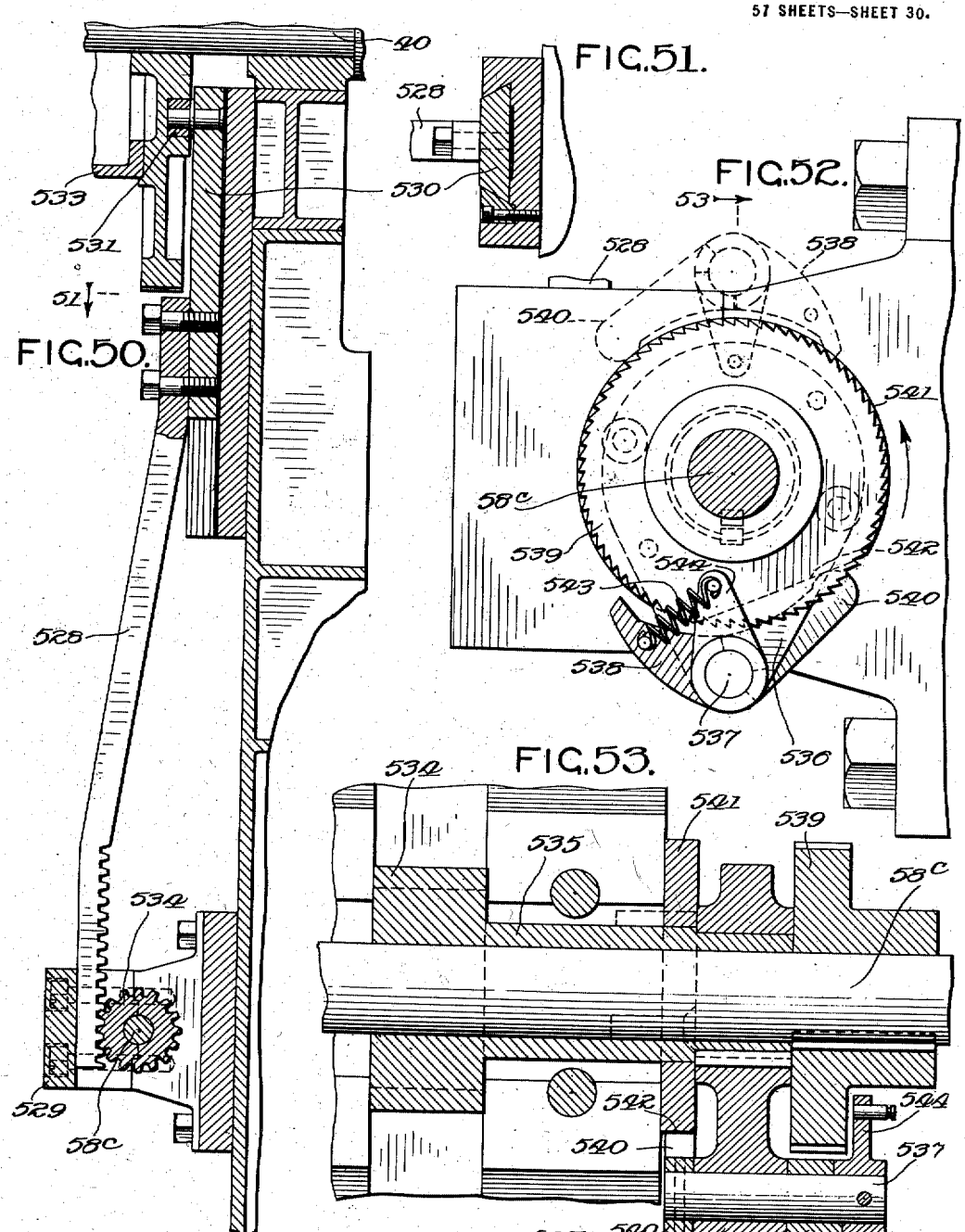

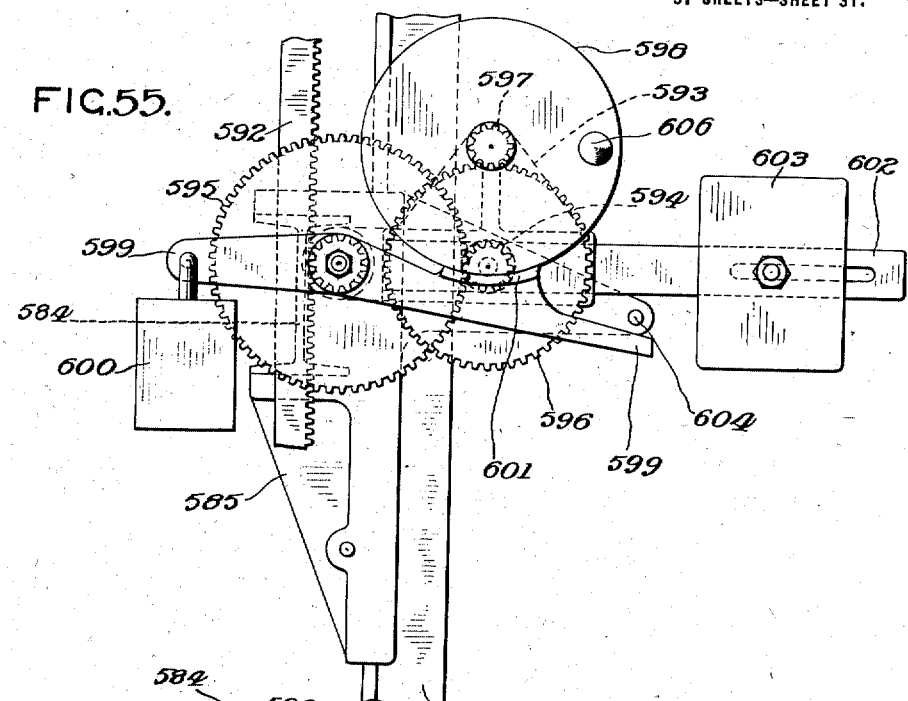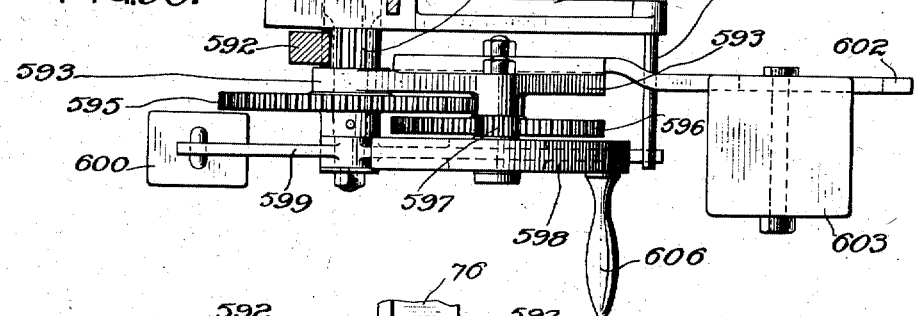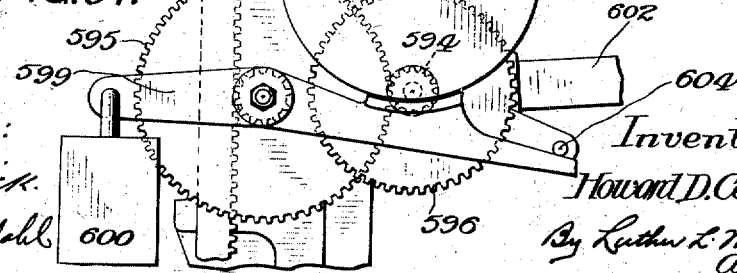

H. D. COLMAN.
WINDER.
APPLICATION FILED JUNE 28, 1913.
1,239,670.
Patented Sept. 11, 1917.
57 SHEETS—SHEET 32.
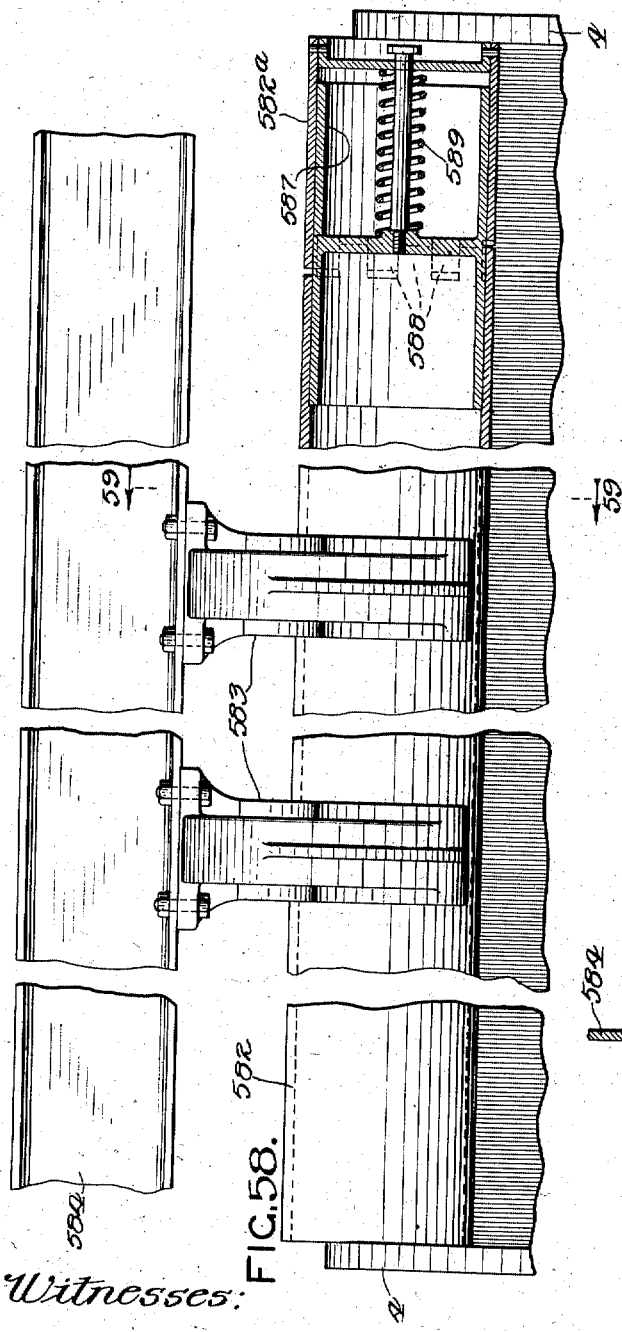
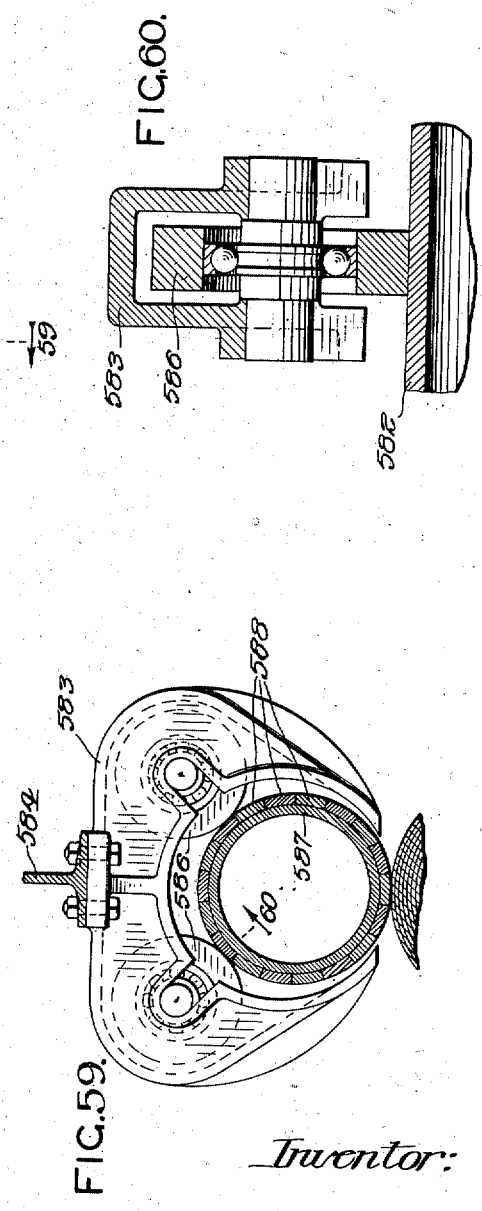
Witnesses:
J. C. Devik.
George L. Chindahl
Inventor:
Howard D. Colman
By Luther L. Miller
Atty.

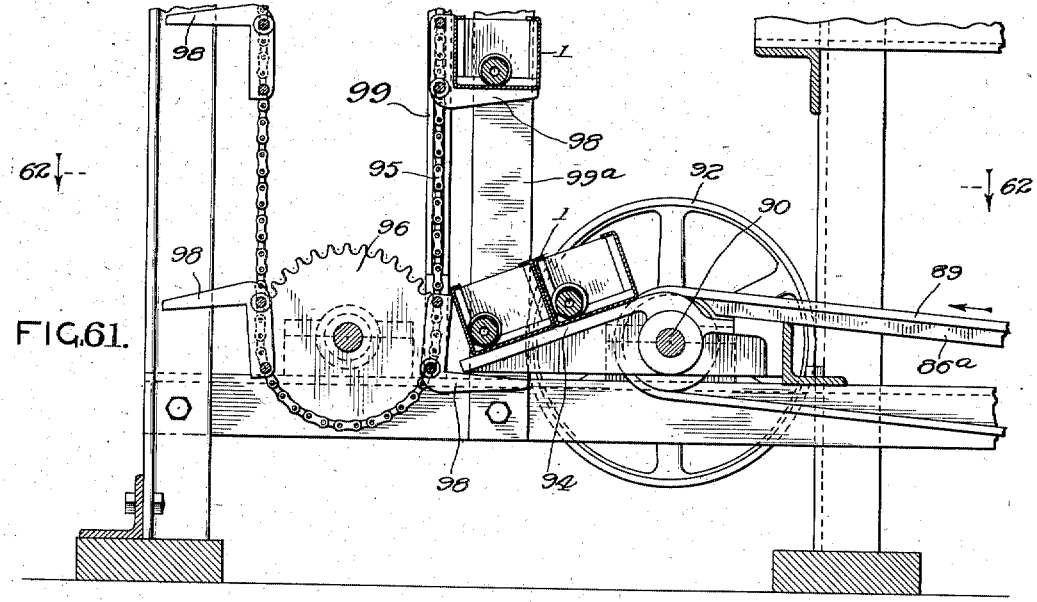
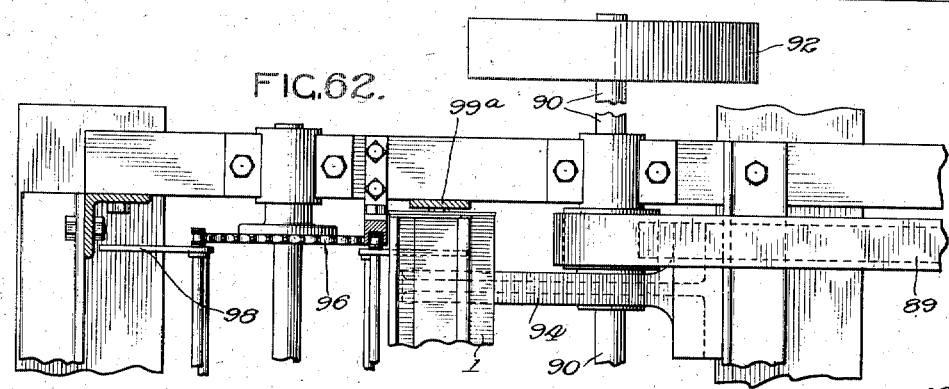
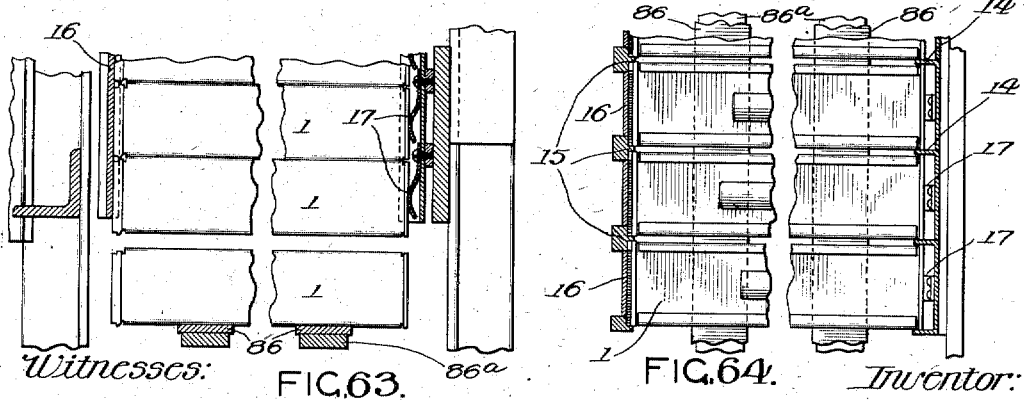
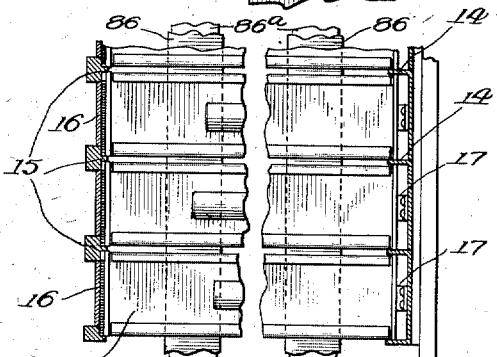

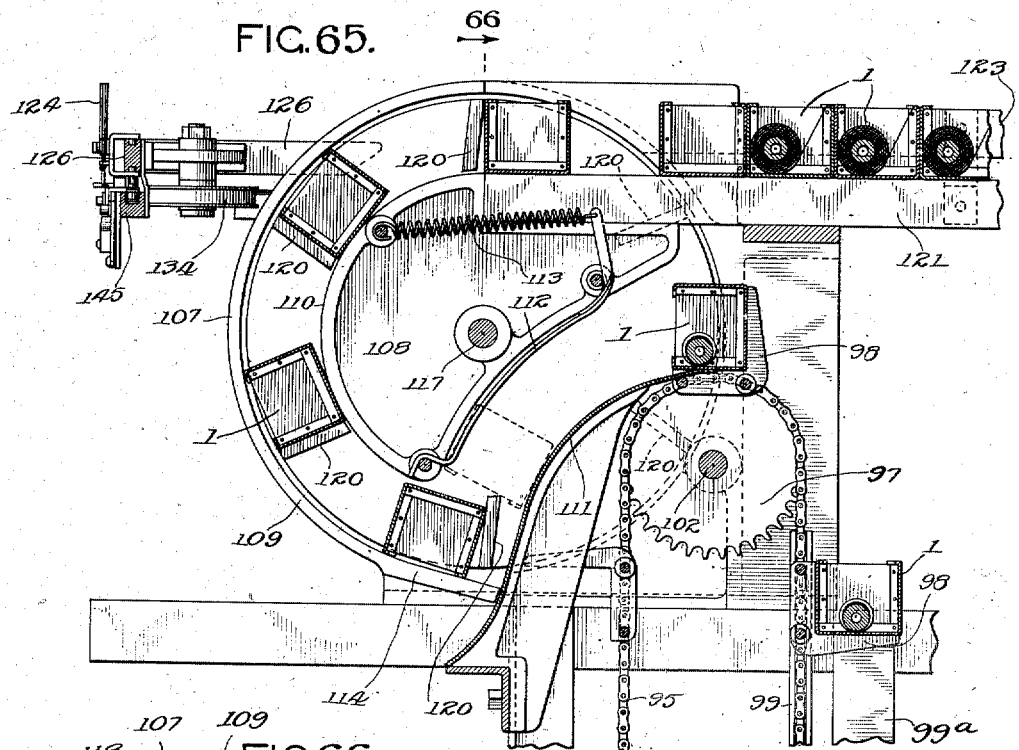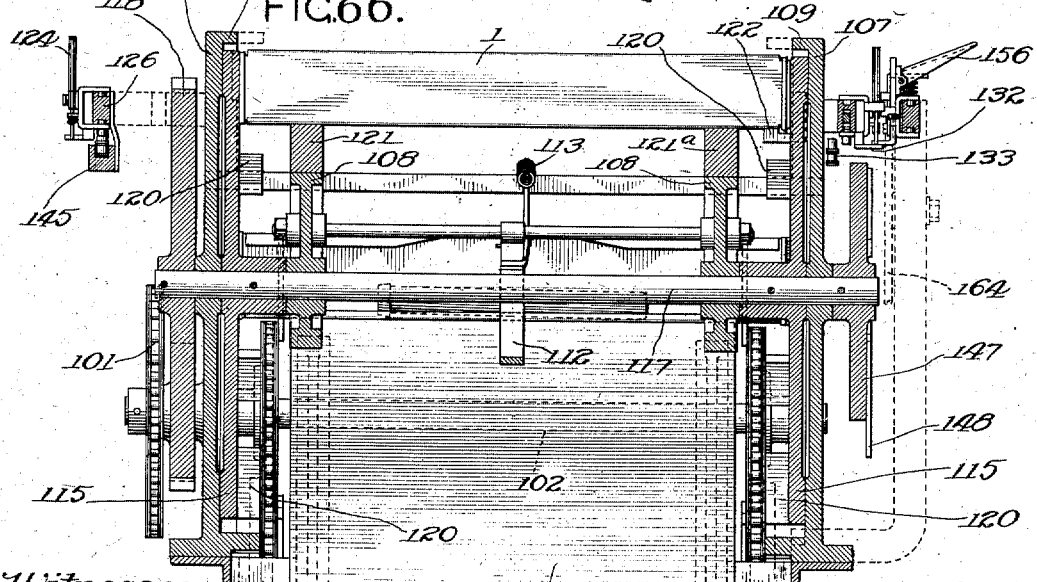

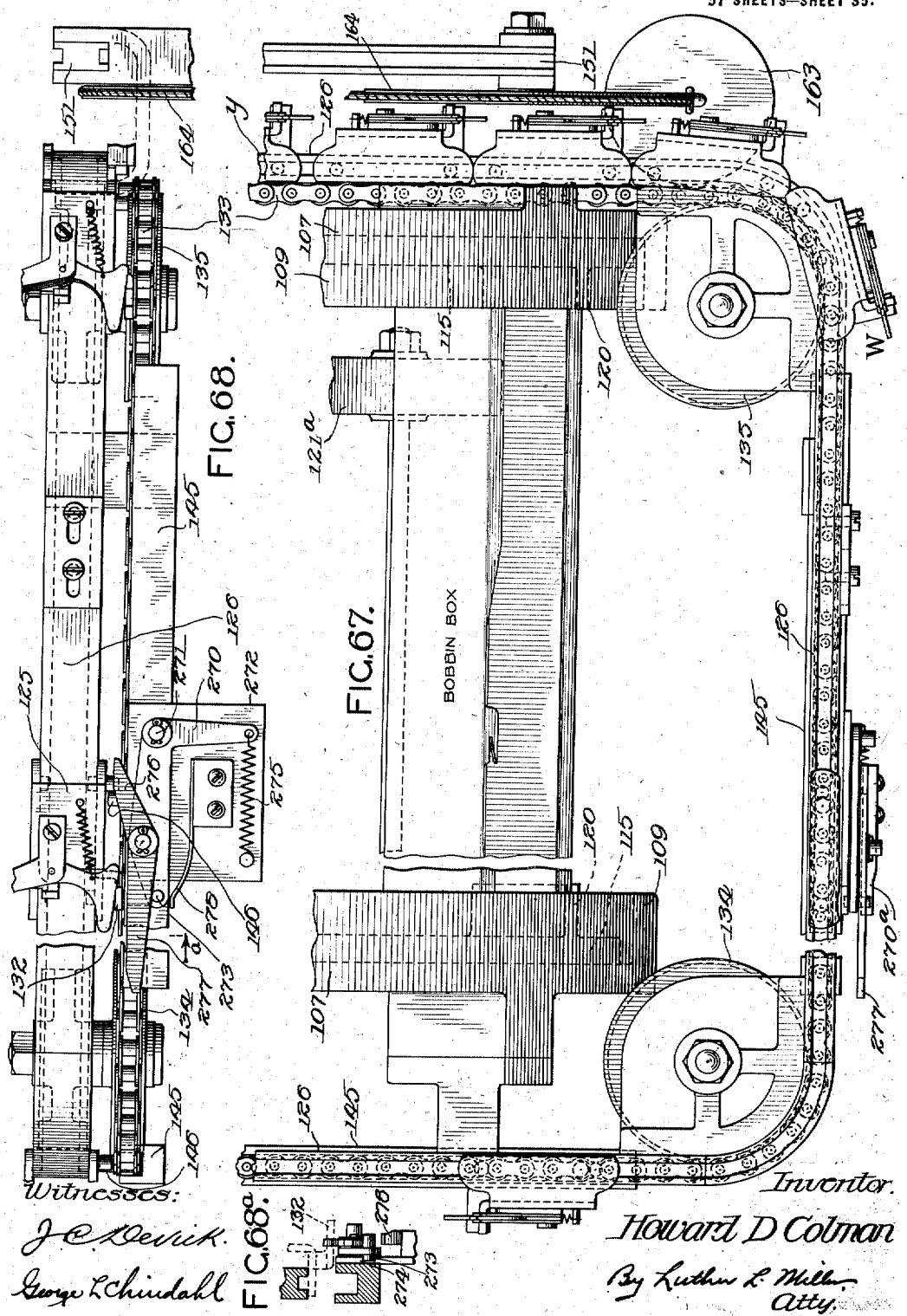

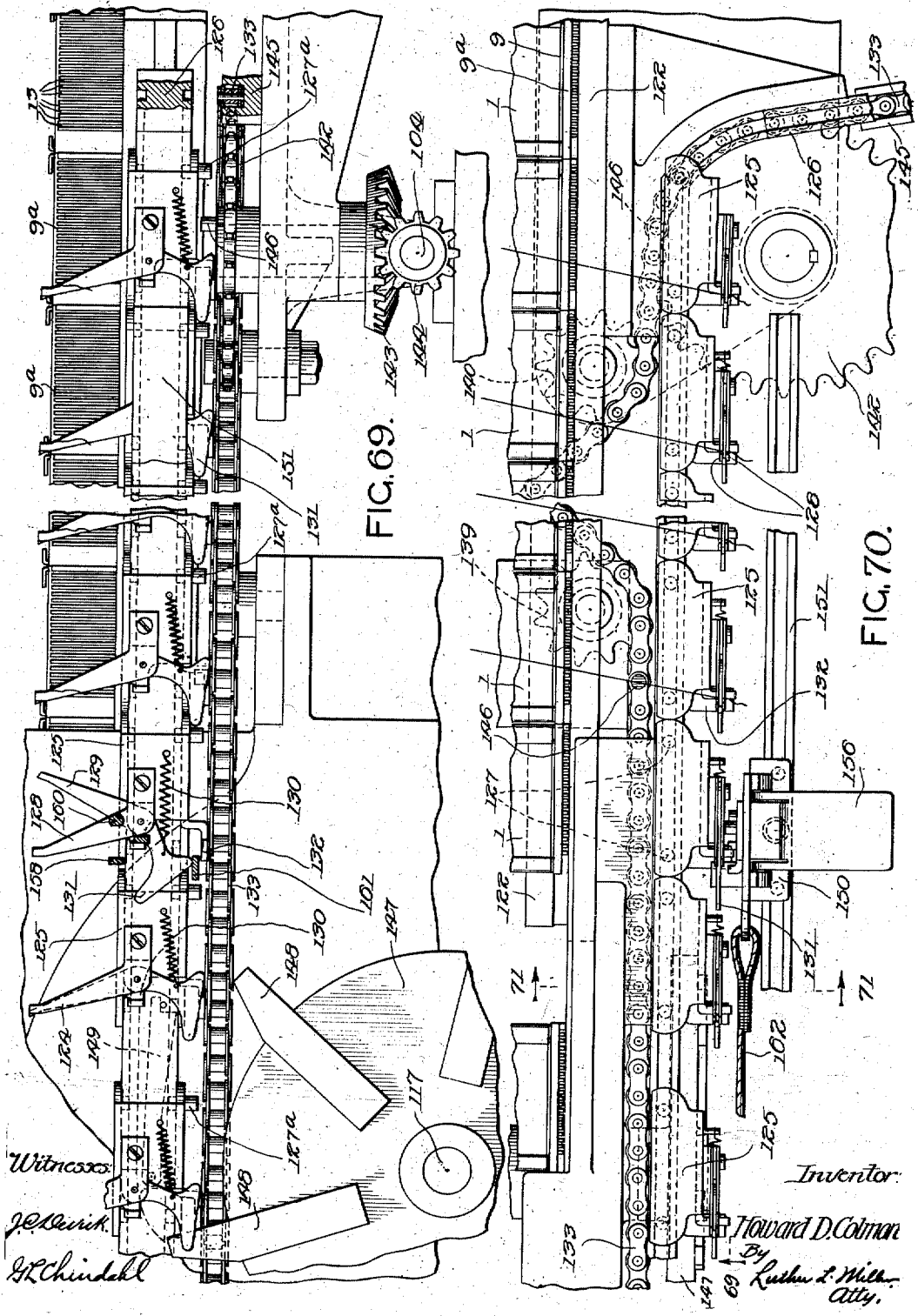

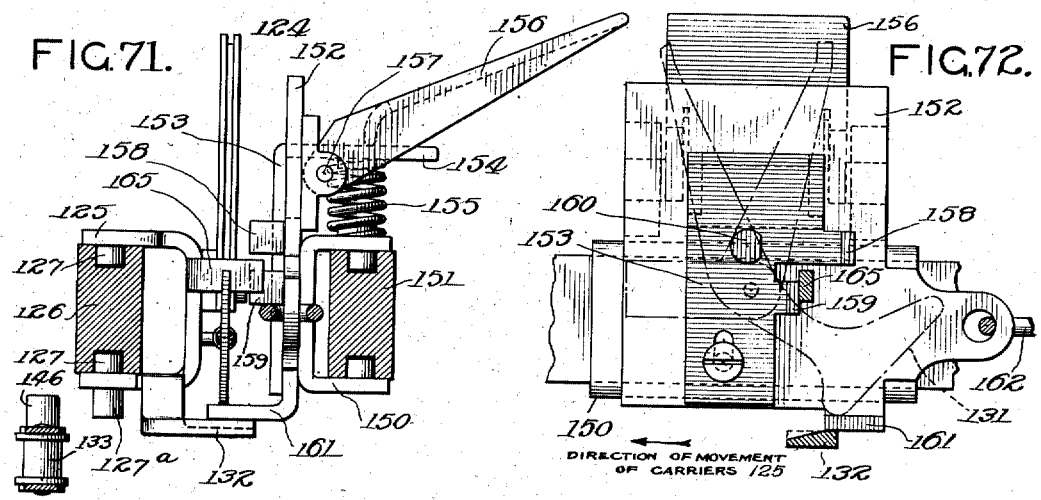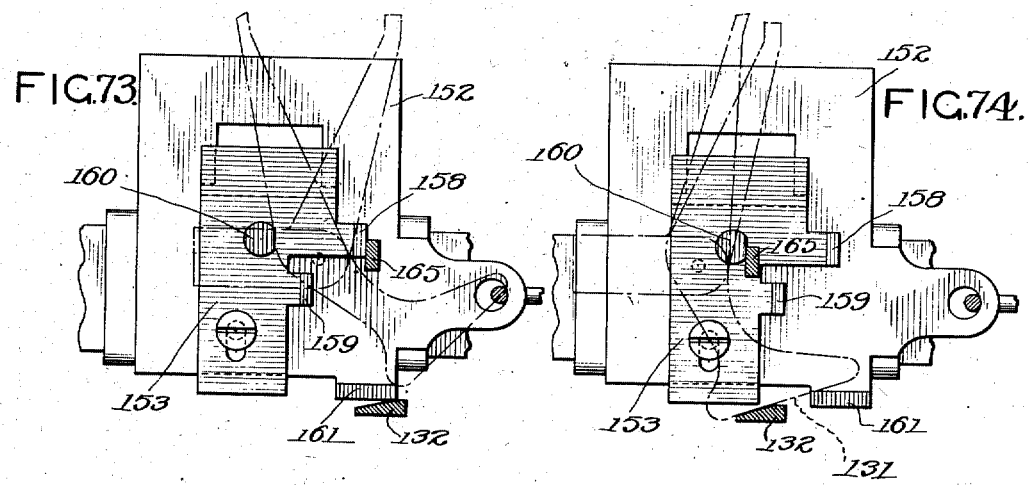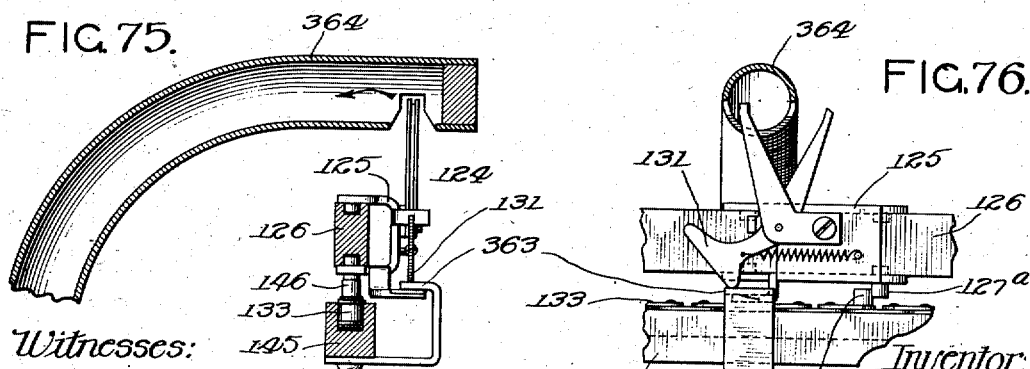

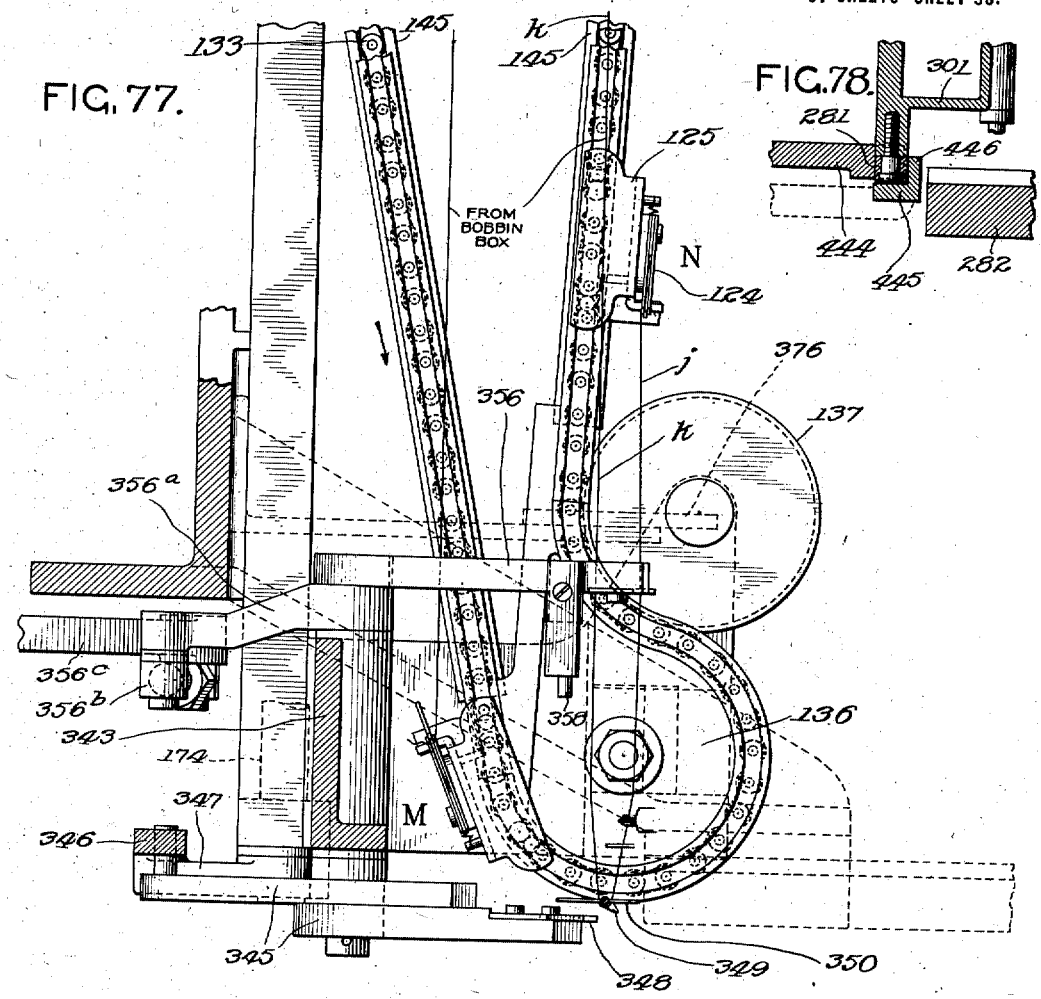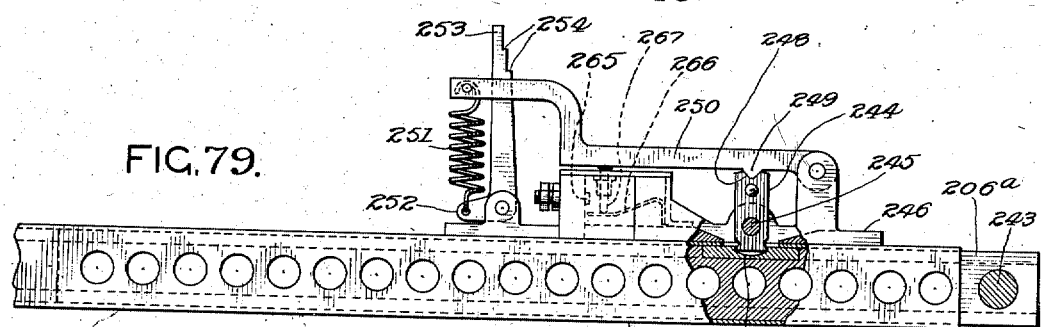

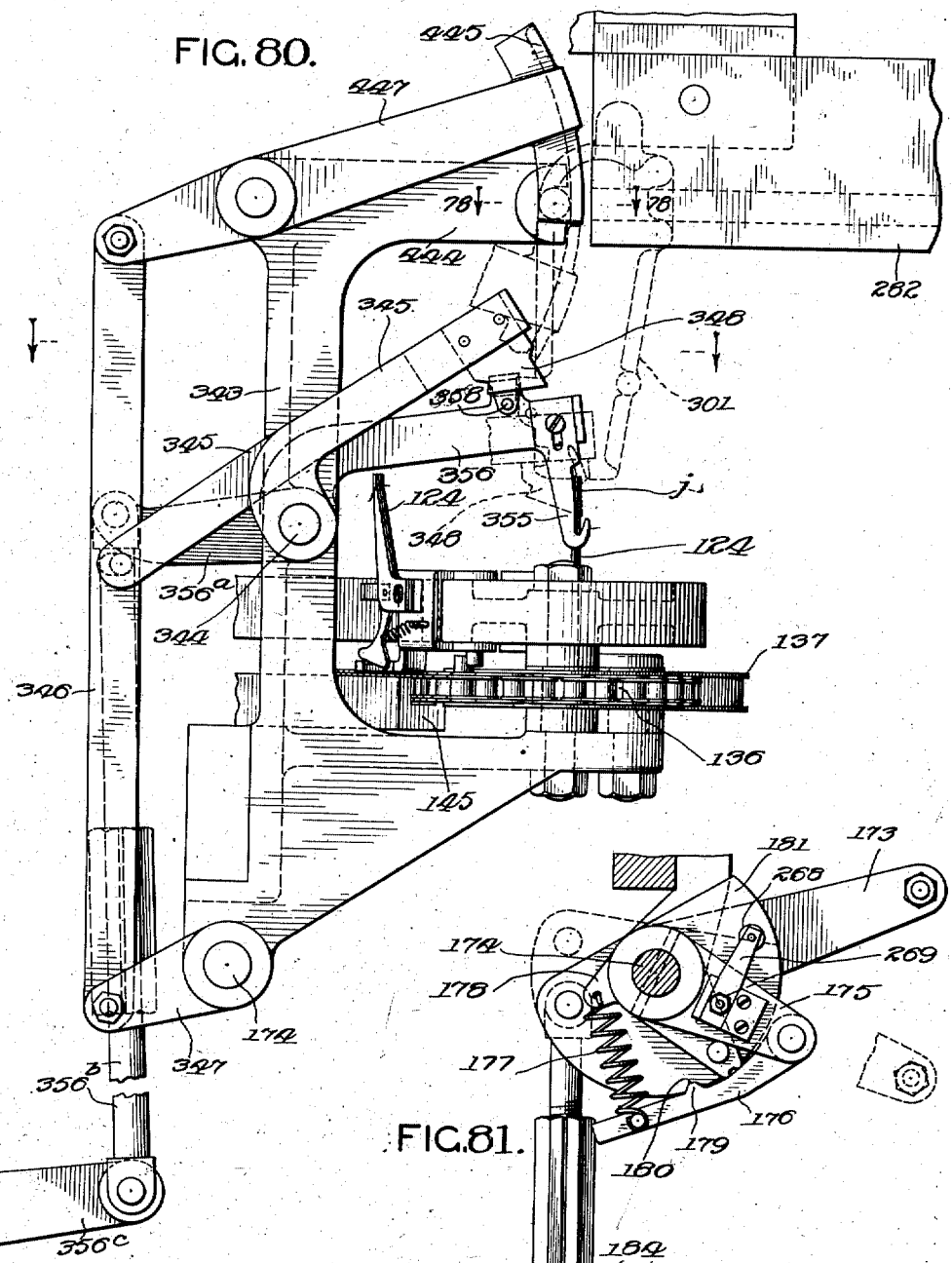

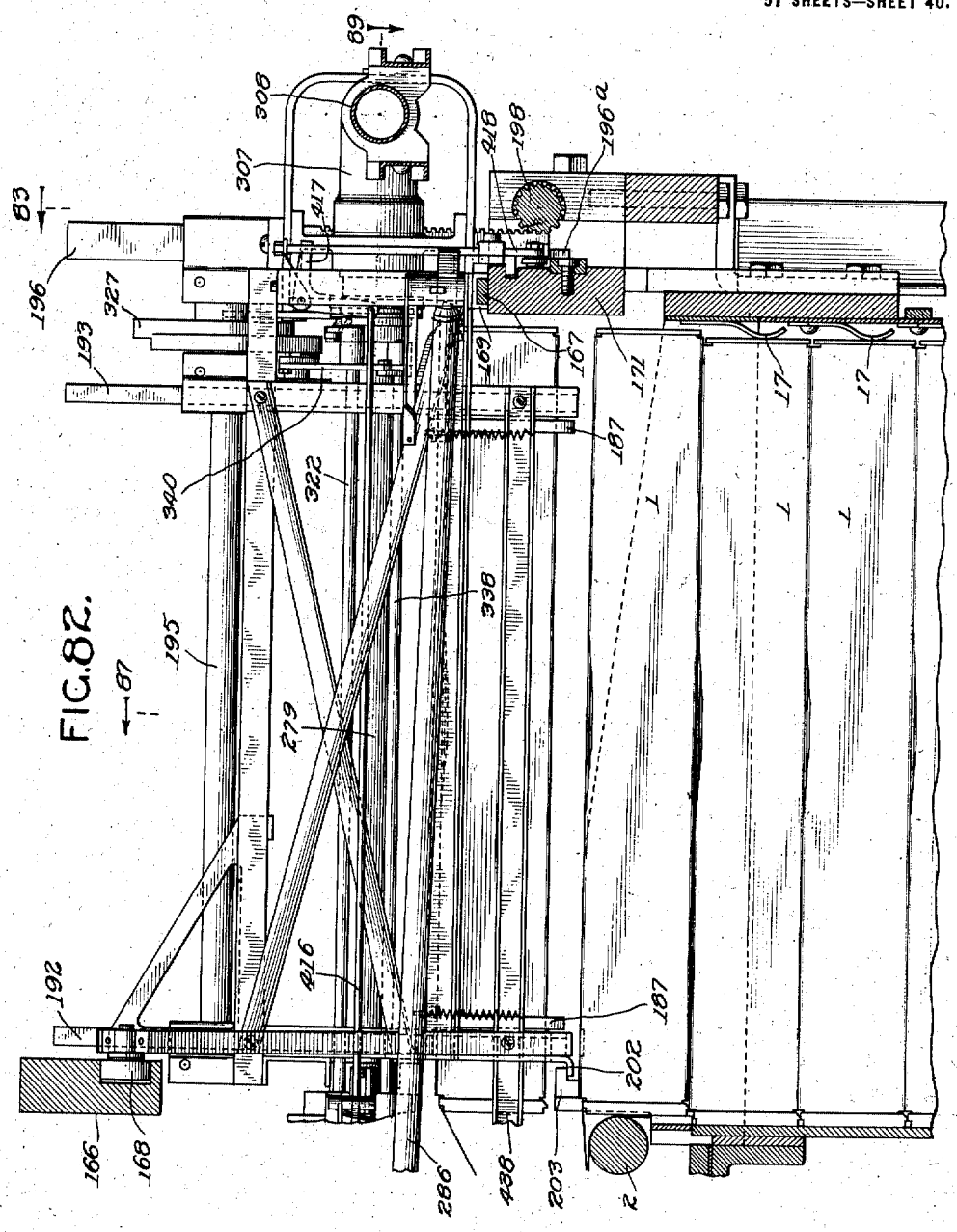

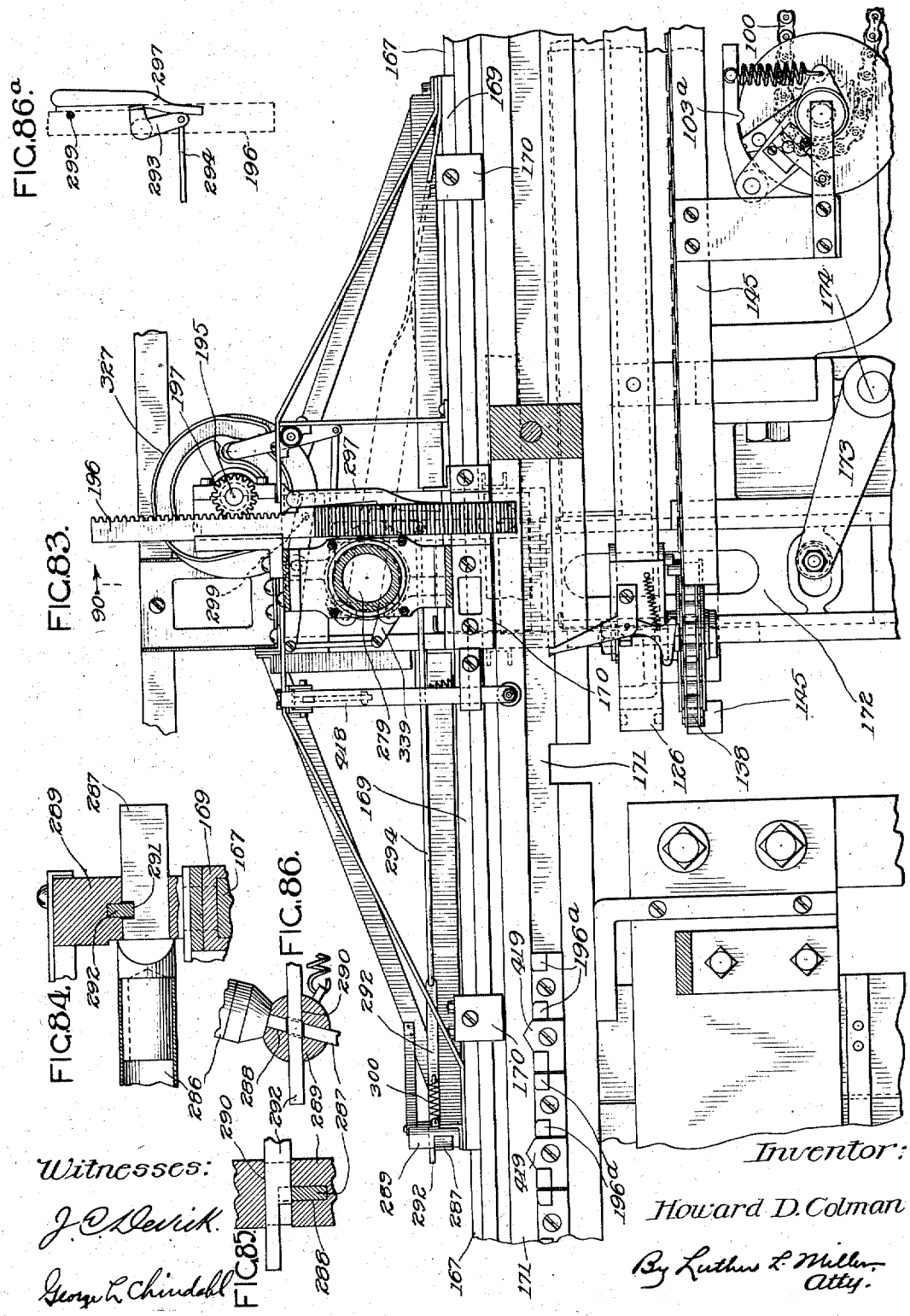

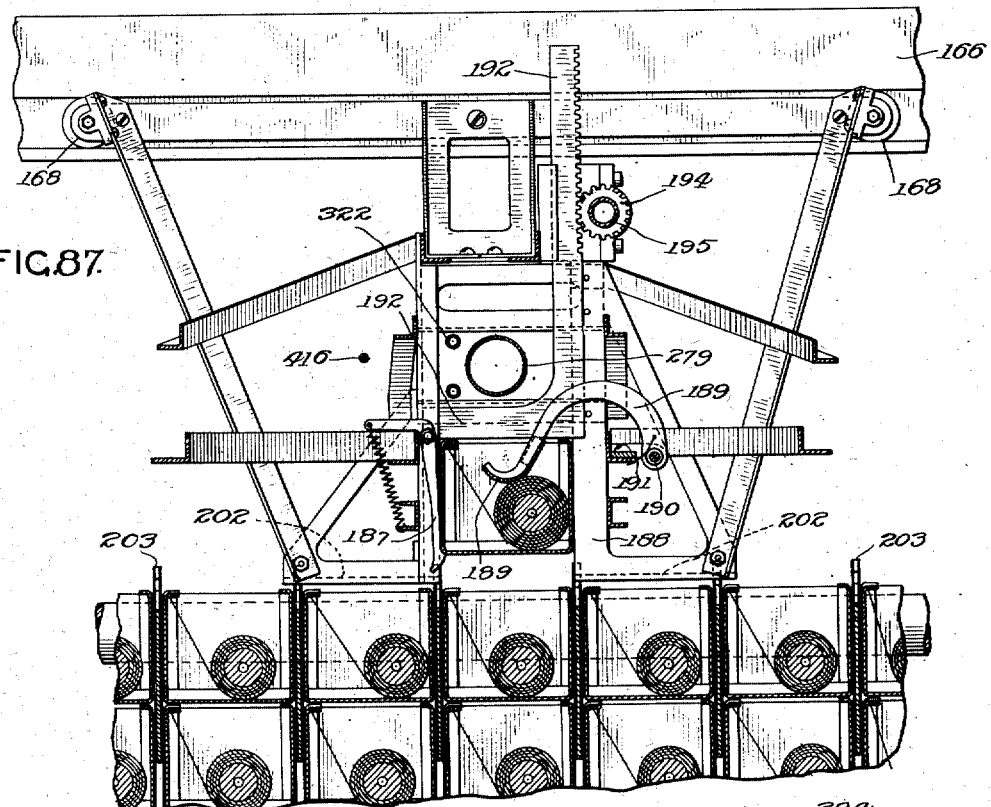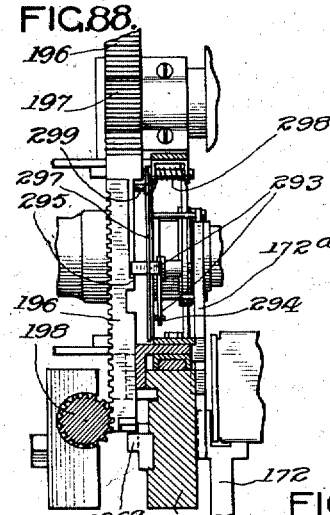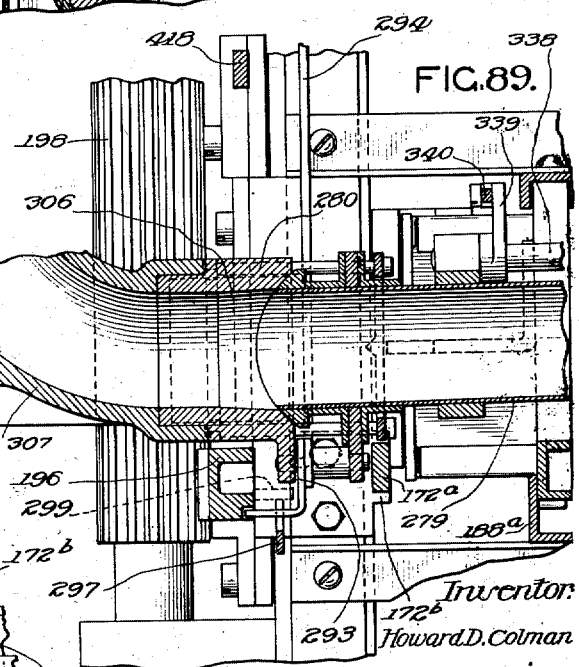

H. D. COLMAN.
WINDER.
APPLICATION FILED JUNE 28, 1913.

1,239,670.

Patented Sept. 11, 1917.
57 SHEETS—SHEET 43.

FIG. 90.

Witnesses:
J. C. Devick.
George L. Churdahl

Inventor:
Howard D. Colman
By Luther L. Miller
Atty.

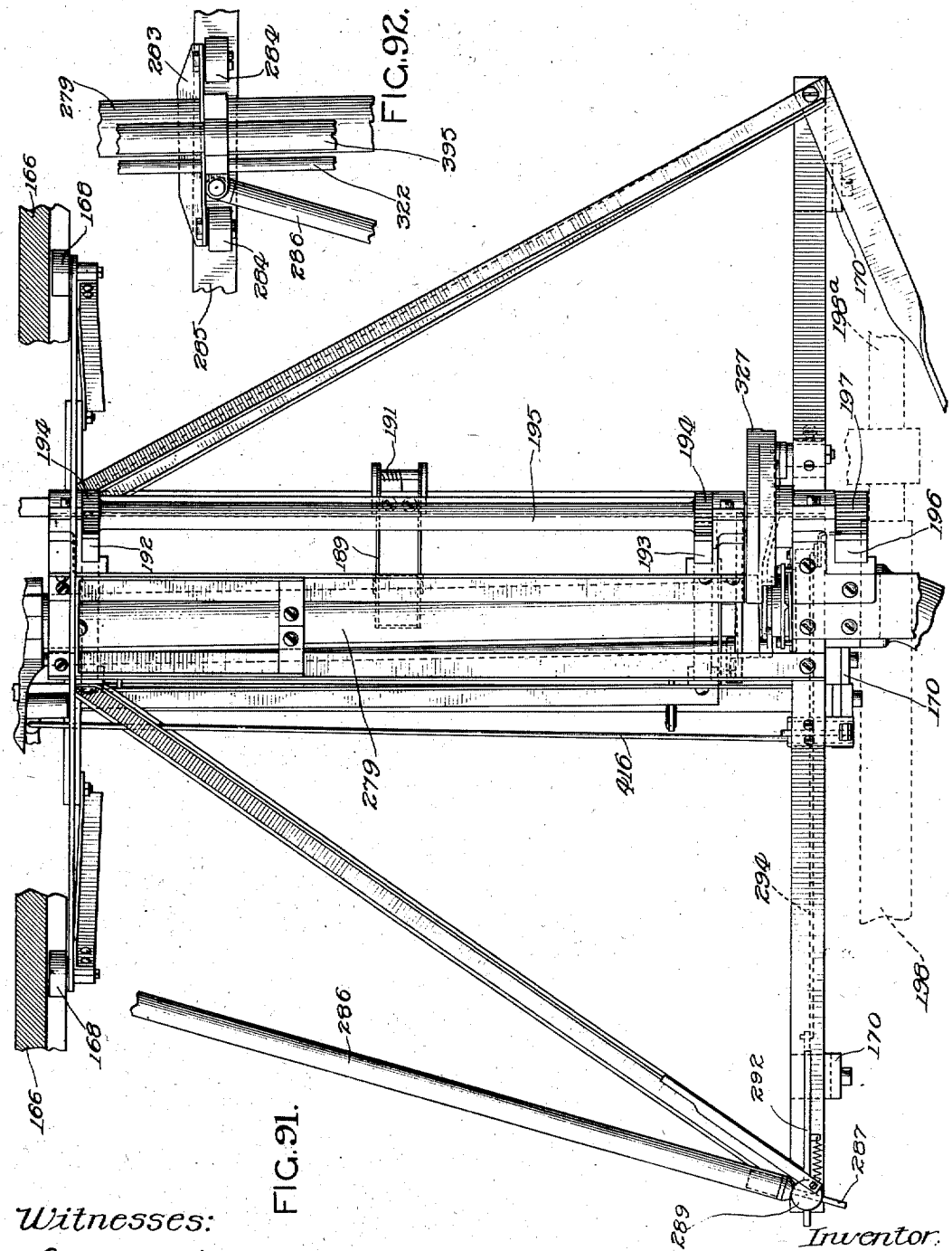

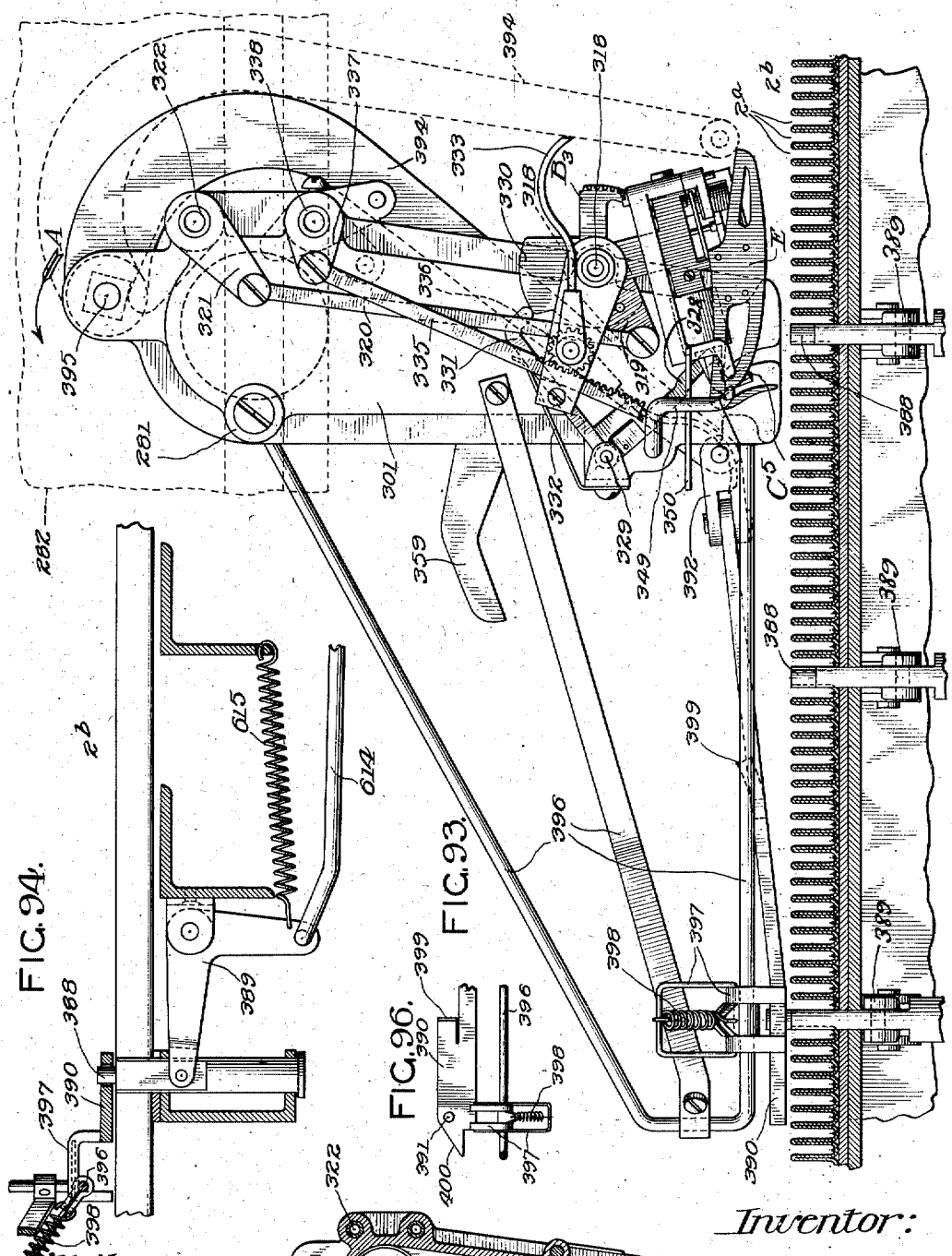
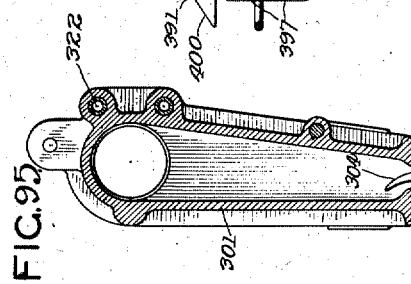

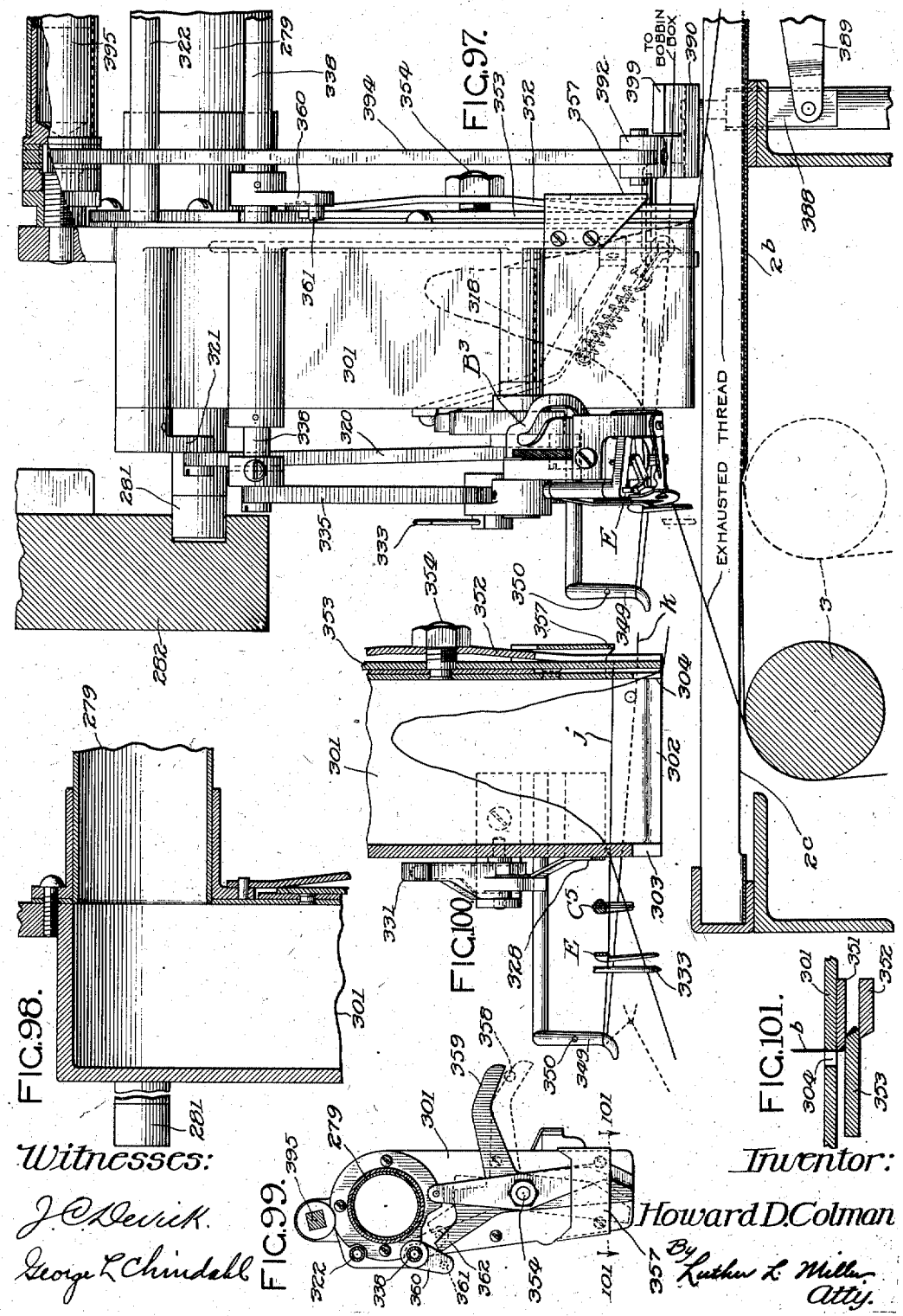

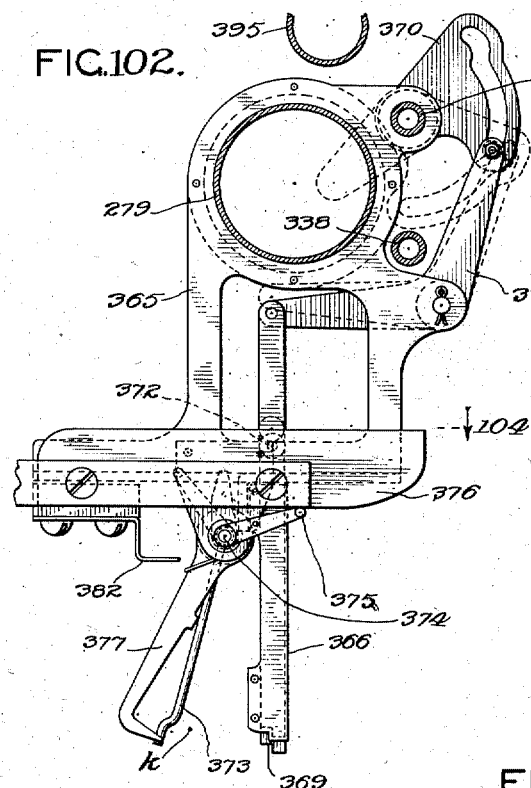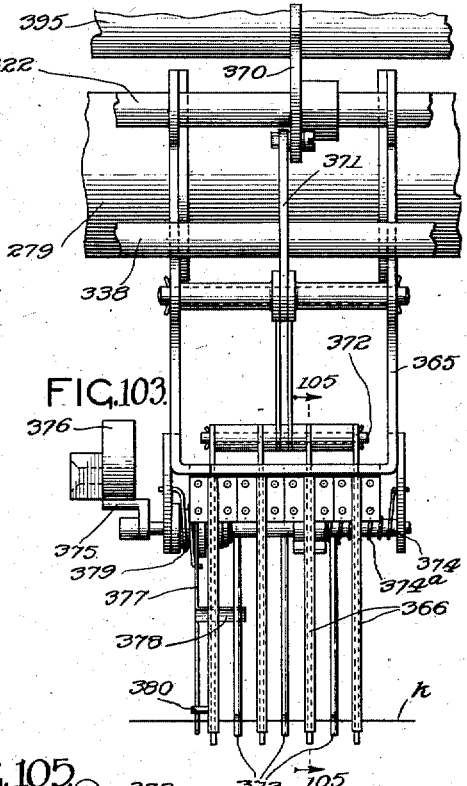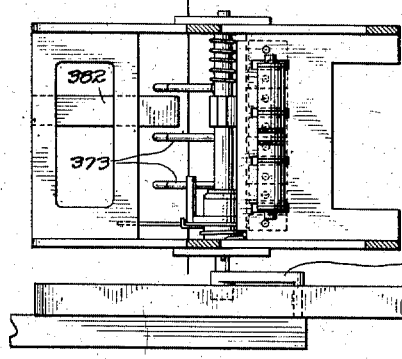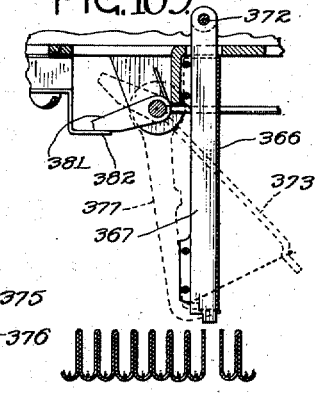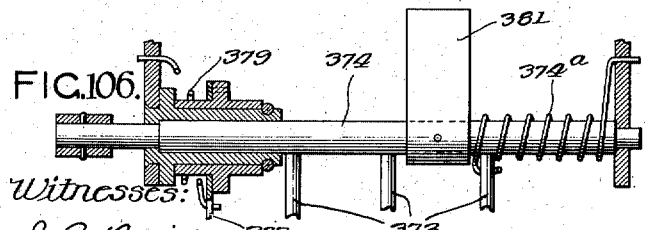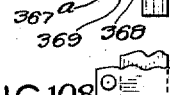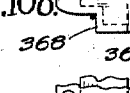

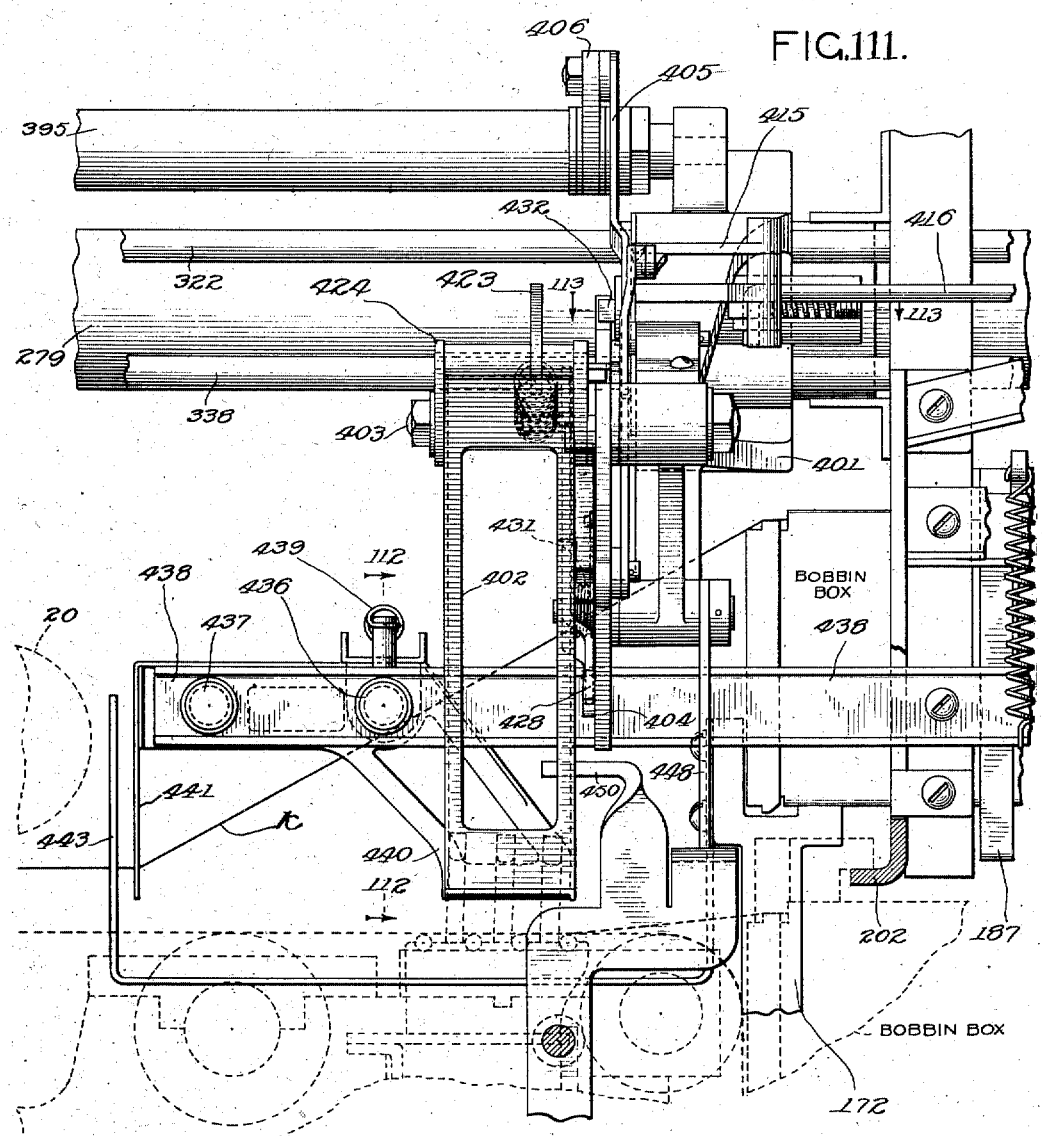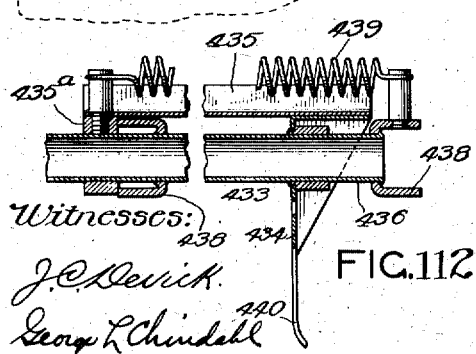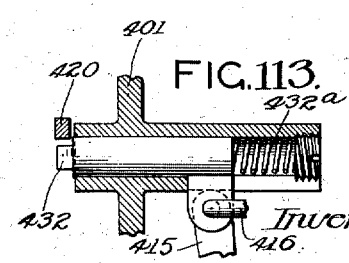

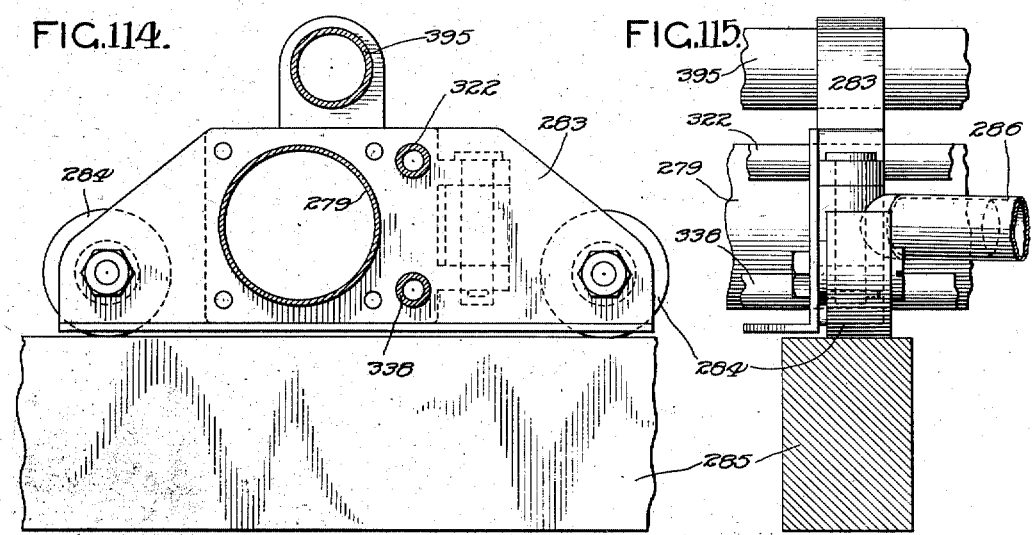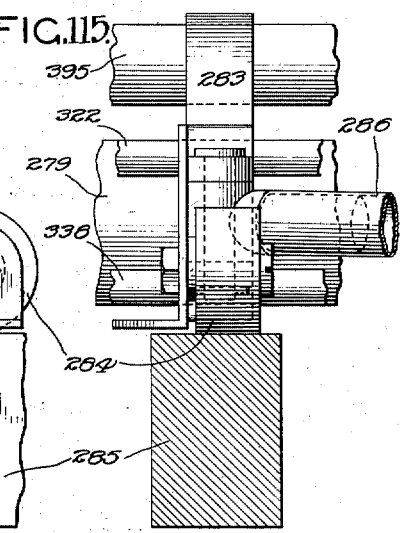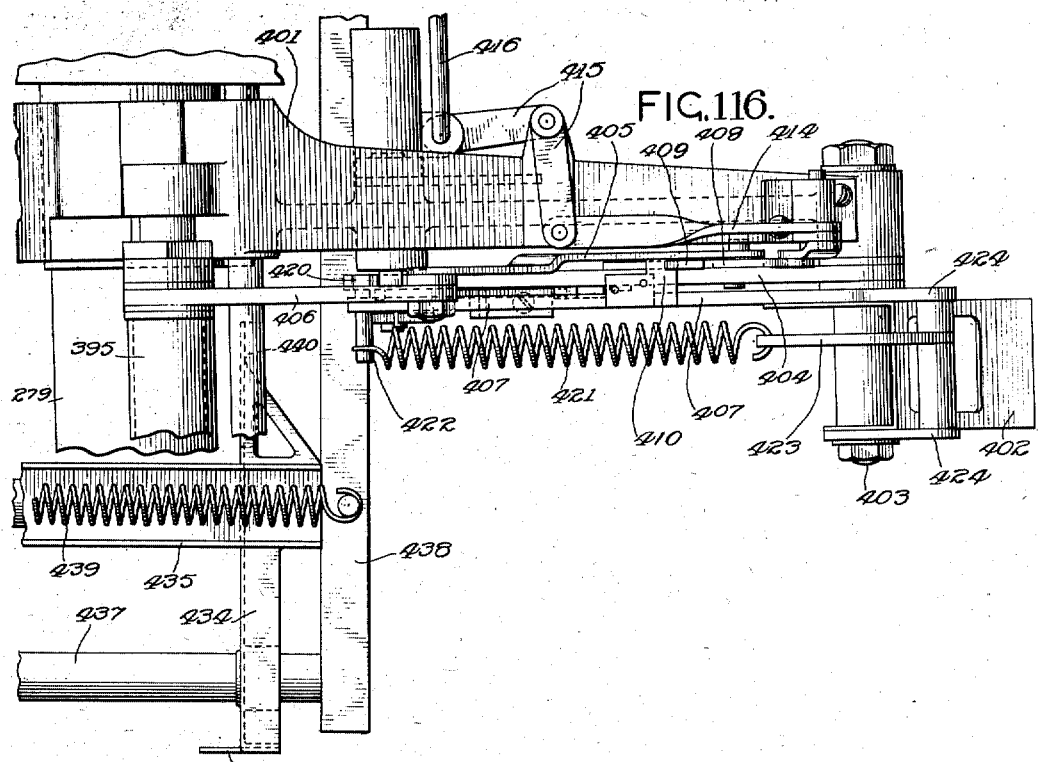

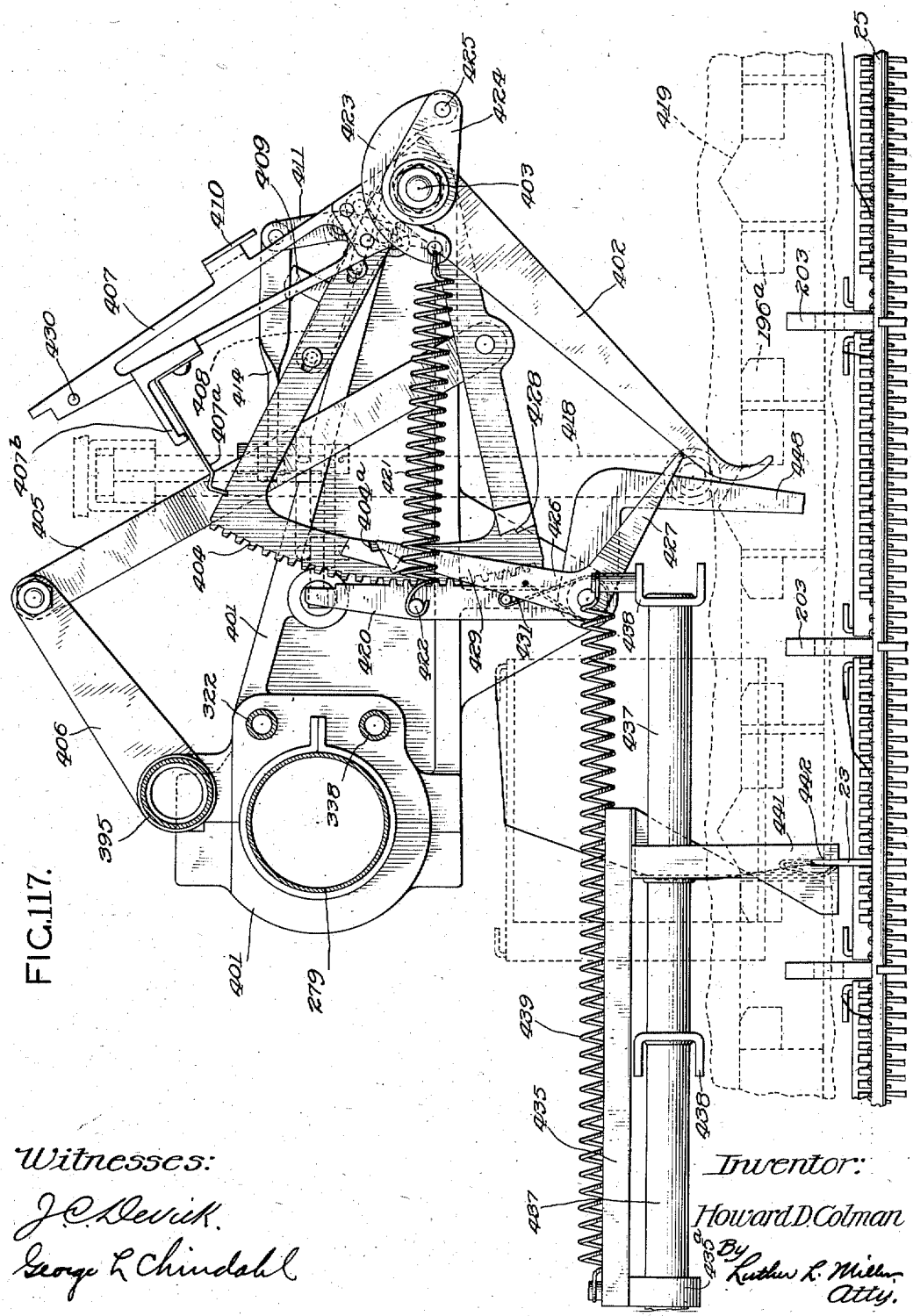

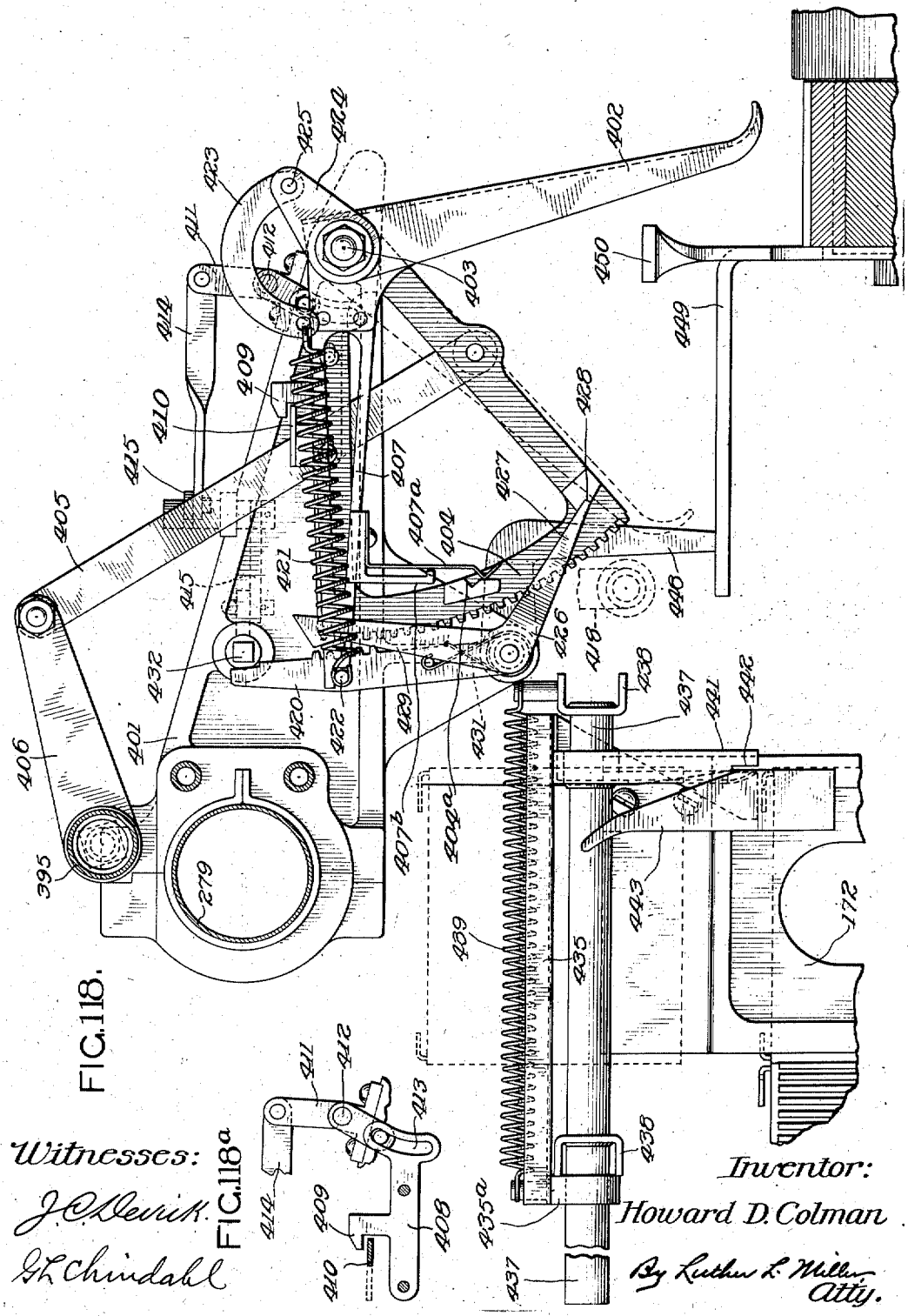

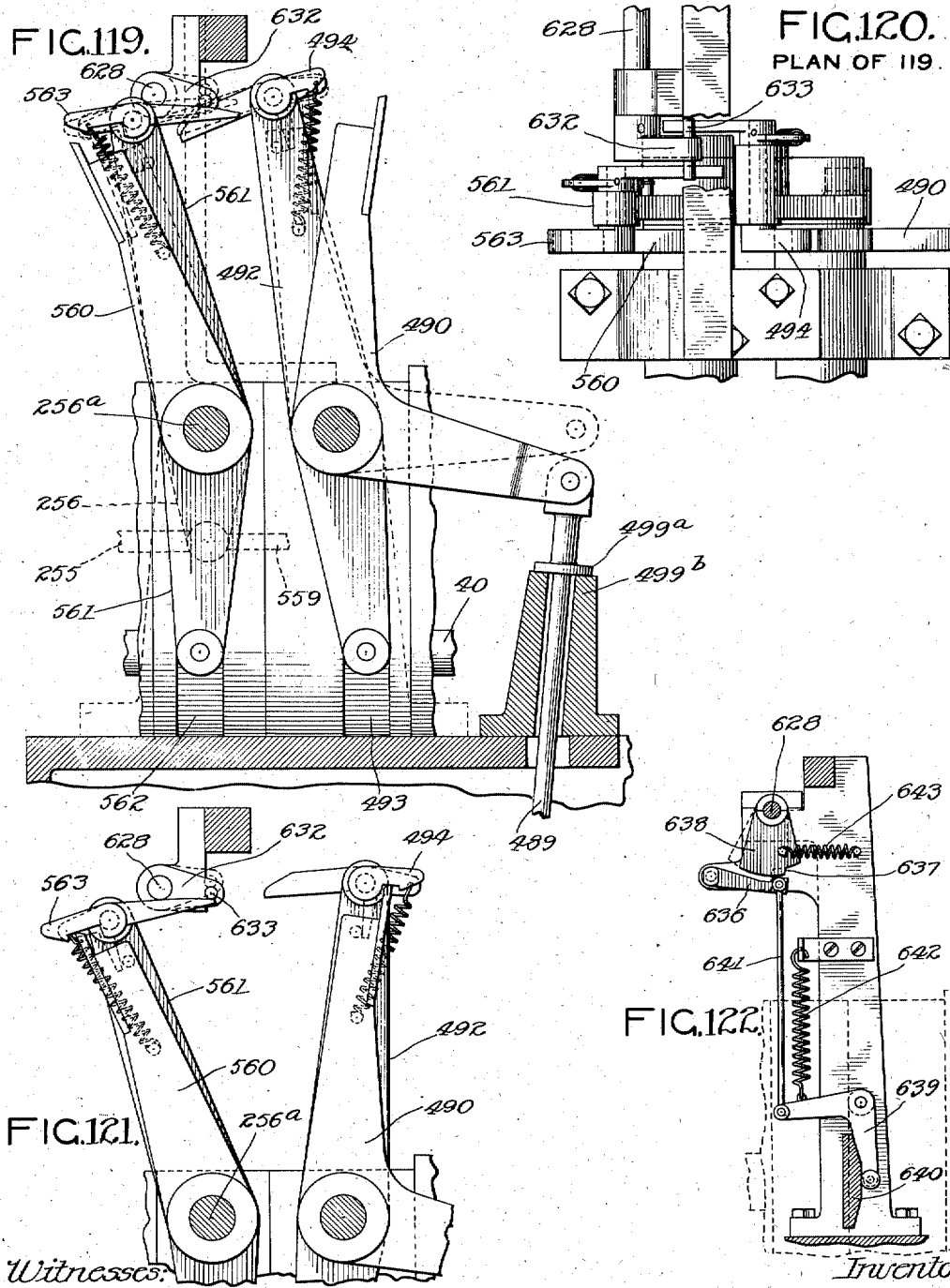

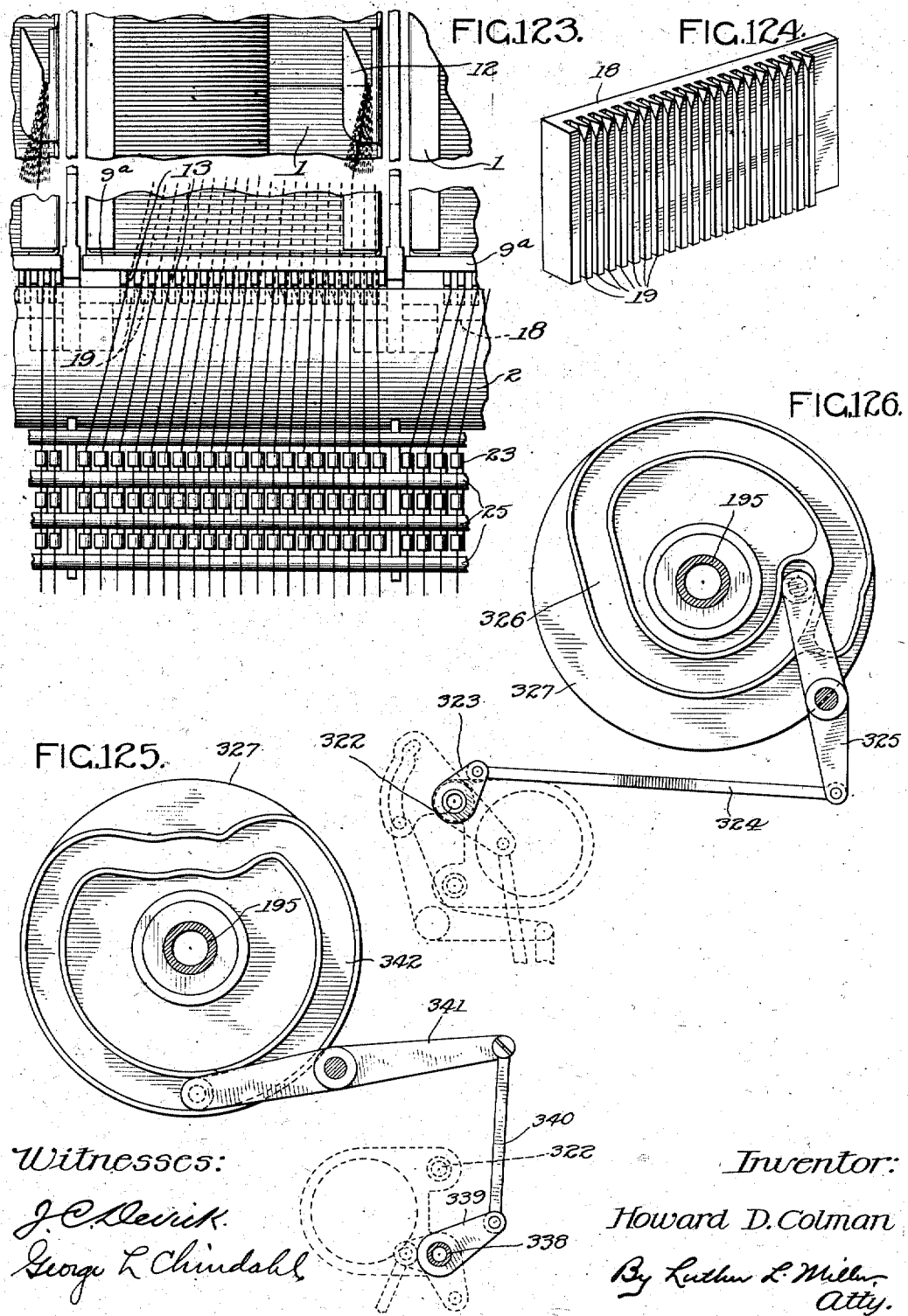

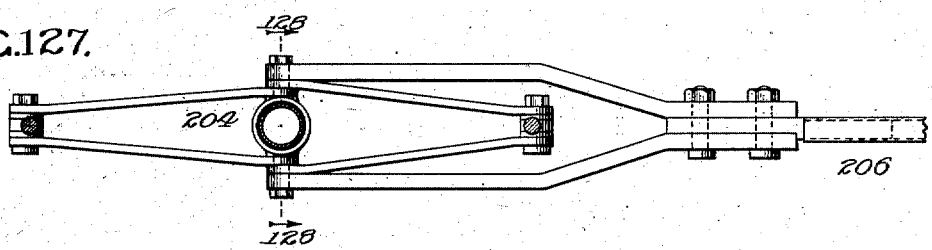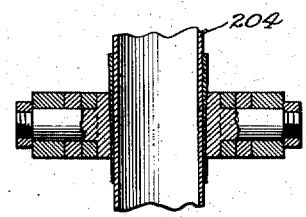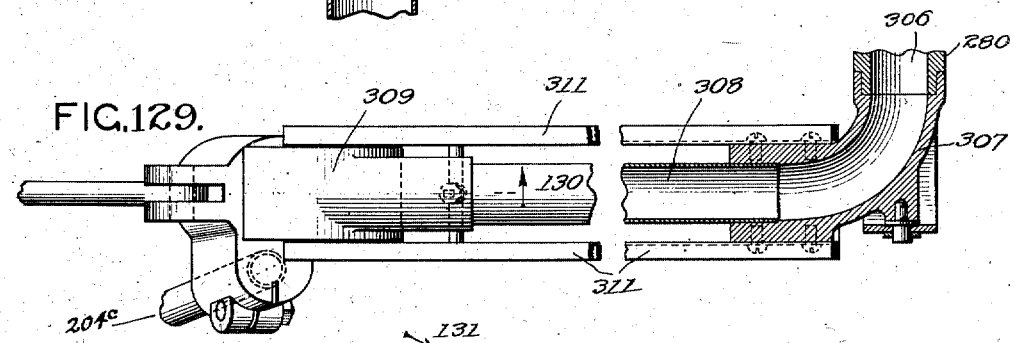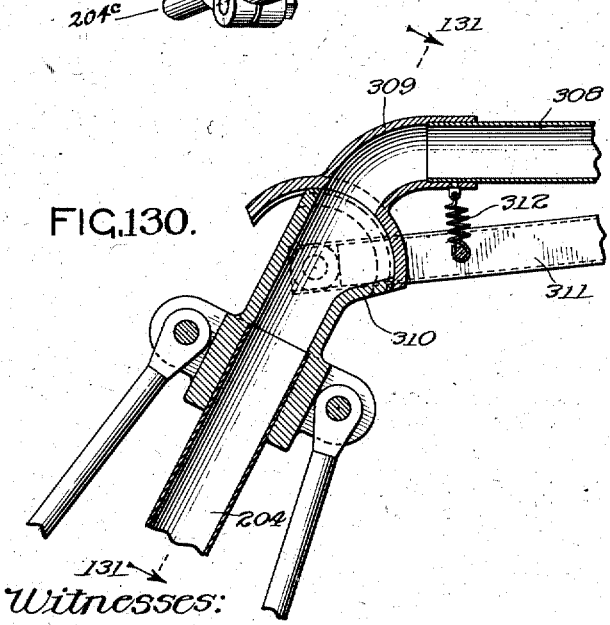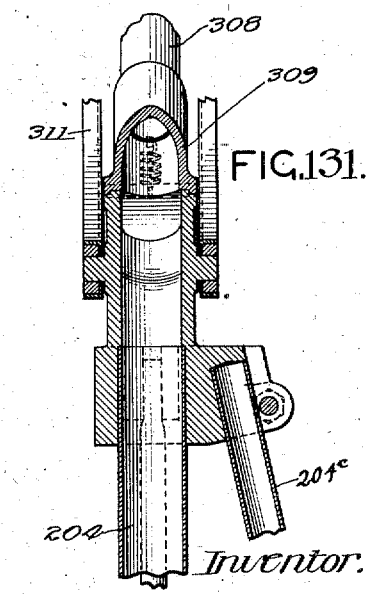

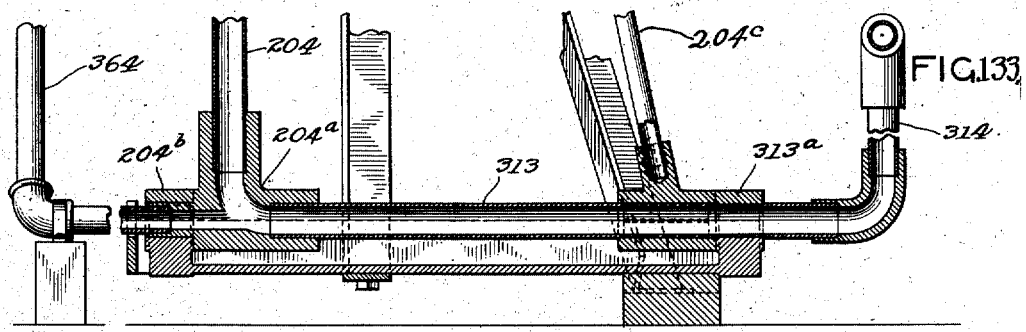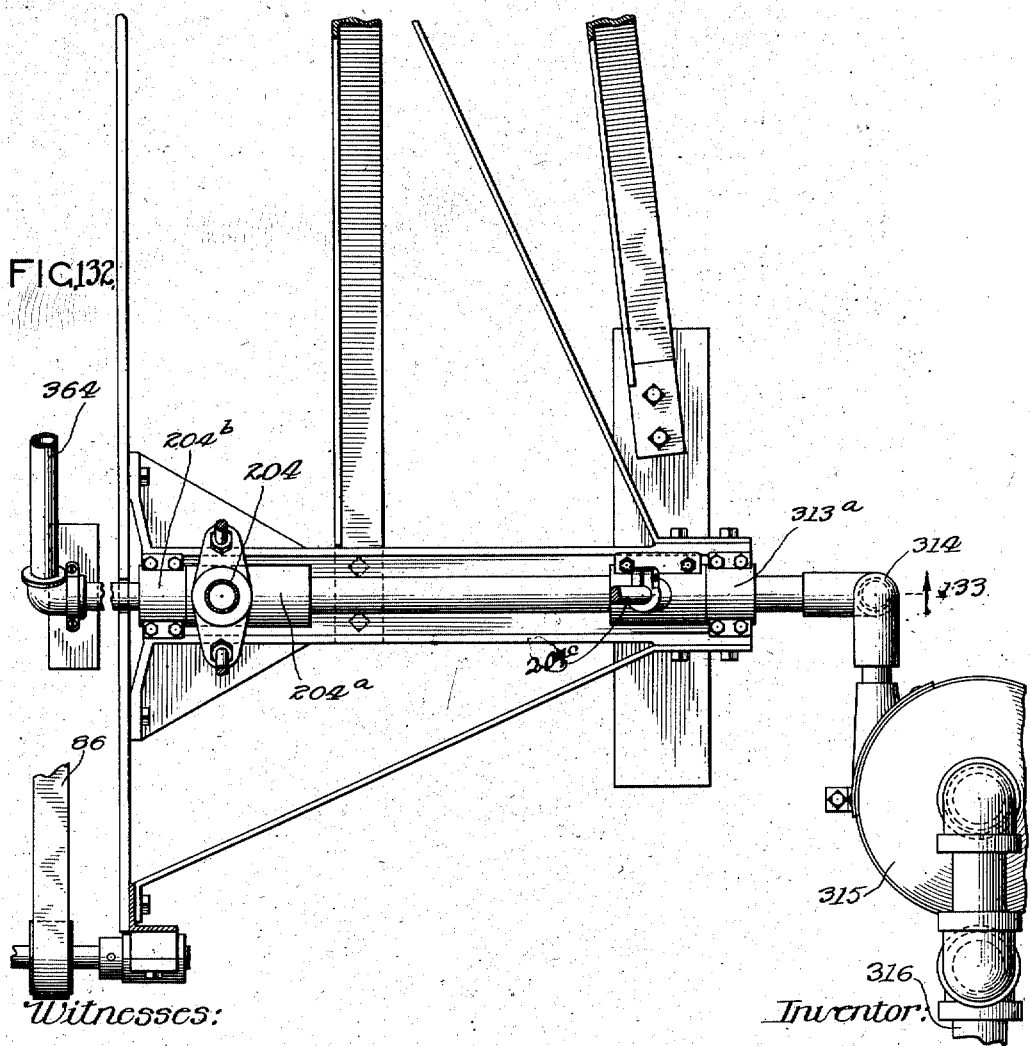

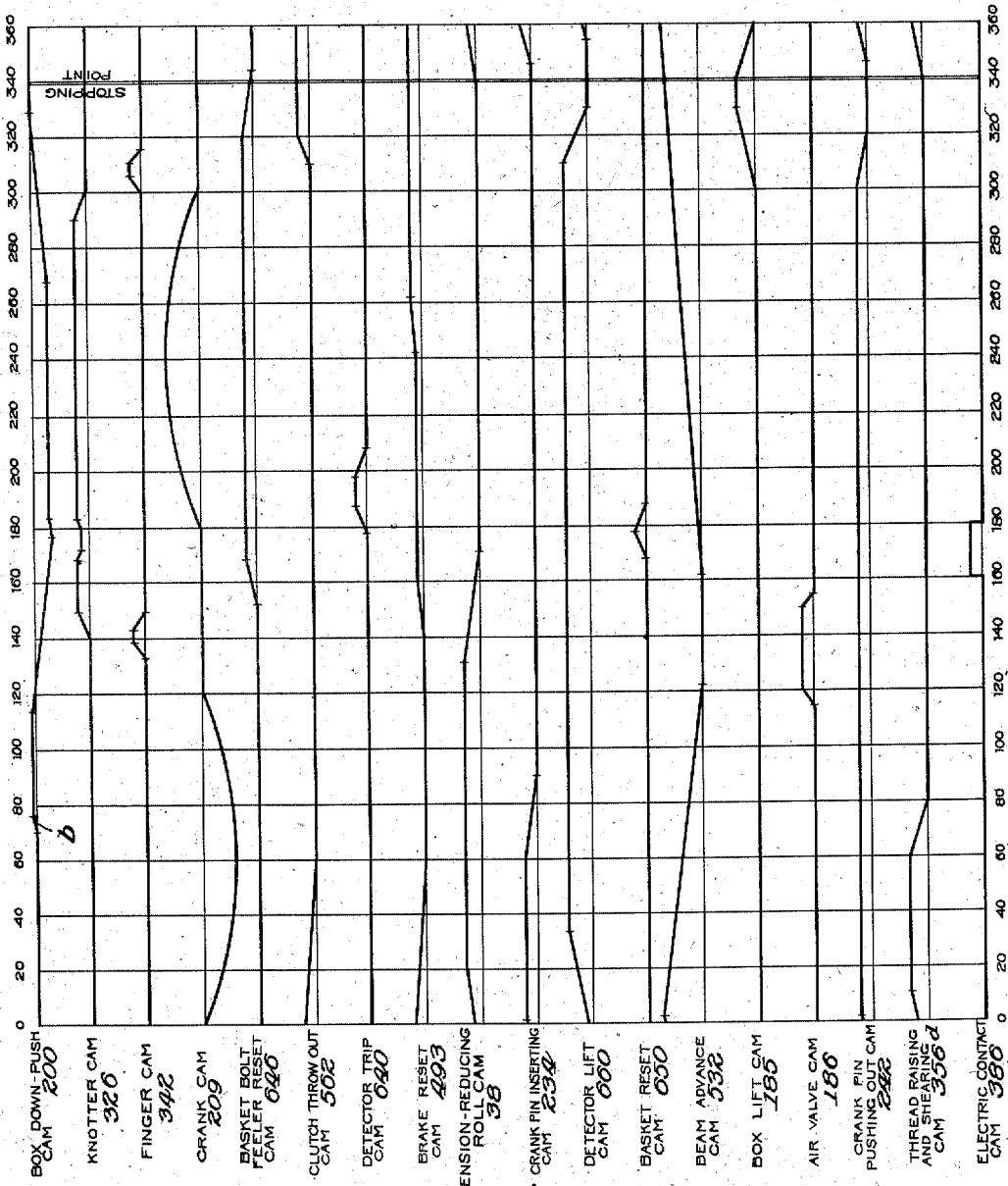

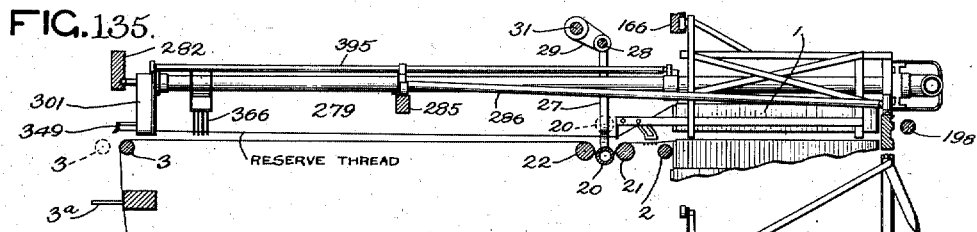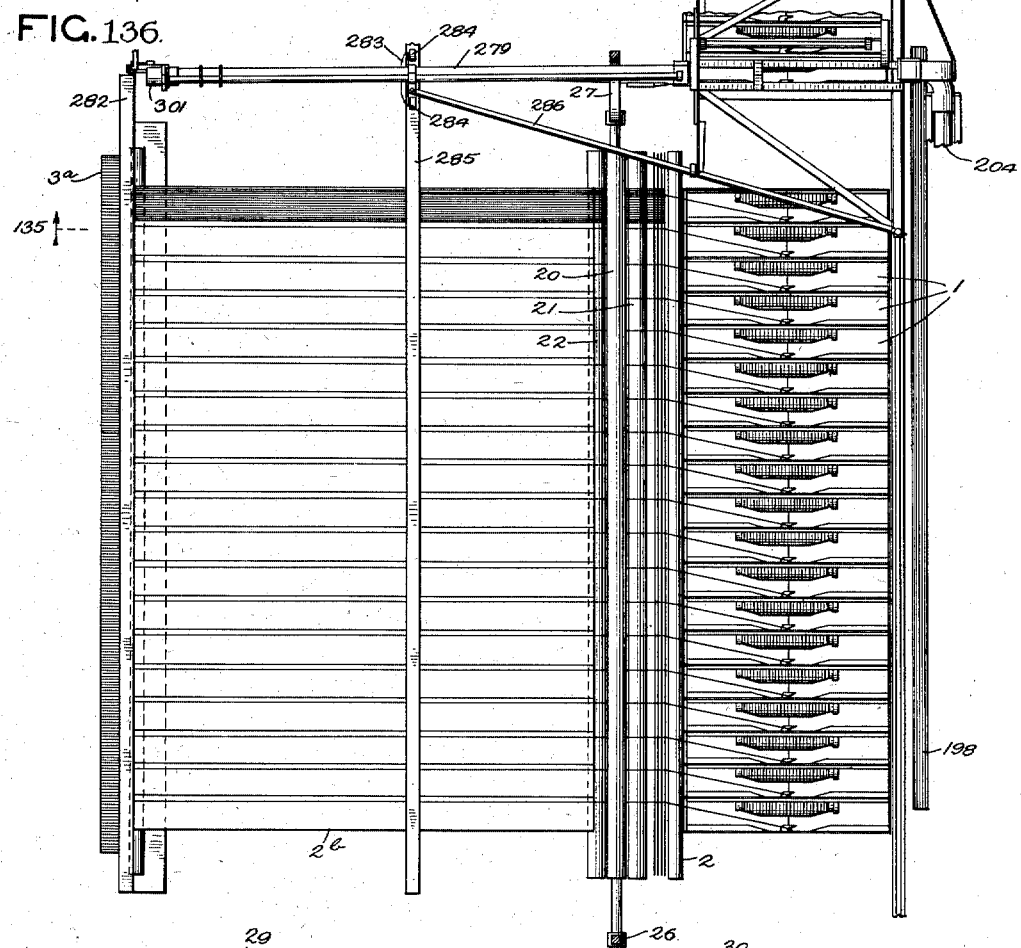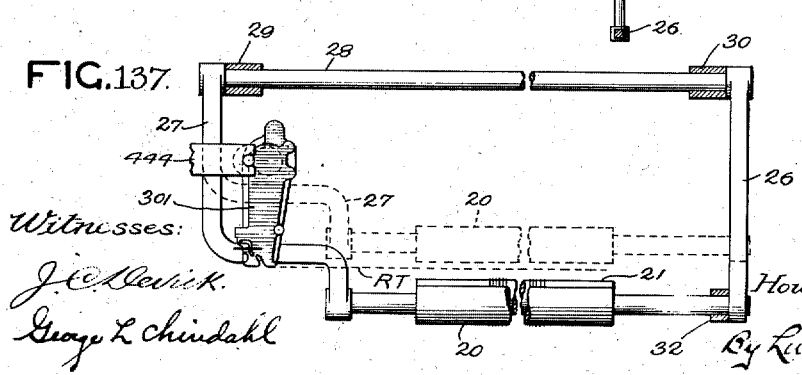

UNITED STATES PATENT OFFICE.

HOWARD D. COLMAN, OF ROCKFORD, ILLINOIS, ASSIGNOR TO HOWARD D. COLMAN, LUTHER L. MILLER AND HARRY A. SEVERSON, COPARTNERS TRADING AS BARBER-COLMAN COMPANY, OF ROCKFORD, ILLINOIS.

WINDER.

1,239,670.    Specification of Letters Patent.    Patented Sept. 11, 1917.

Application filed June 28, 1913. Serial No. 776,362.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

In the production of warp threads, as heretofore commonly practised, the fibers are spun into threads and the threads wound upon bobbins. The thread upon the bobbins is thereafter unwound from the bobbins and wound upon spools, the ends of the threads upon a number of bobbins being joined to make a long thread. The thread from a large number of spools is then wound upon a warp beam.

This invention contemplates the winding of the threads directly from the bobbins onto the beam, thereby eliminating the spooling process. Generally stated, the object of the invention is to provide means for directly winding from bobbins onto a beam with the greatest possible degree of automaticity.

In the accompanying drawings, Figure 1 is a right-hand side elevation of a winder embodying the features of my invention. Fig. 1$^a$ is a perspective view of one of a plurality of bobbin boxes comprised in the machine. Fig. 1$^b$ is a detail view of a certain cam. Fig. 2 is a front elevation of the machine, with the carriage and the operator's platform omitted. Fig. 2$^a$ is a view of a circuit-closer comprised in the machine. Fig. 3 is a rear elevation of the machine with parts omitted. Fig. 4 is a top plan view with the carriage and certain other portions omitted. Figs. 5 and 6 together constitute a top plan view of the means for rotating and braking the warp beam. Figs. 7 and 8, taken together, form a rear elevation of said rotating and braking mechanisms. Figs. 9 and 9$^a$ are fragmental top plan views showing different positions of a device for adjusting certain braking means. Fig. 10 is a fragmental view of an adjusting device for another braking means. Figs. 10$^a$ and 10$^b$ are fragmental elevations of the devices for adjusting said braking means. Fig. 10$^a$ is taken approximately in the plane of dotted line $a$—$a$ of Fig. 15. Fig. 11 is a fragmental sectional view taken in the plane of dotted line 11 of Fig. 12. Fig. 12 is a view taken in the plane of dotted line 12 of Fig. 11. Fig. 13 is a section on line 13 of Fig. 12. Fig. 14 is a section on line 14—14 of Fig. 13. Fig. 15 is a vertical sectional view of the devices for adjusting one of the braking means. Fig. 15$^a$ is a side view of certain parts shown in Fig. 15. Fig. 15$^b$ is a section on line $b$—$b$ of Fig. 15. Fig. 15$^c$ is a section on line $c$—$c$ of Fig. 15. Fig. 15$^d$ is a section on line $d$—$d$ of Fig. 15$^c$. Fig. 16 is a vertical section taken in the plane of dotted line 16 of Fig. 17, with parts omitted. Fig. 17 is a vertical sectional view, taken in the plane of dotted line 17 of Fig. 2, with parts omitted. Fig. 18 is a fragmental elevation, on an enlarged scale, of some of the parts shown in the upper portion of Fig. 1. Fig. 19 is a top plan view of the parts shown in Fig. 18. Fig. 20 is a section on line 20—20 of Fig. 18. Fig. 21 is a vertical sectional view of the detector mechanism and adjacent parts. Fig. 22 is a detail view, on an enlarged scale, of a part comprised in the detector mechanism. Figs. 23 and 24 are views similar to Fig. 21, the latter showing the parts in running position. Fig. 23 representing the position assumed immediately upon the exhausting of a thread, and Fig. 24 illustrating the parts in readiness for the placing of a new thread in position. Fig. 25 is a vertical sectional view taken approximately in the plane of dotted line 25 of Fig. 24, and on an enlarged scale. Fig. 26 is a horizontal sectional view taken substantially in the plane of dotted line 26 of Fig. 23. Fig. 27 is a fragmental perspective view of the basket-bolt feeler bar. Fig. 28 is a perspective view of one of the basket bolts. Fig. 29 is a view illustrating the operation of a detent for the basket-bolt feeler bar. Fig. 30 is a view taken from the side opposite to that shown in Fig. 18. Fig. 31 is a fragmental vertical view, looking from the right-hand side of Fig. 30. Fig. 32 is a horizontal sectional view illustrating a crank-pin setting and withdrawing mechanism. Figs. 32$^a$ and 32$^b$ illustrate portions of the crank-pin-selecting mechanism. Fig. 33 is a vertical section on line 33—33 of Fig. 32, showing the connecting rod and crank as locked in initial position. Fig. 34 illustrates the connecting rod and crank as unlocked, and a crank pin inserted into the rod. Fig. 34$^a$ illustrates the means for locking the crank and connecting rod in initial position.

Fig. 35 is a vertical view taken approximately in the plane of dotted line 35 of Fig. 2. Fig. 36 is a horizontal sectional view taken approximately in the plane of dotted line 36 of Fig. 35. Fig. 36ª is a vertical sectional view taken in the plane of dotted line a of Fig. 36. Fig. 37 is an elevation similar to that of Fig. 35, but with parts omitted. Fig. 38 is a section on line 38 of Fig. 37. Fig. 39 is a section on line 39 of Fig. 37. Fig. 40 is a section on line 40 of Fig. 37. Fig. 41 is a section on line 41 of Fig. 40. Figs. 42 and 43 are views illustrating the operation of the parts shown in Fig. 40. Fig. 44 represents a means for yieldingly arresting the rotation of the cam shaft shown in Figs. 35 to 41. Fig. 45 illustrates a means for closing an electric circuit, and thus causing a clutch to be thrown out in case the cam shaft is not properly arrested. Fig. 46 is a fragmental detail view of said arresting means. Fig. 47 is a section on line 47—47 of Fig. 44. Fig. 48 is a section on line 48 of Fig. 47. Fig. 49 is a section on line 49 of Fig. 44. Fig. 50 is a vertical sectional view illustrating a means for slowly rotating or advancing the warp beam to take up slack in the threads after the knot-tying operation. Fig. 51 is a sectional view taken in the plane of dotted line 51 of Fig. 50. Fig. 52 illustrates a ratchet mechanism comprised in said beam-advancing means. Fig. 53 is a section on line 53 of Fig. 52. Fig. 54 is a section on line 54 of Fig. 53. Fig. 55 is a side elevation of a means to prevent the yarn mass on the warp beam from becoming eccentric. Fig. 56 is a fragmental top plan view of said means. Fig. 57 is a view similar to Fig. 55, but showing the parts in a different position. Fig. 58 is a fragmental front elevation of said means. Fig. 59 is a section on line 59—59 of Fig. 58. Fig. 60 is a section on line 60 of Fig. 59. Fig. 61 is a vertical sectional view illustrating a conveyer and an elevator for boxes containing exhausted bobbins. Fig. 62 is a horizontal section in the plane of dotted line 62—62 of Fig. 61. Fig. 63 is a fragmental vertical sectional view of a column of bobbin boxes, showing also the conveyer that receives boxes discharged from the column. Fig. 64 is a horizontal sectional view of several columns. Fig. 65 is a vertical sectional view, taken in substantially the same plane as Fig. 61. Fig. 66 is a vertical sectional view in the plane of dotted line 66 of Fig. 65. Fig. 67 is a top plan view of some of the parts shown in Fig. 65. Fig. 68 is a fragmental elevation of certain clamp carriers and the means for moving and guiding them. Fig. 68ª is a sectional view taken approximately in the plane of dotted line a in Fig. 68. Fig. 69 is a side elevation of another portion of said moving and guiding means, showing also some of the clamp carriers and other devices, Fig. 69 being a view taken approximately in the plane of dotted line 69 of the plan view, Fig. 70. Fig. 70, as stated, is a top plan view of parts shown in Fig. 69. Fig. 71 is a section on line 71—71 of Fig. 70. Figs. 72, 73 and 74 are views illustrating the operation of the device shown in Fig. 71. Figs. 75 and 76 illustrate a means for removing waste thread ends. Fig. 77 is a fragmental plan view, on an enlarged scale, of certain parts shown in Fig. 4, the view being taken in the plane of dotted line 77—77 of Fig. 80. Fig. 78 is a sectional view illustrating a lock for a certain carriage arm, the view being taken in the plane of dotted line 78—78 of Fig. 80. Fig. 79 is a view of a releasable connection between the two sections of the connecting rod hereinbefore referred to. Fig. 80 is a front elevation of the parts shown in the plan view, Fig. 77. Fig. 81 is a view of a releasable connection between the parts of a certain actuating mechanism. Fig. 82 is a right-hand side elevation of the carriage that moves bobbin boxes to the various columns. Fig. 83 is a rear view taken substantially in the plane of dotted line 83 of Fig. 82, but showing the carriage in initial position. Figs. 84, 85 and 86 are views of a lock for the carriage arm hereinbefore referred to. Fig. 86ª is a view of a means for operating said lock. Fig. 87 is a vertical section on line 87 of Fig. 82. Fig. 88 is an elevation of certain parts, the view being taken from the side opposite to that seen in Fig. 82. Fig. 88ª is a view of a carriage-locking and alining device. Fig. 89 is a horizontal sectional view taken in the plane of dotted line 89 of Fig. 82. Fig. 90 is a vertical sectional view taken in the plane of dotted line 90 of Fig. 83. Fig. 91 is a top plan view of the carriage. Fig. 92 is a view of a support for the carriage arm. Fig. 93 is a front view of the knot-tying mechanism and the means for positioning said mechanism with relation to the groove in which the exhausted thread lies. Fig. 94 is a fragmental sectional view of said positioning means. Fig. 95 is a sectional view of the tubular member upon which the knot-tying mechanism is mounted. Fig. 96 is a fragmental top plan view, on a reduced scale, of the means for positioning the knot-tying mechanism. Fig. 97 is a right-hand side view of the knot-tying mechanism and related parts. Fig. 98 is a fragmental sectional view of said tubular member, the carriage arm, and a shear mounted on said member. Fig. 99 is a rear side view of said member and shear. Fig. 100 is a view illustrating the position of the exhausted thread and the reserve thread at about the commencement of the tying operation. Fig. 101 represents the operation of the shear. Fig. 102 is a front view of a device which serves as a slack take-up, a detector and a thread-holder. Fig. 103 is a right-hand side view of said device. Fig. 104 is a sectional view of said device, taken in the plane of dotted line 104 of Fig. 102. Fig. 105 illustrates the operation of said device as a slack-take-up and detector, the view being taken in the plane of dotted line 105—105 of Fig. 103. Fig. 106 is a vertical sectional view taken in the plane of the pivot shaft of said device. Figs. 107 to 110 illustrate the operation of said device in casting off the thread after the latter has been united to the exhausted thread. Fig. 111 illustrates the operation of inserting a bobbin box into the carriage, and of placing the thread in proper relation to devices which serve to position the thread with reference to the detector for the exhausted thread. Fig. 112 is a section on line 112—112 of Fig. 111. Fig. 113 is a sectional view in the plane of line 113—113 of Fig. 111. Figs. 114 and 115 are respectively front and right-hand side views of the device shown in the top plan view entitled Fig. 92. Fig. 116 illustrates in top plan view some of the parts shown in the side view, Fig. 111. Fig. 117 is a front view of parts illustrated in Fig. 116, the parts being in a different position. Fig. 118 is a front view of the parts as shown in Fig. 111. Fig. 118ª is a detail view of a certain latch which is also shown in Fig. 118. Fig. 119 is a left-hand side view of certain controlling devices, these parts also being shown in Fig. 35. Fig. 120 is a top plan view of the parts shown in Fig. 119. Fig. 121 is a view similar to Fig. 119, but representing the parts in another position. Fig. 122 is a view of devices for operating one of the elements of the detector mechanism. Fig. 123 is a fragmental top plan view indicating the course taken by the yarn in passing from a bobbin to the detector. Fig. 124 is a perspective view of a grooved plate forming a part of the means for guiding the threads to the detector mechanism. Fig. 125 is a view of the cam and connections for operating the thread shear and a device for raising the threads into the knotter. Fig. 126 is a view of a cam and connections for operating the slack-take-up device. Fig. 127 is a view showing the connection between the connecting rod hereinbefore alluded to and a certain tubular swinging arm. Fig. 128 is a section on line 128—128 of Fig. 127. Fig. 129 is a view of the connection between said arm and the carriage. Fig. 130 is a view taken in the plane of dotted line 130 of Fig. 129. Fig. 131 is a section on line 131—131 of Fig. 130. Fig. 132 is a fragmental plan view showing the support for said swinging arm and its connection with a waste-thread receptacle. Fig. 133 is a vertical section on line 133 of Fig. 132. Fig. 134 is a chart illustrating the relative time of operation of the principal cams. Fig. 135 is a fragmental vertical sectional view taken approximately in the plane of dotted line 135 of Fig. 136. Fig. 136 is a fragmental plan view showing the carriage in the initial position. Fig. 137 is a fragmental front elevation of certain thread-engaging rolls and the knotter support.

The embodiment herein shown of the invention is adapted to unwind simultaneously three hundred and eighty bobbins. Each bobbin is contained within an individual box 1 (see Fig. 1ª), the boxes being arranged in nineteen tiers or columns. Each column, in the form herein shown, contains a number of surplus boxes (in this instance, eight) for a purpose to appear hereinafter. The total number of bobbin boxes in each column, therefore, is twenty-eight. The columns are arranged side by side. One end of the series of columns may be seen in Fig. 1, the rear side of the series of columns being shown in Fig. 3. It will be seen that the several columns of bobbin boxes, with the structure in which they are located, constitute a creel. When the machine is operating normally, the strands of yarn from three hundred and eighty bobbins in the series of columns extend upwardly over a roll 2 (Fig. 21), thence through a mechanism for detecting the exhaustion of the threads, thence through a set of live rolls, thence through grooves 2ª (Figs. 31 and 93) in a horizontal table or troughing 2ᵇ, thence through elongated openings 2ᶜ (Fig. 97), said openings being formed by cutting away the bottom wall of the grooves 2ª at the front end of the troughing, thence over a roll 3 (Figs. 18 and 19), and through a guide comb 3ª to the warp beam 4 (Fig. 1).

I shall herein use the term "exhausted thread" to indicate a thread which has been completely unwound from its bobbin or which has broken before it was entirely unwound.

When a thread coming from a box in any column exhausts, mechanisms are set in action to place on said column a box containing a full bobbin, to discharge from the lower end of the column a box containing an empty bobbin, and to unite the thread from the full bobbin to the exhausted thread. I provide surplus boxes in each column, in order that each thread shall certainly be exhausted before its box is forced from the bottom of the column.

The bobbin boxes are herein shown as formed of sheet metal, each box having two sides 5 and 6, a bottom 7, and two ends 8 and 9, the upper side of the box being open. On the upper edges of the side walls are inturned flanges 10 and 11, the wall 5 being also provided with a thread-guide and clearer 12. Fixed to the end wall 9 is a plate 9ª provided with twenty vertical grooves 13 (Fig. 69). When bobbin boxes are stacked one upon another, the grooves 13 on one box aline with those on adjacent boxes, and thus a series of continuous grooves or channels are provided through which the threads pass upwardly to the roll 2. The strand from a given bobbin extends to the hook 12 of the box in which said bobbin is contained, thence to a groove in the end of the box next above the first mentioned box, and thence through the alined grooves of the superimposed boxes to the roll 2.

Each bobbin box is preferably about twice the length of a bobbin, and the yarn guide 12 is located approximately midway of the length of the box; thus the bobbin is free to reciprocate longitudinally within the box into the positions where its winds of yarn may pass to the guide 12 with the least resistance.

The boxes in the columns are confined against lateral and endwise displacement. In the present embodiment the columns are arranged within a rigid framework which may be of any suitable construction, and which is herein shown as comprising vertical guides 14 and 15 (Fig. 64) which space the columns apart, vertical guide plates 16 which prevent forward displacement of the boxes, and a plurality of vertical series of curved leaf springs 17 arranged to bear against the rear ends of the bobbin boxes and press said boxes against the front guide plates 16. The pressure of the springs 17 is sufficient to hold the boxes in position against the action of gravity. The plates 16 coöperate with the grooved plates 9ª to form closed individual channels for the threads.

Between the roll 2 and the upper ends of the front guide plates 16 are guide-sections or shims 18 (Fig. 21) each provided with twenty vertical grooves 19 (Fig. 124) arranged to register with the grooves 13 in the front end of the top box of the column. By reference to Fig. 21 it will be seen that all of the bobbin boxes (except the top box) are vertically alined, the bottoms of the grooves 13 being approximately tangent to the roll 2, thus keeping the threads away from the guide plates 16. The shim 18, which projects rearwardly of the vertical plane of the plates 16, is provided to keep the top box out of contact with the roll 2. As the top box is moved downwardly to make room for another box containing a full bobbin, the first mentioned box is pressed forward by the adjacent spring 17, as soon as said first mentioned box has passed below the shim 18, into contact with the adjacent front guide 16.

By reference to Fig. 123 it will be seen that the grooves in the end of each bobbin box and the grooves in the shim 18 are located to correspond with the positions assumed by the threads when extending from the hook 12 on the box to the detectors to be hereinafter described. Thus when the box is pushed down into the column by the placing of another box on the column, the thread passes into the proper groove in said added box (the top box). When still another box is placed on the column, the thread enters the proper groove in the shim 18.

In order to insure that thread-breakages shall not occur where the mechanism cannot tie a new thread to a broken thread, I provide a set of three live rolls 20, 21 and 22 (Fig. 21) through which set of rolls the threads pass, all of said rolls being continuously driven at a peripheral speed exceeding the speed of winding. Owing to the tendency of the rolls 20, 21 and 22 to feed the yarn, there is less tension in the portion of the threads extending between the roll 22 and the warp beam 4, than in the region between the roll 21 and the bobbins. If there be defective places in any of the threads which are likely to cause breakage, these threads will break in the region of greater tension, to wit, between the bobbins and the roll 2.

In order to detect exhausts due to breakage or to the unwinding of the bobbins, I provide a detector mechanism located between the rolls 2 and 21. This mechanism comprises a series of detectors 23, one for each strand. In this instance, the detectors are formed of sheet metal and each has a plurality of hooks 24 (Fig. 25) by means of which the detector is suspended upon a thread. The detectors are guided in slots 23ª (Fig. 25) formed in fixed plates 23ᵇ. To prevent accumulation of dust and lint in these slots, the detector mechanism is provided with an inclosing casing 23ᶜ (Fig. 21) into which air is forced by suitable means (not shown), thus blowing lint and dust away from the detectors.

The threads are prevented from sagging, due to the weight of the detectors, by means of a plurality of rods 25, stationarily supported in the machine, said rods being spaced apart to accommodate the hooks 24.

The exhausted thread should not be excessively long, hence the provision of three hooks upon each detector in order that the detector shall remain up until the end of the exhausted thread reaches the detector.

The roll 20 is journaled in the lower ends of two links 26 and 27 (Figs. 18, 35 and and 137), said links being fixed at their upper ends to a rod 28, which is pivotally mounted in two arms 29 and 30 (Figs. 1 and 35). The arms 29 and 30 are fixed upon a rock shaft 31 which is journaled in bearings in the supporting framework. 32 (Fig. 18) is an arm pivoted at 33 and connected to one journal of the roll 20, and serving to guide the latter in its rising and falling movements. The roll 20 is raised above the path of the reserve thread when said thread is to be tied to an exhausted thread and lowered after the thread-uniting operation has taken place, by means comprising a crank arm 34 (Fig. 35) fixed upon the rock shaft 31 and connected by means of the link 35 to a bell crank 36 (Figs. 36 and 37) pivotally supported by a bracket 37. One arm of said bell crank carries a roller that lies within the cam groove 38 of a cam 39, fixed upon a shaft 40. This shaft is rotated at times by means comprising a spur gear wheel 41 fixed on said shaft and meshing with a pinion 42 upon a shaft 43. To the shaft 43 is secured a spur gear 44, that meshes with a pinion 45 fixed upon one section of a divided shaft 46. The sections of said shaft are arranged to be clutched together by means of a clutch 47 of ordinary or preferred construction, as, for example, a friction clutch such as is used in automobiles and comprising disks pressed together by springs. The other section of said shaft carries a balance wheel 48 and a pulley 49 adapted to receive a belt (not shown) extending from a countershaft, a motor, or any other suitable source of power. The pulley 49 is continuously driven. Fig. 35 shows the cam shaft 40 at rest, in the initial position. When the clutch 47 is operated to connect the two sections of the shaft 46, the cam 39 is rotated, thereby raising and lowering the roll 20.

The roll 20 is rotated by means of a belt 50 (Fig. 18) extending over a pulley 51 fixed to said roll, said belt also extending over guide sheaves 52 (Fig. 1), and over a pulley 53, which is fixed upon a shaft 54 (Fig. 16). The shaft 54 is driven by means of a chain belt 55 (Fig. 17) extending over sprocket wheels 56 and 57, the wheel 57 being fixed upon the section 58$^b$ of the main drive shaft. Said shaft-section is arranged to be connected to the shaft-section 58$^a$ through the medium of a clutch 59 (Fig. 2) of any ordinary or suitable type. On the shaft-section 58$^a$ are fixed a balance wheel 60 and a pulley 61, the latter receiving a belt (not shown) extending from a motor or other suitable source of power.

The rolls 21 and 22 are driven by means of a belt 62 which is trained about pulleys 63 and 64 (Fig. 18) fixed to said rolls, said belt also extending over a pulley 65 (Fig. 16) fixed upon the shaft 54.

The roll 2 is driven by means of a pinion 66 (Fig. 18) fixed to said roll and meshing with a spur gear 67 which is rotatably mounted in a bearing bracket 68 that is adjustably secured to the machine frame. Fixed with relation to the spur gear 67 is a sprocket wheel 68$^a$ over which extends a chain belt 69 (Fig. 1) running to a sprocket wheel 70 fixed to a shaft 71. This shaft supports the friction drum 72 by means of which the warp beam 4 is rotated. The shaft 71 is driven from the section 58$^c$ (Fig. 6) of the main drive shaft through intermeshing gears 73 and 74.

The yarn mass on the warp beam rests directly upon the periphery of the drum 72. The journals of said beam are located within bearings formed on slides 75 which are mounted for vertical movement upon guides 76 (Fig. 1).

In order to take up the slack in the sheet of threads when the roll 20 is raised, the roll 3 is arranged to be moved forward; and for this purpose the roll 3 is journaled in two slides 77 (Figs. 18, 19 and 20) arranged for horizontal movement. Movement is imparted to the slides 77 through the medium of a rock shaft 78 carrying two crank arms 79 and 80 (Figs. 18, 30 and 31) which are connected by links 81 to the slides 77. The shaft 78 is rocked by means of a crank arm 82 fixed thereon and carrying a roller stud 83 which lies within the slot 84 of a cam 85 which is fixed with relation to the arm 32. It will be seen that as the roll 20 is raised, the roll 3 will be moved forward to take up slack, and that as the roll 20 descends the roll 3 will be moved rearwardy into its normal position.

When the boxes containing empty bobbins are discharged from the lower ends of the columns, they are received upon a conveyer consisting of two endless belts 86 (Figs. 3 and 17). These belts are carried by pulleys fixed upon shafts 87 and 88. The belts 86 carry the boxes toward the right (as viewed in Fig. 3) and deposit them upon another similar conveyer consisting of two belts 89. The pulleys carrying the last mentioned belts are fixed upon shafts 88 and 90. Rails 86$^a$ prevent the upper runs of the belts 86 and 89 from sagging. The conveyers are driven through the medium of a belt 91 running over pulleys 92 and 93 fixed upon the shafts 90 and 46, respectively. (Figs. 3, 35 and 36). The conveyer 89 deposits the boxes upon two supports 94 (Figs. 61 and 62). From these supports the boxes are lifted to an inverting device by an elevator consisting of two endless chain belts 95 extending over sprocket wheels 96 and 97 (Figs. 61 and 65). Fixed to the chains are pairs of fingers 98 that pick up the boxes from the supports 94 and carry the boxes to the inverting device. 99 are guides to keep the upwardly moving portions of the chains 95 in alinement. 99$^a$ are fixed bars that prevent endwise displacement of the boxes while on the elevator. The elevating carrier is actuated by means of a chain belt 100 extending over a sprocket wheel 101 fixed to the shaft 102 (Fig. 3) that carries the sprocket wheels 97, said belt extending over a sprocket wheel 103 (Fig. 35) mounted on a shaft 104. The shaft 104 is driven by a chain belt 105 extending over a sprocket wheel on said shaft and a sprocket wheel 106 (Fig. 36) on the shaft 43.

The box-inverter comprises, in this instance, two castings 107 (Figs. 4, 65, 66 and 67) and two other castings 108 rigidly secured together in spaced relation. On their adjacent faces the members 107 have curved ribs or flanges 109 which constitute guides for the ends of the bobbin boxes. The surfaces 110 of the members 108 are concentric with the flanges 109, said flanges and surfaces coöperating to control or guide the boxes as they are moved by means to be later described.

At the top of the elevator 95 is a curved sheet-metal guide 111 on which the fingers 98 deposit the bobbin boxes, said guide extending downwardly at such curvature as to direct the boxes out of the path of said fingers. To retard the sliding movement of the boxes down the guide 111 there is provided a spring arm 112 which is placed under tension by a coiled spring 113, said spring arm bearing against one side of the descending boxes. The descent of the boxes is arrested by ledges 114 on the members 107. It will be seen that as the box is inverted in its passage between the guide 111 and the arm 112, the spent bobbin will fall out of the box, to be received in any suitable receptacle. The empty boxes are moved through the path defined by the flanges 109 and the surfaces 110, by means of two wheels 115 each located within one of the members 107. The wheels 115 are fixed on a shaft 117 which is driven by gears 118, 119 (Fig. 4), the latter gear being mounted on shaft 102. Each of the wheels 115 has a plurality of pushers or flights 120 thereon which carry the box up into upright position and onto rails 121, 121ª and 122 (Figs. 4 and 66). Here an operative stationed upon a suitable platform (not shown) places a full bobbin in each box. 123 (Figs. 65 and 90) is a guard rail extending parallel with the rails 121 and 122 and serving to prevent endwise displacement of the boxes in one direction. Endwise displacement in the opposite direction is prevented by reason of the angular form of the rail 122. As the wheels 115 bring up successive boxes, each box pushes before it the row of boxes standing on the rails 121 and 122, for the purpose of advancing the boxes to an elevator that inserts the boxes, one by one, in a carriage which supports the thread-uniting mechanism.

As each box advances, the end of the yarn on the bobbin in the box is also moved forward to the place where it is to be transferred to the uniting-mechanism. For supporting the thread-ends, there is provided a plurality of clamps 124 (Fig. 69) each mounted on a carrier 125. The carriers are slidably supported on an endless rail or track 126, the arrangement of which rail is best shown in the top plan view, Fig. 4. The cross sectional form of the rail is shown in Fig. 69. Each carrier 125 has two upper and two lower pins 127 which fit within the grooves formed in the upper and lower sides of the rail.

Each clamp 124 comprises two relatively stationary parallel jaws 128 and a pivoted jaw 129 adapted to enter the space between the jaws 128 and thus clamp a thread. A coiled spring 130 tends to hold the jaw 129 in closed position. When the clamp is closed, the extension 131 of the jaw 129 is in contact with a stop 132 on the carrier.

The clamp-carriers 125 are moved over the major portion of their course by means of an endless chain 133 which runs over grooved idler pulleys 134, 135, 136 137 and 138 (Figs. 67, 77, 80 and 83), over idler sprocket wheels 139, 140 and 141 (Figs. 70 and 90), and around a driving sprocket wheel 142 (Fig. 70). The last mentioned wheel is rotated through the medium of bevel gears 143, 144 (Fig. 69), gear 144 being fast on shaft 104 (Fig. 35). Between the various pulleys and sprocket wheels the chain 133 is supported in guides 145. The chain is provided at intervals in its length with upwardly projecting pins 146 arranged to engage the lower end 127ª of the lower pin 127 at the leading end of each carrier 125, and thus push said carriers along the rail 126.

The knots by means of which exhausts are repaired are tied adjacent to the roll 3, the uniting-mechanism carriage hereinbefore alluded to being arranged to carry the knot-tying mechanism to a point at the left of the series of columns of bobbin boxes, where the carriage stands until another exhaust occurs.

When placing a bobbin in a box, the operative leads the loose thread-end on the bobbin through the hook 12 on the box, and then secures the thread in the clamp 124 that stands opposite said box. As hereinbefore stated, the boxes are pushed along toward the columns, step by step, as boxes are added to the row by the wheels 115. The clamps 124 carrying the thread ends should advance at the same rate. Upon referring to Fig. 4 it will be seen that after the clamps 124 reach the point $x$, their path of movement diverges from that of the bobbin boxes, so as to carry the thread ends to the knot-tying mechanism. If the clamps 124 are to reach the place where the threads are transferred to the knot-tying mechanism by the time the boxes reach the place where the boxes are transferred to the carriage, the clamps must travel faster than while advancing parallel with the boxes. The rate of travel of the chain 133 is accordingly made such that each clamp is moved at the required speed from the point $x$ to the place where the thread-ends are transferred to the knot-tying mechanism. Other means is provided for advancing the clamps parallel with the boxes, at the slower rate. From the point $x$ to the point $w$ (Fig. 4) the chain 133 travels directly below the rail 126, in order to push the clamp-carriers 125 along. At the point $w$ the chain and the rail diverge (see Fig. 67), the rail thereafter extending in a different vertical plane from that of the chain until the point $x$ is reached. As the chain brings a clamp carrier 125 to the point $w$, said carrier pushes before it several of the preceding carriers until the pin 146 on the chain passes to one side of the pin 127ª on the first mentioned carrier, against which said pin 146 had theretofore been pushing. The first mentioned carrier then stands at rest until another carrier comes and pushes it a little farther. After the carriers have fully rounded the curve at $w$, they are advanced in step with the bobbin boxes by means of a wheel 147 (Figs. 66 and 69), fixed on the shaft 117, said wheel having peripheral fingers 148 that push against the projections 132 on the carriers. 149 (Fig. 69) is a gravity dog located in the rail 126 and adapted to drop behind the rear lower pin 127 on each succeeding carrier, to prevent retrograde movement of the carrier. As the wheel 147 revolves, it pushes the row of carriers 125 along the rail 126, the foremost carrier being periodically engaged by a pin 146 on the chain 133 and moved more rapidly toward the point of transfer of the thread into the knotter.

Each clamp 124 is automatically opened when it reaches the place where the operative supplies the corresponding box 1 with a full bobbin. The means herein shown for this purpose comprises a carrier 150 (Figs. 70 and 71) slidably mounted on a rail 151 that is parallel with the portion $y$ (Fig. 4) of the rail 126. A plate 152 is fixed rigidly to the carrier 150. On this plate is mounted for vertical movement a plate 153 having an angular upper portion 154. Between the upper side of the carrier 150 and the portion 154 is a coiled spring 155 that tends to hold the plate 153 in its upper position. A handle 156 pivoted at 157 to the plate 152 has a portion bearing against the part 154. When the operative depresses the handle 156 the plate 153 is moved downward against the pressure of the spring 155. On the plate 153 are two lugs 158, 159 and a stud 160. 161 is a lug on the plate 152 arranged to engage the extension 131 for opening the clamp 124. 162 is a cable connected at one end to the carrier 150 and secured at its other end to a weight 163 (Fig. 2), said cable extending over a guide sheave 164. When the plate 153 is in its normal or upper position, the weight 163 holds the lug 159 against the lug 165 (Fig. 71) on one of the carriers 125, the dog 149 being provided to prevent the weight from pulling the carriers 125 back toward the wheel 147.

Assuming the carrier 150 to be standing in front of a carrier 125 which in turn stands in front of an empty bobbin-box, the clamp 124 being held open by the lug 161, and the lug 159 being pressed against the lug 165 by the weight 163, the operative places a bobbin in the box, leads the thread through the hook 12, lays the thread across the upper edge of the plate 152 between the open clamping jaws, and, while still holding the thread, depresses the handle 156. As soon as the lug 159 has passed below the lug 165, the weight 163 moves the carrier 150 to the left until the stud 160 strikes the lug 165. Such movement of the carrier 150 moves the lug 161 out from under the heel of the extension 131, permitting the spring 130 to swing the jaw 129 until the clamp is nearly closed. The operative then releases the handle 156. Thereupon the spring 155 raises the plate 153, carrying the stud 160 above the lug 165, and allowing the weight 163 to pull the carrier 150 to the left until the lug 159 strikes the lug 165 on the next clamp carrier 125. When the stud 160 leaves the lug 165 on the first mentioned carrier 125, the lug 161 also moves out from under the extension 131, when the spring 130 closes the clamp, thereby clamping the thread.

The clamp 124 is closed in stages, as described, because if the clamp were permitted to spring shut from the wide-open position, the clamp jaws would break the thread.

The upper edge of the plate 152 serves as a guide to insure that the thread shall be clamped at the proper height in the clamp 124.

If the operative should accidentally depress the handle 156 immediately after releasing it, the lug 158 would stop against the lug 165 of the next carrier 125, and prevent the carrier 150 from moving so far to the left that the lug 159 would not engage said lug 165 when the handle was released.

It will be seen that the carrier 150 with its attached devices constitutes a clamp-operating means which opens the clamps 124 one by one as they reach the place where bobbins should be supplied, and which allows the clamp to close after the thread has been placed therein, the threads always being clamped at the same height.

The uniting-mechanism carriage comprises a rigid framework which is supported for movement above the columns, upon rails 166 and 167 (Figs. 4 and 82). The carriage is shown in plan view in Figs. 91 and 136, in vertical section in Fig. 90, in side elevation in Fig. 135, and in rear elevation in Fig. 83. It is provided with rollers 168 that run within the groove of the rail 166, and with a shoe or slide 169 (Figs. 82, 83 and 90) that slides upon the rail 167. 170 (Figs. 83, 90 and 91) are hooked or angular members on the carriage, engaging a groove in the bar 171 to prevent upward displacement of the rear end of the carriage. The carriage is arranged to support a bobbin box in readiness to be deposited on top of any column in which an exhaust may occur, the box being inserted into the carriage while the latter is in its initial or normal position. The box-inserting means comprises two vertically reciprocable plungers 172 (Figs. 83 and 90) adapted to raise the foremost box off the rails 121 and 122 and into a space provided for the box in the carriage. In order accurately to position the carriage in the initial position, there is provided a bar 172$^a$ fixed to one of the elevators 172 (Figs. 88$^a$ and 89) and vertically movable between pairs of guide lugs 171$^a$ and 172$^b$ on the bar 171 and the carriage, respectively. When the elevators rise to insert a box into the carriage, the chamfered upper end of the bar 172$^a$ enters between the guide lugs 172$^b$ and alines and locks the carriage. The plungers or elevators 172 are reciprocated by means of two crank arms 173 fixed on a rock shaft 174, said shaft being actuated from the cam shaft 40.

If desired, some of the driving connections employed in the machine may be made yieldable or separable in order to prevent breakage in case of obstruction to the movement of the parts. Herein I have shown several such yieldable driving connections, all substantially similar, the one for the elevators 172 being illustrated in Fig. 81. On the shaft 174 is fixed an arm 175 (Fig. 81), to which is pivoted a latch 176. A spring 177 connected to said latch and to a lug 178 on the hub of the arm 175 normally holds the tooth 179 of the latch in a notch 180 formed in the periphery of a disk or plate 181 loosely mounted on the shaft 174. It will be seen that when the tooth 179 is in the notch 180, the shaft 174 will be connected to turn with the plate 181. A lever 182 (Figs. 36 and 39) pivoted at 183 to a bracket in the machine frame, is connected at one end to the plate 181 by a link 184, and carries at its other end a roller stud engaging in the groove 185 of a cam disk 186 fixed on the shaft 40.

Any obstruction to the upward movement of the box-elevators 172 will disengage the tooth 179 from the notch 180, thus preventing breakage.

A similar driving connection between the sprocket wheel 103 and the shaft 104 is shown at 103$^a$ in Figs. 35 and 83, said connection serving to prevent breakage in case of obstruction to the movement of the parts driven by the shaft 104.

When raised into the carriage by the elevator plungers 172, the box is releasably retained in the carriage by means of two spring-actuated dogs 187 (Figs. 82 and 87) that confine the box between themselves and the opposite portions 188 188$^a$ (Figs. 87, 89 and 90) on the carriage.

To prevent the bobbin from rolling in the box while the box is in the carriage, and thus producing slack in the thread, I provide a presser finger 189 (Figs. 87, 90 and 91) pivoted at 190 in position to touch the bobbin when the box is lifted, and hold said bobbin against either side of the box. A torsion spring 191 assists to hold the finger 189 firmly, yet lightly, against the bobbin.

When an exhaust occurs, the carriage is moved to a position above the column in which the exhaust took place, and the box in the carriage is forced downwardly upon the top of the column, the entire column being pushed down until the lowermost box drops onto the conveyer 86 86. The means for forcing the box and the column downward comprises two L-shaped plungers 192 193 (Figs. 82, 87, 90 and 91) arranged to press against the top of the box and force it past the hooks or dogs 187. The stems of the plungers 192, 193 are rack-toothed to engage pinions 194 on a shaft 195, said shaft being rotated by a rack bar 196 guided for vertical movement on the carriage, and meshing with a pinion 197 on the shaft 195. The bar 196 has upon its lower portion rack teeth meshing with a pinion 198 (Figs. 3 and 82) supported parallel with the path of movement of the carriage, said pinion 198 being of sufficient length so that the rack bar 196 remains in mesh therewith in all positions of the carriage. The pinion 198 is rigid with a shaft 198$^a$ carrying a pinion 198$^b$ that meshes with a rack bar 199 (Figs. 3 and 35) guided for vertical movement, the lower end of said rack bar carrying a roller stud that engages the cam 200 (Figs. 3, 35, 36 and 37). Cam 200 is fast on shaft 40.

The form of the cam 200 is shown in Fig. 1$^b$, the cam being there illustrated in its initial position. The cam comprises a dwell $a$, a cam surface $b$ by means of which the rack bar 196 is given a short upward movement, for a purpose to appear hereinafter, a dwell $c$, a cam surface $d$ by means of which the rack bar is moved down rapidly to place the down-push plungers 192 193 against the box and move the box down against the column, the surface $d$ being followed by a cam surface $e$, which causes the plungers to push the box into operative position (the column being thereby pushed down), a cam surface $f$ that raises the down-push plungers sufficiently to clear the tops of the columns, a dwell $g$, and a cam surface $h$ that raises the down-push plungers to the initial position.

To prevent breakage in case the downward movement of the plungers 192 193 is obstructed, I provide between shaft 198$^a$ and the pinion 198$^b$ a separable driving connection substantially identical with the device shown in Fig. 81. Said separable driving connection is indicated at 176$^a$ in Fig. 35.

On the plunger 193 is a notched finger 201 (Fig. 90) adapted to engage the upper edge of the rear end wall 8 of the bobbin box for the purpose of accurately alining the box with the column.

202 (Figs. 82 and 87) are flanges on the carriage adapted to engage beneath angular members 203 fixed at the upper ends of the columns, to resist the reaction due to the forcing downward of the bobbin box and the column.

At each column are fixed guides 196$^a$ (Figs. 82, 83 and 88) between which the rack-bar 196 descends, thus accurately positioning the carriage above the column and locking the carriage against lateral displacement. The lower end of the rack-bar and the co-acting parts of the guides 196$^a$ are chamfered, as indicated in the drawings to assist in guiding the rack-bar into place.

The carriage is moved into position above the proper column, and returned to its initial position, by means comprising a trussed arm 204 (Fig. 3) pivoted at its lower end and connected at its upper end, in a manner to be later described, to the carriage. The arm 204 is swung by means of a crank 205 (Fig. 32) and a pitman 206 extending between the arm and the crank. The crank is fixed upon a shaft 207. When an exhaust is to be repaired, the shaft 207 is given a half-revolution to move the carriage to the column in which the exhaust occurred, and then given a further half-revolution to return the carriage to its initial position. On one end of the shaft 207 is fixed a gear wheel 208 (Fig. 35) arranged to mesh with the gear wheel 41. Reference to Figs. 35, 36 and 40 will show that one-half of the width of the periphery of the gear wheel 41 has a complete series of gear teeth, while the other half of the periphery is divided into two sets of gear teeth with intervening blank spaces. The gear wheel 208 is arranged to mesh with two sets of gear teeth, thereby providing an interval of rest at the initial and the operative positions of the carriage. In order that the teeth on the gear wheel 208 shall mesh properly with the teeth on the wheel 41, two cams 209 are fixed to the shaft 40 in position to engage two diametrically opposite rollers 210 211 carried by the gear wheel 208. Assuming that the shaft 40 has begun to rotate: The cam portion 212 of one of the cams 209 engages the roller 210 and sets the wheel 208 in rotation a moment before the teeth of the wheel 41 begin to mesh with the teeth of the wheel 208, thereby causing the teeth to mesh properly and preventing undue strain upon the teeth. As the carriage is completing its trip to the column requiring replenishment, the portion 213 of the other cam 209 engages the roller 211, and thereby slows up the shaft 207. The roller 211 then enters the dwell 214, whereby the shaft 207 is locked against rotation. As the shaft 40 continues turning, the portion 215 of the last mentioned cam 209 engages the roller 211 and sets the wheel 208 to rotating as the teeth on the wheel 41 begin to mesh with the teeth of the wheel 208. When the carriage has nearly reached its initial position, the portion 216 of the first mentioned cam 209 engages the roller 210 and moves said roller into the dwell portion 217, thus bringing the shaft 40 to a gradual stop. Fig. 40 represents the position assumed by the parts when the carriage is in initial position.

In order that the carriage may be moved into position above any one of the nineteen columns, means is provided to vary the throw of the crank 205, said means comprising a set of nineteen wrist-pins 218 (Fig. 32) located on the crank at different distances from the axis of the crank, each of said wrist-pins being adapted to couple the pitman 206 to the crank, and means for selecting the wrist-pin that corresponds to the column in which the exhaust occurs.

The construction of the wrist-pins 218 is best shown in Figs. 33 and 34. Each is slidably mounted in the crank 205 and is releasably held in operative and withdrawn positions by a detent 219. Fig. 34 shows a wrist-pin as inserted into an opening in the pitman 206, while Fig. 33 represents a wrist-pin in its withdrawn position. The means for inserting a wrist-pin in the pitman comprises a set of plungers 220 each alined with one of the wrist-pins. A gear segment 221 has a flange 222 adapted to engage a shoulder 223 (as in Fig. 33) to hold all of the plungers in withdrawn position against the pressure exerted by springs 224. Each plunger has rack teeth adapted to mesh with the segment 221.

Means is provided for holding back all of the plungers except the one corresponding to the desired wrist-pin, said means comprising two locking bars 225 secured together in spaced relation and reciprocable transversely of the plungers. In these bars are formed, all told, nineteen notches 226 through which lugs 227 on the plungers are adapted to pass. The notches 226 are so spaced that in any position of the bars 225 only one of the notches 226 is directly opposite a lug 227. Thus it will be seen that by moving the bars 225 to the required position any given plunger 220 may be released. When so released, the spring 224 pushes said plunger forward into mesh with the segment when the segment begins moving.

The locking bars 225 are reciprocated by means of a crank arm 228 (Fig. 32) which is connected to said bars by a link 229. The crank arm 228 is fixed upon the lower end of a rock shaft 230 (Fig. 35) which is controlled by the detector mechanism as will appear hereinafter.

The means for oscillating the segment 221 comprises a crank arm 231 fixed to said segment and connected by means of a rod 232 (Figs. 32 and 36) to the lower end of a lever 233 (Figs. 35 and 36). Said lever is oscillated by a cam 234 on the shaft 40.

Assuming the parts to be in the position shown in Fig. 33, the operation of the wrist-pin-inserting mechanism is as follows: The locking bars 225 are moved to place the proper notch 226 in front of the lug 227 on the plunger that should be released. During such movement, all of the plungers are held back by the flange 222 on the segment 221. The segment is then swung to force the released plunger against the corresponding wrist-pin and thus push said pin into the pitman. Meanwhile, all the remaining plungers are held back by the locking bars 225. The segment then swings back, returning the operated plunger to its normal position. After the detector mechanism has been reset, the locking bars 225 are returned to initial position.

Upon the completion of a round trip of the carriage, the wrist-pin which was used is pushed out of the pitman by means of a bar 235 (Fig. 33) carrying nineteen pins 236 which are alined with the wrist-pins. The bar 235 is guided for reciprocation toward and away from the pitman, and is moved by means of segments 237 fixed upon a rock shaft 238. On said shaft is secured a crank arm 239 which is connected through the medium of a rod 240 (Figs. 32, 35 and 36) to a lever 241 arranged to be moved by a cam 242 fixed on the shaft 40.

To lock the pitman 206 in its initial position, and to accurately position the crank and the pitman so that any one of the wrist-pins can be pushed in, there is provided a pin 243 (Figs. 34 and 34ª) fixed to the bar 235 and adapted to enter registering openings in the pitman and the crank. The pin 243 is so located with reference to the push-pins 236 that the former enters the pitman before the wrist-pin is pushed out of the pitman; and the movement of the segments 221 and 237 is so timed that the pin 243 leaves the pitman after the wrist-pin is inserted into the pitman.

In order to avoid breakage in case the carriage should not be free to move when the crank 205 moves, the pitman 206 is made in two sections 206ª 206ᵇ (Fig. 79) releasably connected together. The section 206ª is slidable within the other section. The wrist-pins 218 engage only the section 206ª. The two sections are yieldingly united by means of a member 244 pivoted at 245 on a bracket 246 fixed to the section 206ᵇ. One end of the member 244 is adapted to lie within a recess 247 in the section 206ª, and the other end of said member has a notch 248 to receive a tooth 249 on a lever 250 pivoted on the bracket 246. The tooth 249 is normally held in its notch by a spring 251 strained between the lever 250 and a lug 252 on a pivoted detent 253. Said detent extends through a bifurcation of the lever, and has shoulders 254 which are moved under the lever by the spring 251 when the lever is raised past one or both of said shoulders. If for any reason the carriage (and consequently the pitman-section 206ᵇ) is held against movement, the pitman-section 206ª continuing to move will turn the member 244 until the tooth 249 is out of the notch 248, and the member 244 is out of the recess 247, thereby disconnecting the carriage and the crank 205.

In order to stop the mechanism in case of any obstruction to the movement of the carriage, the parts driven by the shaft 104, or the box elevators 172, I provide electromagnetic means for throwing out the clutch 47 through which power is transmitted to the cam shaft 40. Referring to Figs. 35 and 36: 255 is a clutch-operating rod connected to a crank arm 256 fixed to and extending downwardly from a shaft 256ª. Loosely mounted on said shaft is a lever 257 having a lug 257ª (Fig. 36ª) adapted to engage a finger 256ᵇ fixed to and extending upwardly from the shaft 256ª. The lever 257 is connected by a link 258 (Fig. 35) to a crank arm 259 fixed on a shaft 260. Said shaft carries an arm 261, the free end of which is arranged to be engaged by the hooked end of a pivoted armature 262. 263 is an electromagnet adapted, when energized, to attract the armature 262 and thus release the arm 261. When said arm is released a spring 264 pulls down the lever 257, the lug 257ª swinging the finger 256ᵇ to the right (Fig. 35) and the crank arm 256 to the left, whereby the clutch 47 is thrown out.

Relative movement between the pitman-sections 206ª and 206ᵇ is arranged to close a grounded circuit through the electromagnet 263. In the circuit of the electromagnet is a contact 265 (Fig. 79) carried by the bracket 246 and arranged to be touched by a spring grounding contact 266 also mounted on said bracket. 267 is a pin attached to the lever 250 and normally holding the spring 266 away from the contact 265. When said lever is raised by reason of relative movement between the pitman-sections 206ª 206ᵇ, the spring 266 will engage the contact 265, thereby closing a circuit through the magnet 263, and causing prompt stoppage of the cam shaft 40 and consequently of the crank 205. The operator then resets the pitman-section connecting means, and after remedying the fault that caused the stoppage, he may raise the lever 257 to throw in the clutch 47 and interlock the arm 261 and the hooked end of the armature 262. A treadle is also provided for throwing in the clutch 47 and resetting the arm 261, which treadle consists of a bar 257ᵇ (Figs. 1 and 2) secured to two levers 257ᶜ, said levers being fixed upon a rock shaft 257ᵈ. Weighted arms 257ᵉ (Figs. 16 and 17) fixed on the shaft 257ᵈ normally hold the treadle in the position indicated in Fig. 1. Fixed on the shaft 257ᵈ is a crank arm 257ᶠ (Fig. 16) which has a pin and slot connection with a rod 257ᵍ, said rod being attached to the lever 257 (see Figs. 35 and 36ª). It will be seen that depression of the treadle will pull the rod 257ᵍ down and tilt the lever 257 in the direction to throw in the clutch 47 and reset the arm 261.

In order that any interference with the upward movement of the box-inserting plungers or elevators 172 shall cause stoppage of the mechanism, said plungers are connected to the actuating lever 182 through the separable connection 176 181 heretofore described (see Fig. 81), the disk 181 having an insulating block 268 which normally supports one end of an electric contact 269 fixed to the arm 175. The contact 269 is included in the circuit of the electromagnet 263. When relative movement between the disk 181 and the arm 175 occurs, the contact 269 is moved off the block 268 onto the disk 181, thereby establishing a grounded circuit through the magnet and causing the clutch 47 to be thrown out.

Similar circuit-closers are associated with the separable driving connections 103ª and 176ª.

Referring to Figs. 67 and 68: Each pin 146 on the chain 133 should push before it only one clamp carrier 125. In case one of the pins becomes disengaged from its carrier, said carrier will be picked up by the next following carrier. To prevent two carriers from being advanced together onto the track-section y, I provide a safety throwout comprising a bell crank 270 pivoted at 271 on a stationary plate 272. The arm 270ª (Fig. 67) of the bell crank carries a pin 273 which is normally held against a shoulder 274 (Fig. 68ª) on the plate 272 by a spring 275. The arm 270ª also carries a pivoted lever, one arm 276 of which is normally in the path of the lugs 132 of the clamp carriers 125. When the arm 276 is depressed by reason of the passing of a clamp carrier, the arm 277 will be tilted upwardly; and if another clamp carrier be following directly behind the first, said arm 277 will strike the lower side of the lug 132 of such following carrier. Continuing movement of the carriers will cause further depression of the arm 276, thereby depressing the arm 270ª until the pin 273 touches a contact 278 included in the circuit of the magnet 263, and thus closing a circuit through said magnet to ground. The clutch 47 will thereupon be thrown out.

As hereinbefore stated, the knot-tying mechanism is supported for movement adjacent the roll 3. Said mechanism is supported, and connected to the carriage, by means of a tubular arm 279 (Figs. 135 and 136). The rear end of the arm 279 is connected to a member 280 fixed in the carriage, by means of a joint on the order of a ball-and-socket joint (see Fig. 89), whereby the arm 279 is capable of a limited swinging movement in a horizontal plane. The forward end of the arm is supported by means of a roller 281 (Figs. 97 and 98) that runs within the groove of a rail 282 (Fig. 1). Intermediate the rail 282 and the carriage, the arm 279 is supported by a trolley 283 (Figs. 1, 92, 114 and 115) rigidly fixed to the arm and having two rollers 284 that run upon a rail 285. The arm 279 is normally locked against pivotal movement by means of a brace rod 286 (Fig. 91) pivoted at its forward end to the trolley 283, and provided at its rear end with a lock member 287. Said lock member is slidable within the slot 288 of a stud 289 (Fig. 86) mounted on the carriage. In the stud 289 is another slot 290 which extends at an angle with the slot 288 and partially intersects the latter. In the portion of the lock member 287 which extends into the intersecting slot 290 is a notch 291 (Fig. 84). A lock bolt 292 is slidably mounted in the slot 290 and is adapted to enter the notch 291. When the bolt is in the notch, the brace rod 286 is locked against endwise movement and hence the carriage arm 279 is locked against swinging movement. To release the brace rod, there is provided a bell-crank 293 (Figs. 86ª, 88 and 89) one arm of which is attached to the lock bolt 292 by means of a link 294. The other arm of the bell crank has an angular portion that lies in the path of a shoulder 295 (Fig. 88) on the rack bar 196. When the carriage arm 279 is to be unlocked, the rack bar 196 is given a slight upward movement through the action of the cam surface b (Fig. 1ᵇ), whereby the shoulder 295 moves the bell crank 293 to pull the lock bolt 292 out of the notch 291. The bolt is held out for a time by a detent 297 (Fig. 86ª) that is swung into engagement with the bell crank 293 by a torsion spring 298 (Fig. 88). (The detent 297 is provided because the shoulder moves down before the time for releasing the bell-crank arrives.) When the rack bar 196 has nearly completed its downward (box-ejecting) movement, a pin 299 set in said rack bar pushes the detent 297 aside and thus releases the bell-crank. A spring 300 then pulls the bolt 292 into the notch 291 as soon as said notch in the restoring swing of the carriage arm comes into register with said bolt.

A knot-tying mechanism is supported upon a rigid chambered frame or casing 301 (Figs. 97 to 100) fixed to and extending downwardly from the forward end of the carriage arm 279. An exhaust air current is employed to lift the exhausted thread out of its groove $2^a$ and into the knotter, and to carry away the clippings resulting from the trimming of the knot. The carriage arm is formed of tubing in order that it may be utilized as a conduit for the air current; and the chambered support 301 constitutes a part of said conduit, the lower end of said support being close to the plane of the troughing $2^b$. In the lower end of the support 301 is an inlet slot 302, said slot being continued in the front and rear walls of the support in the form of flaring throatways 303 304 (Figs. 95 and 100) to receive the threads and guide them into proper relation to the knotter. As hereinbefore stated, the rear end of the carriage arm is connected by a pivotal joint to the carriage member 280 (Figs. 89 and 90) said member having an air passage 306 therein. A coupling 307 (Fig. 129) is pivotally connected to the carriage in communication with the passage 306. To said coupling is attached an air tube 308 which is fixed to a joint member 309. The latter coacts with a joint member 310 fixed to the arm 204, to provide a flexible joint between the parts 204 and 308. The coupling 308 is connected to the arm 204 by two links 311. A spring 312 holds the joint members 309 and 310 together. The arm 204 is tubular and its lower end communicates with a coupling $204^a$ (Fig. 133) mounted in a bearing $204^b$. Fixed to the coupling $204^a$ is a tube 313 which is mounted in a bearing $313^a$. $204^c$ is a brace rod extending between the upper portion of the arm 204 and the tube 313. The tube 313 communicates with a tube 314 that discharges into a waste tank 315. Air is drawn from the tank 315 through a conduit 316 which leads to an exhaust fan or the like (not shown). The thread-clippings that accumulate in the tank 315 are removed at intervals through the lower end of the tank, upon opening the closure 317.

In order that the exhaust air current shall be created at the knotter when needed, and discontinued after the necessity therefor has passed, I provide an air inlet $316^a$ (Fig. 2) said inlet being of greater capacity than the fan, and offering less resistance to the passage of air than the inlet 302 and its connected conduits, so that when the inlet $316^a$ is open there is no current passing through the inlet 302. The inlet $316^a$ is controlled by a closure $316^b$ which is operated by a lever $316^c$ (Fig. 39) and rod $316^d$, said lever carrying a roller that bears against the periphery of the cam disk 186. When the depression $186^a$ in the periphery of the disk reaches said roller, the inlet $316^a$ is closed, thereby creating a suction current at the knotter, and when the depression passes said roller, the inlet $316^a$ is opened and the suction current at the knotter is interrupted. Said current is created as the knotter comes to rest over the exhausted thread, and is interrupted immediately after the knot has been tied.

The knot-tying mechanism may be of any suitable form, but is herein shown as similar to that fully described in Patent No. 755,110, dated March 22, 1904, to which patent reference may be had for a complete understanding of the knotter. The sector cam gear $B^3$ that rotates the tying bill $C^5$ and actuates the stripper arm E oscillates on the center 318 and is swung by a crank arm 319 connected by a link 320 to a crank arm 321 fixed on the forward end of a rock shaft 322. This shaft extends parallel with the carriage arm 279, and carries at its rear end a crank arm 323 (Fig. 126) which is connected by a link 324 to a lever 325. Said lever is provided with a roller running in a groove 326 in a cam disk 327 mounted on the shaft 195. As said shaft is turned, the sector cam gear $B^3$ is oscillated to actuate the knotter.

Just before the tying bill $C^5$ begins to rotate to form the knot, the threads are yieldingly clamped by a spring arm 328 (Figs. 93 and 100) that acts to press the threads against the forward side of the support 301. The arm 328 is pivoted at 329 and is moved by a cam 330 fixed with relation to the sector cam gear, said cam 330 acting upon an arm 331 that is fixed to the arm 328. A spring 332 holds the arm 331 against the cam 330. 333 is a swinging finger that serves to lift the exhausted thread into the tying bill and into the hook of the stripper arm E. The finger 333 is swung by a rack bar 335 and pinion 336, the rack bar being pivoted to a crank arm 337 fixed to a rock shaft 338. The shaft 338 extends parallel with the carriage arm 279 and is driven by means (Fig. 125) comprising the crank arm 339, the link 340, the lever 341, and the cam disk 327, the latter having a cam groove 342 receiving a roller on the lever 341.

The threads carried by the clamps 124 are transferred one by one to the knotting mechanism by means to be now described. Referring to Fig. 80: 343 is a bracket fixed in the machine frame adjacent to the initial or normal position of the knot-tying mechanism. In said bracket is mounted a shaft 344 upon one end of which is loosely mounted a lever 345. One end of said lever is connected to a link 346 that is attached to a crank arm 347 fixed on the shaft 174. To the lever 345 is fixed a plate 348, the edges of which are notched to support a loop of the thread. When the plate 348 is in its lower position (shown in dotted lines in Fig. 80), said plate is in the horizontal plane of the thread extending from the clamp 124 of a carrier 125 to the corresponding bobbin box. As the carrier travels around the loop shown in Fig. 77, it pulls the thread about the plate 348 so that the thread extends from the bobbin box to the plate 348 and thence to the clamp 124. The portion of the thread (j) which extends between the plate 348 and the clamp 124 lies beneath the suction slot 302 in the knotter support 301. On said knotter support is a thread support 349 (Figs. 93 and 97). When the knotter is in its initial position and the plate 348 is in its lower position, the support 349 is directly behind said plate. 350 is a horizontal stop pin fixed in the support 349 and overlying the strand (k) running from the box to the plate 348 and the strand (j) extending from said plate to the clamp 124. When the plate 348 rises, the thread loop will be stripped from said plate by the pin 350 and will drop onto the support 349 on the knotter support.

The thread has now been transferred to the knot-tying mechanism, but the end of the thread is still in the clamp 124. To free the thread from said clamp and clamp the end to the knotter support, I provide on said support a combined shearing and clamping device consisting of the stationary clamping jaw 351 (Fig. 101) the stationary shearing jaw 352, and the pivoted shearing and clamping jaw 353, the last mentioned jaw being arranged between the other jaws and being mounted to swing on the center 354.

The thread portion j is lifted into the shear and into operative relation to the knotter by a hook 355 (Fig. 80) fixed on an arm 356 which is mounted on the shaft 344. Rigidly connected to the arm 356 is an arm 356ª which is connected by a link 356ᵇ (Fig. 35) to a lever 356ᶜ operated by a cam groove in a cam disk 356ᵈ (Fig. 36) fixed on the shaft 40. The hook 355 serves to lift the strand j that extends to the clamp 124 into the throatways 303 and 304 and into the shearing and clamping device. 357 (Figs. 97, 99 and 100) is a guard plate to prevent the thread from being lifted too high. The shearing and clamping jaw 353 is moved into closed position by a stud 358 (Fig. 77) on the arm 356, said stud engaging an arm 359 (Fig. 99) on said jaw. When said jaw is thus moved, the thread is clamped between the jaws 351 and 353, and the end extending to the clamp 124 is sheared between the jaws 352 and 353. The jaw 353 is frictionally held closed until the finger 333 is actuated to lift the exhausted thread into the knotter. 360 (Fig. 99) is an arm fixed on the shaft 338 and carrying a pin 361 arranged to engage a lug 362 on the jaw 353. When the thread is released through the opening of the clamp, the end is drawn up into the tubular knotter support 301 by the exhaust air current which has in the meantime been created.

The waste end remaining in the clamp 124 is released through the action of a trip or projection 363 (Figs. 75 and 76) arranged in the path of the extension 131. Above the point at which the clamp 124 is opened is a suction tube 364 (Figs. 1 and 2), into the mouth of which the waste end is drawn by the air current. The tube 364 communicates with the coupling 204ª (Fig. 133).

To assist in retaining the thread-portion k in proper relation to the knot-tying mechanism while the latter is traveling to the proper column, to detect the absence of a thread, and to take up slack after the knot has been tied, I provide devices supported by a bracket 365 (Fig. 102) fixed to the carriage arm 279. These devices include a plurality of vertically disposed sheath-like members 366 fixed to the bracket 365, and a plurality of vertically movable strippers 367 contained within and guided by said sheath-like members. The lower end of each of the latter is notched to provide a shoulder 368; and the lower end of each stripper is similarly notched to form a shoulder 369. The strippers 367 are moved by a cam 370 fixed on the knotter-actuating shaft 322 and engaging a roller stud carried upon one arm of a bell crank 371, the other arm of said bell crank being connected to a rod 372 (Fig. 105) that supports all of the strippers.

A plurality of fingers 373 are rigidly attached to a pivot or shaft 374 mounted in the bracket 365. A torsion spring 374ª tends to turn said pivot in the direction to swing the fingers 373 into the spaces between the sheath-like members 356. On one end of the pivot 374 is a crank arm 375 which, when the carriage returns to its initial position, is forced under a stationary cam or projection 376 fixed to the machine frame, whereby the fingers 373 are swung into the position shown in Fig. 102.

A finger 377 loosely mounted on the pivot 374 has a hooked or bent lower end adapted, when the finger is swung alongside the adjacent member 366, to support the thread and prevent it from sagging. On the finger 377 is a lug 378 (Fig. 103) arranged to be engaged by one of the fingers 373, to press the finger 377 away from the members 366 against the tension of a spring 379. 380 is a stop pin to limit the spring-caused movement of the finger 377.

When the carriage returns to its initial position, the cam 376 causes the fingers 373 and 377 to swing into the position shown in Figs. 102 and 104. The upward movement of the bobbin box as it is inserted into the carriage raises the thread until it lies as shown in said figures. When the carriage starts on a trip to a column in which an exhaust has occurred, the crank 375 moves out from under the cam 376, whereupon the spring 379 swings the finger 377 until its hooked lower end is under the thread; and the spring 374$^a$ swings the fingers 373 against the thread, thus holding the thread against the edge 367$^a$ of the strippers 367, as shown in Fig. 107. During the tying of the knot the strippers rise into the position shown in Fig. 108, whereupon the fingers 373 push the thread against the shoulders 368. The strippers then descend, carrying the thread below the ends of the members 366 (as illustrated in Fig. 109). The cam 327 (Fig. 126) then begins its return or reverse rotation, in the course of which the strippers are raised into the position represented in Fig. 110, whereupon the fingers 373 push the thread clear of the members 366, the strippers being subsequently lowered into the initial position (Fig. 107).

The fingers 373 serve as feelers to detect the presence or absence of a thread. If for any reason a thread should not be placed between the members 366 and said fingers, the latter will swing up until a lug 381 on the pivot 374 strikes an electrical contact 382 included in the circuit of an electromagnet 451 (Fig. 35), which is arranged to throw out the clutch 59 and thus prevent the warp beam from being again set in rotation. In the normal operation of the uniting mechanism, the parts 381 382 come into contact after the threads have been united, and the carriage has started on its return to initial position, such movement of the carriage, of course, taking the feeler device away from the thread.

Provision is made whereby contact of the parts 381 382 shall not establish a grounded circuit through the electromagnet 451 unless such contact occurs previous to the usual time. Referring now to Fig. 2$^a$: 383 384 are spring contacts in the circuit of the magnet 451. The contact 383 is arranged to be pressed against the contact 384 by a bell crank 385 which is operated by a projection 386 on the cam disk 356$^d$. The cam projection 386 closes the circuit at 383 384 immediately after the knotter has been actuated to tie a knot. If there be no thread at the feeler device, the parts 381 382 will be in contact with each other, and as soon as the circuit is closed at 383 384 the clutch 59 will be thrown out.

The operating connections between the magnet 451 and the clutch 59 are as follows: 452 (Fig. 35) is a pivoted armature for said magnet, said armature having a hooked portion adapted to engage one arm of a bell crank 453. The other arm of said bell crank is connected by a link 454 to a lever 455 (Fig. 17) which is loosely pivoted on the shaft 257$^d$. Rigidly connected to the lever 455 is a crank arm 457 (Figs. 16 and 17) that is attached through the medium of a rod 458 to a crank arm 459. To the last mentioned crank is rigidly fixed a crank arm 460 which is connected by a link 461 to the clutch 59. As soon as the electromagnet 451 is energized, a spring 462 (Fig. 35) moves the lever 455 to throw out the clutch. The clutch is thrown in, and the bell crank 453 reëngaged with the armature lever 452, by means of a pedal 463, also by means of the treadle 257$^b$. As hereinbefore stated, said treadle is secured to the shaft 257$^d$. On one end of said shaft is fixed an arm 455$^a$ (Figs. 16 and 17) adapted, when the treadle is depressed, to engage a lug 455$^b$ on the lever 455 and thus swing said lever down to throw in the clutch 59 and reset the bell crank 453.

I have hereinbefore described the means for effecting a coarse adjustment of the knot-tying mechanism with relation to its work, i. e., the adjustable crank and pitman for moving said mechanism to a given section of the warp. The means for effecting a finer adjustment of the knot-tying mechanism, for the purpose of positioning said mechanism over or close to the groove 2$^a$ that contains the exhausted thread will next be described.

The twenty grooves 2$^a$ that aline with each column may be considered as a section of the troughing 2$^b$. For each section there is a stop pin 388 (Figs. 4, 93 and 94) located one section in advance of its respective section, and arranged to be vertically moved by a bell-crank 389 connected to the detector mechanism. When a thread in any section exhausts, the stop pin 388 for that section is projected above the plane of the troughing 2$^b$ into position to engage a device attached to the forward end of the carriage arm 279. This device comprises a plate 390 having an aperture 391 therein to receive the stop pin 388, said plate being pivoted to a short link 392 in order that the plate may yield laterally (horizontally) and said link being pivoted to the lower end of an arm 394 which is fastened to a rock shaft 395 extending parallel with the carriage arm. The plate 390 is supported adjacent to the surface of the troughing 2$^b$ by a frame 396 rigidly fixed to the knotter support 301. The connection between the plate and the frame consists of a bracket 397 attached to the plate and resting upon the lower bar of said frame. A tension spring 398 attached at one end to the bracket 397 and at its other end to said lower bar holds the bracket in the position shown in Figs. 94 and 96, but allows the plate to yield laterally and vertically. 399 is an inclined portion to enable the plate to ride up over the stop pin, the plate dropping as soon as the opening 391 comes into register with the stop pin. The inclined edge 400 is provided to guide the plate past any stop pin that might be up when the carriage is returning to its initial position.

It will be seen that if the shaft 395 be turned in the direction indicated by the arrow A in Fig. 93, the plate 390 will be drawn toward the carriage arm.

Means is provided for locking the rock shaft 395 in adjusted position with relation to the carriage arm 279. It will be seen that when the shaft is so locked, and the plate 390 is anchored to a stop pin 388, the forward end of the carriage arm will be locked against movement. It will also be evident that the point at which the carriage arm stops over the section when the plate 390 engages the pin will depend upon the position of the aperture 391 with reference to the carriage arm; the nearer the aperture is to the carriage arm, the nearer said arm will be to the side of the section from which the carriage approaches. The means for adjusting the plate 390 with relation to the carriage arm will now be described.

Attached to the carriage arm adjacent to the carriage, is a bracket 401 (Figs. 90, 111, 116, 117 and 118). On this bracket is a finger 402 arranged to swing on the pivot 403 in the vertical plane of the series of detectors 23. When the carriage travels to the column, the finger 402 is carried in advance of the carriage arm and above the series of the detectors. When a thread exhausts, the detector for that thread is raised, as shown in Figs. 24 and 25. Any such elevated detector will be struck by the lower end of the finger 402, and as the carriage continues its journey into position over the column, the finger 402 is swung. Said finger is arranged to swing a sector 404 rotatably mounted on the pivot 403, which sector is connected by a link 405 to a crank arm 406 fixed on the rock shaft 395. The extent to which the sector swings determines the extent of the adjusting movement given the plate 390. The time or instant when the sector begins to swing is variable, depending upon which of the twenty detectors is up. The further the elevated detector is to the left the sooner it will be struck by the finger 402. As will appear presently, the time or instant when the sector stops swinging is invariable. The speed of movement being approximately constant, it will be seen that the location of the elevated detector determines the extent to which the sector will be swung.

Fixed to the finger 402 is a finger 407 (Fig. 117). The sector 404 is arranged to be yieldingly connected to the finger 407, so as to swing upwardly therewith, by means of a spring finger 407$^a$ adapted to enter a notch 404$^a$ in a projection on the sector 404. 407$^b$ is a stop for the spring finger 407$^a$. Additional means is provided for positively connecting the sector 404 to the finger 407, which means comprise a latch 408 (Fig. 118$^a$) slidably mounted on the sector and having a projection 409 adapted to overlie a projection 410 on the finger 407, as in Figs. 116, 118 and 118$^a$.

The latch 408 is operated by a lever 411 pivoted at 412 and carrying at its lower end a roller stud lying in a slot 413 in said latch. The upper end of the lever 411 is connected by a link 414 to one arm of a bell-crank lever 415. The other arm of the bell-crank is connected through the medium of a rod 416 and bell-crank 417 to a plunger 418 (Figs. 82, 83 and 117) on the carriage. Said plunger is provided with a roller which engages a series of cam projections 419 (Figs. 83 and 117) fixed to the rail 171. There is one such cam projection for each column, the plunger 418 engaging the projections 419 one after another as the carriage travels to the section in which the exhaust has occurred. By the means just described, the projections 409 and 410 are disengaged at an invariable point in the cycle of operation. To lock the sector in adjusted position, I provide a pivoted finger 420 (Fig. 117) having locking teeth adapted to mesh with the teeth of the sector. A coiled spring 421 strained between a pin 422 on the finger 420 and a curved link 423 attached to a double crank arm 424 fixed to the finger 402, tends to move the finger 420 into engagement with the sector. Said spring also tends to hold the finger 402 in position to engage an elevated detector. When, in the movement of the carriage, the finger 402 has swung upwardly so far that the point 425 is below a straight line joining the points 403 and 422, the spring 421 throws the finger 402 up still farther, and holds it there until the parts are reset.

While the carriage is traveling to the section in which the exhaust has occurred, the finger 420 is held out of engagement with the sector 404 by the finger 407, the latter being notched to receive the pin 422. After the finger 402 has struck the raised detector, the finger 420 is prevented from engaging the sector until the cam projection 419 for that section has operated the latch 408 to disengage the projections 409 and 410, by means of a slidably mounted locking bolt 432 (Figs. 113 and 118), one end of which normally lies in the path of the finger 420, the other end of said bolt being attached to the rod 416. 432ª is a compression spring tending to reset the bolt 432, the latch 408 and the plunger 418. When the roller on the plunger 418 rides up the cam projection 419 for the section in which the exhaust has occurred, the latch 408 is moved to release the sector from the finger 407, and the bolt 432 immediately thereafter allows the finger 420 to spring into engagement with the sector and lock it against movement, the finger 407ª springing out of the notch 404ª as soon as the sector is locked. The finger 407ª is provided so that the sector shall be under control during the moment between the withdrawal of the latch 408 and the engagement of the locking finger 420.

The locking of the sector also locks the plate 390 in adjusted position with relation to the carriage arm 279 and the knot-tying mechanism. As the carriage finishes its movement into position over the column, the plate 390 drops into engagement with the stop pin 388 and prevents further travel of the carriage arm (the latter having been previously unlocked through the withdrawal of the bolt 292). The knot-tying mechanism is thus arrested over the groove 2ª that contains the exhausted thread. Too sudden stoppage of the knot-tying mechanism is prevented by reason of the fact that the shaft 395 is somewhat springy.

In order that inertia shall not cause movement of the finger 402 and the sector 404 during the travel of the carriage to the column, I provide a bell crank 426, the arm 427 of which lies in the path of a projection 428 on the sector. The other arm 429 of said bell crank is normally held against a pin 430 (Fig. 117) on the finger 407 by a torsion spring 431. The upper end of the arm 429 is of cam formation. When the finger 402 strikes a detector, the finger 407 swings upwardly, and the pin 430 forces the arm 429 aside, thus moving the arm 427 out of the way of the projection 428.

To insure the proper placing of the new thread into the hooks of the elevated detector, there is provided on the carriage a yieldably-mounted thread carrier 433 (Fig. 112) comprising a rigid frame formed of the bracket 434, the channel bar 435 and the collar 435ª, said parts being rigidly secured together. Said frame is slidably mounted on two parallel guides 436 437 fixed to two bars 438 which are secured to the carriage. A spring 439 secured to the carrier 433 and one of the bars 438 tends to hold the carrier in the position shown in Fig. 118. The bracket 434 comprises the downwardly extending guide 440 (Fig. 112), the lower edge of which is curved as shown. Said guide 440 is in the vertical plane of the series of detectors and is so located as to stop against a raised detector. The thread carrier 433 is yieldingly mounted so that it may be arrested by any one of the twenty detectors of the section. On the carrier is a thread guide 441 having a slot 442 for the thread. When the carrier stops against a raised detector, the thread extends from the hook 12 on the bobbin box, and downwardly from the end of the box to the slot 442, the thread passing behind the guide 440. When the box is pushed down out of the carriage and onto the column, the inclined strand extending between the box and the slot 442 assumes a horizontal position, said strand then lying below the hooks 24 of the raised detector and below the guides 440 and 441. The slack caused by the movement of the thread from the inclined to the horizontal position is taken up by the fingers 373. (Fig. 103.)

After the knot is tied and the carriage has returned to its initial position, the detector is dropped onto the thread.

443 is a thread guide fixed to the forward box-elevating plunger 172 and serving to cam or guide the thread into the slot 442 as the box is lifted into the carriage.

As the carriage returns to its initial position, the carriage arm 279 is restored to its normal position, with reference to the carriage, through inertia. When the carriage reaches its initial position, the forward end of the carriage arm is accurately positioned and locked by a member 445 having a curved flange 446 adapted to enter the space between the adjacent ends of the rail 282 and a recessed stop 444 (Figs. 78 and 80) and prevent the roller 281 from leaving the recess in said stop. The locking member 445 is attached to a lever 447 which is operated by the link 346.

During the return movement of the carriage, the plate 390 is reset to its initial or normal position with reference to the carriage arm. As the carriage approaches its initial position, a finger 448 (Fig. 118) rigidly connected to the sector-locking finger 420 strikes a stop or cam 449 fixed to the machine frame, thus swinging the finger 420 out of engagement with the sector 404. A moment later the finger 402 strikes a stationary stop 450 and is thereby swung downwardly until the point 425 is above a straight line joining the points 403 and 422, whereupon the spring 421 completes the movement of the finger 402 into normal position. The contact of the lug 410 with the lug 409 brings the sector down to its normal position, thereby turning the shaft 395 in the direction to place the plate 390 in initial position. As soon as the lug 410 has slipped past the beveled end of the lug 409, the spring 432ª (Fig. 113) moves the latch 408 into engagement with the lug 410.

Referring now to the drive for the warp beam: The warp beam is driven at normal speed by means of the friction drum 72, said drum being driven by the shaft formed of the three sections 58ª 58ᵇ 58ᶜ. (See the front elevation, Fig. 2, and the rear elevation, Figs. 7 and 8). The shaft-section 58ª is continuously driven by a belt (not shown) running over the pulley 61. The shaft sections 58ª and 58ᵇ are connected by the clutch 59. The shaft-section 58ᶜ (which is geared to the beam-driving drum 72) is connected to the shaft section 58ᵇ in such a manner that the section 58ᶜ may be stopped and started without operating the clutch 59 or shifting the belt on the pulley 61. Herein I have shown the adjacent ends of the shaft sections 58ᵇ and 58ᶜ as connected by a compound epicyclic gear-train. This mechanism will be best understood by reference to the rear elevation, Fig. 7, and the sectional views, Figs. 11 and 12, wherein 464 is a brake drum having hubs or sleeves 465 in which the shaft-sections 58ᵇ and 58ᶜ are journaled. Said shaft-sections project into the drum 464 and there carry gear wheels 466 467. Said gears mesh with other gears 468 469, respectively, mounted upon a shaft 470 carried by the drum 464. The gears 468 and 469 are connected to rotate together. It will be seen that if the drum 464 be held against rotation, the shaft-section 58ᵇ will drive the section 58ᶜ, the gear train 466 468 469 467 and the gear train 73 74 being proportioned to afford the desired normal speed of winding.

The drum 464 is arranged to be locked against rotation by means of a brake band formed of two sections 471 472 pivoted upon a rod 473, said rod being supported in the framework of the machine. The brake-band sections 471 472 are moved into operative position by means of a crank arm 474 pivoted to the section 472 at 475 (Fig. 12) and to a rod 476 at 477. Said rod passes freely through lugs 478 479 on the brake-band sections, and is screw-threaded at its upper end to receive a nut 480 (Fig. 13). The nut 480 rests upon the lug 478. It will be seen that when the crank arm 474 is swung from the dotted line to the full-line position in Fig. 12 the brake-band sections will be drawn into contact with the periphery of the drum 464. A spring 481 tends to separate the brake-band sections, and a spring 482 acting upon a bolt 483 tends to lift the upper section clear of the drum and against an adjustable stop 484.

The crank arm 474 is connected through a rod 485 to a crank arm 486 fixed on a rock shaft 487. (See the plan view, Fig. 5, and the front view, Fig. 16). On said rock shaft is a crank arm 488 connected by a rod 489 to a bell crank 490 (Figs. 35, 36 and 119). A spring 491 (Fig. 16) tends to rock the shaft 487 in the direction to release the brake band. The bell crank 490 is normally locked in the position shown in Fig. 35 (with the brake band gripping the drum) by a lever 492 pivoted on the same axis as the bell crank 490 and arranged to be moved by the grooved cam 493 on the shaft 40. The upper end of the lever 492 carries a hook 494 adapted to engage the bell crank 490. When a thread exhausts, the detector mechanism operates the hook 494 to release the bell crank 490, whereupon the spring 491 releases the brake band. At the same time, means to be presently described arrests the rotation of the shaft-section 58ᶜ and thus stops the warp beam. When the shaft-section 58ᶜ is thus arrested, the shaft-section 58ᵇ revolves the drum 464 in the direction opposite to the direction of rotation of the shaft-section 58ᵇ. After the knot has been tied, and the slack in the united threads has been taken up, the cam 493 moves the hook 494 into engagement with the bell crank 490 and swings said bell crank back to normal position, thereby moving the brake band into engagement with the drum 464, the shaft-section 58ᶜ meanwhile having been released.

The means for arresting and releasing the shaft-section 58ᶜ comprises a brake drum 495 (see the plan view, Figs. 5 and 6 and the rear elevation, Figs. 7 and 8). Said drum is fixed on the shaft-section 58ᶜ and is arranged to be engaged by a brake band 496 similar to the band 471 472. The rods 476 and 476ª are oppositely screw-threaded (compare Figs. 10ª and 10ᵇ). The brake band 496 is operated by a crank arm 497 connected by a link 498 to a crank arm 499 on the rock shaft 487. Reference to Fig. 16 will show that the arms 486 and 499 extend from the shaft 487 in opposite directions; thus rotation of the shaft in direction to release the brake band 471 472 will operate to apply the brake band 496, and vice versa.

The amplitude of oscillation of the crank arms 486 and 499 is invariable, the movement of the bell crank 490 due to the spring being limited by impingement of the stop collar 499ª (Fig. 36ª) against a stop 499ᵇ, and the movement of the bell crank 490 in the opposite direction being of course limited by the form of the cam 493. It is desirable that the drum 495 shall promptly stop revolving in order that the end of the exhausted thread shall not pass the place at which the knot is to be tied. The extent of movement of the crank arms 486 and 499 being fixed, the brake bands must be adjusted to compensate for changes in the friction surfaces of said bands and for other factors affecting the operation of the brake. The adjusting means for the brake band 471

472 is shown in Figs. 5, 9, 9ª, 10ª, and 11 to 15. It includes means for turning the nut 480 to adjust the brake-band sections toward and away from one another. 500 (Fig. 12) is a ratchet wheel, the shaft of which is coupled by a sleeve 501 and pins 501ᵇ (Fig. 13) to the nut 480. The ratchet wheel 500 is arranged to be turned in one direction by a pawl 502 mounted on a slide bar 503. This bar is guided by a bearing 504 and a stud 505, said stud extending through an elongated opening 506 in the bar. A spring 507 tends to move the bar rearwardly to move the pawl 502 away from the wheel 500 and to move a pawl 502ᵇ into engagement with said wheel. On the slide bar 503 is lug 508 which is engaged by one end of a lever 509 (Fig. 10ª) arranged to be moved by a cam 510. Said cam is fixed to a shaft 511 (Fig. 15) which is rotatable within a tubular shaft 512 which in turn is rotatably mounted in the hub or sleeve 513 of a spur gear wheel 514. Said gear wheel meshes with a pinion 515 rigidly connected to the drum 464 (see Fig. 11). Fixed on the shaft 512 between the cam 510 and the gear wheel 514 is an arm 516 having a V-shape tooth 517 adapted to engage a series of similar teeth 518 (Fig. 15ª) on the side of the spur gear wheel 514. The shafts 511 and 512 are rigidly connected together by a pin 519 (Fig. 15ᵈ) extending through a flange 520 on the shaft 511 into a stop arm 521 adjustably clamped on the shaft 512. The arm 521 is normally held against a stationary stop 522 by a torsion spring 523 (Fig. 15). The spring 523 also acts as a compression spring to hold the tooth 517 yieldingly in engagement with the teeth 518. The shafts 511 512 are arranged to be moved longitudinally to free the tooth 517 from the teeth 518 by a bell crank 524 operated from the rock shaft 487 through a rod 525 and a crank arm 526 (Figs. 5 and 16). The relation of the crank arms 486 and 526 is such that when the shaft 487 is turned to release the brake-band sections 471 472, the arm 516 will be moved out of engagement with the teeth 518.

In Fig. 5, I have shown the brake mechanism for the drum 464 in the positions occupied just before the shaft 487 is turned to place the arm 516 in engagement with the teeth 518. The pawl 502ᵇ stands against the ratchet wheel 500 and the pawl 502 is away from the ratchet wheel, as shown in Fig. 5. The operation of the adjusting means for the brake-band 471 472 then is as follows: When the arm 516 is placed in engagement with the teeth 518, the cam 510, operating through the lever 509 and slide bar 503 moves the pawl 502 against a tooth of the ratchet wheel 500, (as in Fig. 9), but does not move the pawl far enough to turn the ratchet wheel. If the brake is properly adjusted, the arm 516 is carried around by the gear wheel 514 until said arm engages the lug 508 and imparts a further movement to the slide bar 503 (as in Fig. 9ª) to cause the pawl 502 to turn the ratchet wheel through the distance of one tooth or less in the direction to tighten the brake band, whereupon the drum 464 will stop. If the brake is not properly adjusted and requires tightening, the arm 516 will move the lug 508 far enough to turn the wheel 500 through the distance of more than one tooth. If the beam continues coasting until the lug 508 is forced against the bearing 504, the tooth 517 will be forced out of one tooth space in the wheel 514 and will spring into the next space, and will continue springing from tooth to tooth until the beam stops.

When another exhaust occurs, the shaft 487 is turned to release the brake band 471 472 and move the arm 516 out of engagement with the teeth 518, whereupon the spring 523 immediately returns the arm 516 and cam 510 to normal position and the spring 507 moves the slide bar 503 into the position shown in Fig. 5, in which movement the pawl 502ᵇ turns the ratchet wheel 500 through the distance of one tooth or a fraction thereof in the direction to loosen the brake band. Thus it will be seen that if the brake band is adjusted to such a point that the arm 516 does not swing far enough to move the lug 508, the pawl 502ᵇ will turn the ratchet wheel in the direction to loosen the brake band when the next exhaust occurs. The mechanism thus automatically adjusts the brake band as may be necessary to cause stoppage of the drum 464 in the desired length of time.

The brake-band-adjusting means for the band 496 is substantially identical with that just described, and is indicated in the drawings by the same numerals with exponents added. The pinion 515ª is fixed on the shaft-section 58ᶜ and therefore revolves in the direction opposite to that of the pinion 515 and the parts of the adjusting means for the band 496 are correspondingly reversed.

After the knot has been tied and before the regular winding operation is resumed, the slack in the united threads is taken up by giving the warp beam a partial rotation. This is done by rotating the shaft-section 58ᶜ by a special driving means, through substantially a half-revolution. To permit of such movement the brake-band 496 is released sufficiently to allow the shaft-section 58ᶜ to be turned, the other brake band 471 472 not being moved sufficiently to grip the drum 464. In order to obtain such release of the brake band 496 before the other brake band is set, the groove of the cam 493 (Fig. 37) is formed with two inclines separated by a dwell of sufficient length to allow the shaft-section 58ᶜ to be turned to take up the slack, as best indicated in the time chart, Fig. 134. Thus the rock shaft 487 is first turned sufficiently to release the drum 495 on the shaft-section 58c, and to free the arm 516a from the teeth 518a, but not sufficiently to brake the drum 464 or place the arm 516 in engagement with the teeth 518. After the shaft-section 58c has been turned through a half-revolution by the means to be presently described, the rock shaft 487 is turned still farther by the cam 493 to set the brake 471 472 and place the arm 516 in engagement with the teeth 518.

The means for "advancing" the warp beam or giving it the slack-taking-up movement comprises a rack bar 528 (Fig. 50) guided in a bearing 529 and attached at its upper end to a slide 530. The latter carries a roller stud 531 that runs in the groove 532 (Fig. 44) of a cam disk 533 fixed on the cam shaft 40. Said rack bar meshes with a pinion 534 loosely mounted on the shaft-section 58c. The pinion is provided with a sleeve 535 (Fig. 53) to which is keyed an arm 536. In said arm is pivotally mounted a pin 537 on which is loosely mounted a pawl 538 arranged to engage a ratchet wheel 539 fixed on the shaft-section 58c. Fixed to the pin 537 is a finger 540 arranged to lie in contact with the periphery of a stationary cam disk 541. Said disk is cut away at 542 (Fig. 52). A tension spring 543 acting upon the pawl 538 and a lug 544 fixed on the pin 537 tends to draw said pawl and lug toward each other to the extent permitted by stop shoulders 545 on said parts (see Fig. 54), and thus tends to place the pawl in engagement with the ratchet wheel. When the parts are in the position represented in full lines in Fig. 52, the weight of the pawl 538 and the lug 544 overbalances the finger 540, and holds the pawl away from the ratchet teeth. When the rack bar 528 descends, the arm 536 is swung in the direction indicated by the arrow in Fig. 52. As the finger 540 leaves the flattened portion 542 and moves onto the circular portion of the perimeter of the disk 541 the lug 544 is turned to draw the pawl 538 into engagement with the ratchet teeth. When the rack bar rises, the pawl 538 turns the ratchet wheel through a half-revolution, thereby giving the brake beam a slight movement to take up the slack in the united threads. The cam 493 then moves the rock shaft 487 to cause the drum 464 to be braked, whereupon the shaft-section 58c (and consequently the warp beam) are rotated, the speed of the beam increasing to full winding speed as the brake bands 471 472 become completely effective. If exhausts occurred at regular intervals, the beam-advancing means could be dispensed with. Said means has been provided because when two exhausts occur simultaneously or in rapid succession, so that the carriage makes two trips, one immediately after another, the slack of the first thread to be united should be taken up before the knot-tying mechanism returns.

It will be apparent from the foregoing description that all of the mechanisms for replenishing the columns and tying new threads to exhausted threads are driven from the cam shaft 40, and said mechanisms perform a complete cycle of operations during a single revolution of said shaft. In order that the shaft 40 shall stop promptly upon the completion of one revolution I provide means to prevent overrunning due to momentum, which means will next be described.

546 (Fig. 44) is a stationary reservoir to contain oil or other suitable liquid. In this reservoir is fixed a cylinder 547 having an inlet port 548 in its lower end. Said port is controlled by a check valve 549. 550 (Fig. 47) is an outlet for the cylinder 547, normally closed by a valve 551. In the cylinder 547 is a piston 552 to which is attached a rod 553 carrying a stop plate 554 adapted to engage a series of teeth 555 on the periphery of the cam 533. 556 is a spring which raises the piston 552 to the position shown in Fig. 49 when the stop plate 554 is disengaged from a tooth 555.

The stop plate 554 is moved into and out of engagement with the teeth 555 by a rod 557 connected to one arm of a bell crank 558 (Fig. 36), the other arm of said bell crank being attached to the arm 256 (Fig. 35) through the medium of a rod 559. The arm 256 is fixed to the shaft 256a. Also rigid with said shaft is an arm 560. This arm is arranged to be moved to the right (as viewed in Figs. 35 and 119) to throw out the clutch 47 and throw in the stop 554, by means of a lever 561 (Figs. 37 and 119), the lower arm of which carries a roller engaging the cam 562 on the shaft 40, and the upper arm of which lever carries a pivoted hook 563 adapted to engage the arm 560. When a thread exhausts, the detector mechanism swings the hook 563 out of engagement with the arm 560, whereupon the springs (not shown) in the clutch 47 cause the sections of the shaft 46 to be clutched together, the movement of the clutch being transmitted through the rod 255, the crank arm 256, the rod 559, the bell crank 558 and the rod 557 to the rod 553, to move the stop 554 away from the tooth with which it was in engagement. The spring 556 now raises the piston 552 into the position shown in Fig. 49. As the cam shaft 40 completes its revolution, the cam 562 moves the hook 563 into engagement with the arm 560 and then pulls said arm into the position shown in Fig. 35, thereby throwing out the clutch 47 and placing the stop 554 in the path of the tooth 555a of the cam disk 533. The impact of said tooth upon the stop is sufficient to force the piston 552 into the position shown in Fig. 44, oil being driven from the cylinder through the outlet 550 past the valve 551. The oil cushions the stoppage of the cam shaft, the latter coming to rest in the initial position.

The rods 553 and 557 (Fig. 44) are yieldingly connected by a pin 564 on the rod 553 extending through an elongated opening 565 in the rod 557, a spring 566 holding said pin yieldingly against one end wall of the opening.

In case the magnet 263 (Fig. 35) is energized to throw out the clutch 47 before the cam shaft 40 has completed its revolution, the stop 554 is moved into the path of the teeth 555 to stop the shaft promptly.

The valve 551 is yieldingly held closed by a spring 567 (Fig. 47). In order that this spring shall be automatically kept at the proper tension, I provide a spindle 568 supported in a bearing 569 and having a screw-thread engagement with a lug 570. The spring 567 surrounds said spindle and is interposed between the valve 551 and a washer 571, the latter lying against a ratchet wheel 572. To prevent the washer from turning, it is provided with an arm 571ª which is movable in a grooved stationary guide 571ᵇ. The ratchet wheel 572 is fixed on the spindle 568. Attached to the pin 573 (Fig. 49) that unites the piston 552 and the rod 553 is a bar 574 carrying a pawl 575 arranged to turn the ratchet wheel 572 in the direction to tighten the spring 567. When the pressure of the spring 567 is such that the piston descends only to the proper point, the pawl 575 turns the wheel 572 through the distance of a tooth or less, and when the piston rises the wheel is moved back to the same extent by a pawl 576. If, however, the spring is not sufficiently tensioned, the piston will descend below the proper point, and the wheel 572 will be rotated through a correspondingly greater arc to increase the tension of the spring.

If the spring 567 be excessively tensioned, the piston 552 will not descend to the normal extent, and hence the pawl 575 will not engage the ratchet wheel. The pawl 576 will then, on the upward movement of the piston, turn the ratchet wheel in the direction to loosen the spring 567. Thus the tension of said spring is automatically regulated.

Some variation in the initial position of the cam shaft 40 is allowable. If, however, the piston 552 is depressed to an excessive extent (as through failure of the cushioning means to act), a pin 577 (Fig. 45) on the bar 553 pushes a plunger 578 into engagement with two spring contacts 579 included in the circuit of the magnet 263, thereby causing the clutch 47 to be thrown out. If the cam shaft 40 continues turning after the circuit-closer 578 has been operated, the pin 564 strikes a fixed incline or cam 564ª and is thereby moved laterally to withdraw the stop 554 from the tooth 555ª, whereupon the spring 556 raises the stop, and the spring 566 places the stop in engagement with the next tooth. 580 is a pressure gage connected by a pipe 581 to the cylinder 547.

Referring now to Figs. 55 to 60: A roll 582 (Fig. 58) rests upon the yarn mass upon the warp beam. This roll is of sufficient length to extend from one end flange or head of the beam to the other. The roll 582 is controlled or guided by means of a plurality of yokes 583 attached to a bar 584 which in turn is fixed to slides 585 (Figs. 2, 55 and 56) vertically slidable upon the uprights 76. Antifriction rollers 586 are interposed between the roll 582 and the yokes 583. It will be seen that the yarn mass supports the roll 582, the bar 584 and the parts connected to said bar, the pressure of these elements serving to prevent the beam from coasting on the drum 72 when the brake is applied to the drum.

In order that the roll 582 may bear upon the entire yarn mass, said roll may be made extensible in any suitable way, as by providing the roll with an end section 582ª which is longitudinally slidable upon a cylindrical guide 587 fixed in the main section of the roll. Said main section and the end section are connected by intermeshing square lugs 588. A spring 589 presses the ends of the two sections of the roll into contact with the beam heads.

Rotatably mounted in the slides 585 is a shaft 590 having two pinions 591 upon its end portions. These pinions mesh with vertical rack bars 592 fixed in the machine frame. Loosely mounted on the shaft 590 is a bracket 593 carrying a pinion 594 that meshes with a spur gear wheel 595 fixed on the shaft 590. Rigidly connected to the pinion 594 is a spur gear wheel 596 which meshes with a pinion 597 supported by the bracket 593. Rigid with the pinion 597 is a brake disk 598. A lever 599 pivoted between its ends on the shaft 590 carries upon one arm a weight 600 and upon the other arm a brake shoe 601 adapted to bear against the periphery of the brake disk 598. To the bracket 593 is affixed an arm 602 carrying an adjustably mounted weight 603. When the warp beam is at rest the arm 602 is supported upon a pin 604 on an arm 605 rigidly connected to the adjacent slide 585. The leverage of the pinion 591 is so greatly reduced by the train of gears 595, 594, 596, 597 that the pressure of the shoe 601 is sufficient to hold the bar 584 and roll 582 suspended.

As the yarn mass upon the warp beam increases in diameter, the slides 585 rise, thereby causing the shaft 590 and spur gear 595 to revolve. The braking means 598 601 offers so much resistance to the rotation of the pinion 594 that the spur gear 595 lifts said pinion (and with it the bracket 593 and weight 603) until the lever 599 stops against the pin 604. The friction between the disk 598 and the shoe 601 is thereby relieved just sufficiently to allow the disk to turn. It will be seen that the weights 600 and 603 by their leverage resist upward movement of the roll 582 and the bar 584, and prevent downward movement of said bar.

If the yarn mass is slightly eccentric, the brake means 598 601 will resist upward movement of the roll 582 when the high point passes the drum 72 or the roll 582, whereby a wave-like motion is set up in the yarn mass from the high place to the low place, thus filling the latter. The brake means 598 601 also prevents the bar 584 from descending when the low place reaches the drum 72, therefore, the low place receives only the pressure of the roll 84. Thus eccentricity of the yarn mass is being continually corrected or prevented.

A handle 606 on the disk 598 provides means for manually rotating the disk to raise the roll 582, and for placing initial pressure on the beam.

The detector mechanism comprises, in addition to the series of detectors 23, a plurality of actuating members or "baskets" 607 (Figs. 21, 25 and 26), one for each section or column, said baskets partaking of the general form of a bail. Each basket is supported upon a pivot 608, and comprises a plate 609 of a width substantially equal to the width of a section. A fixed stop 610 arranged to engage the portion 611 of the basket determines the normal position of the latter. When in this position, the rear edge of the plate 609 lies in contact with the lower ends of the detectors of its section. When a thread exhausts, the detector for that thread drops until its shoulder 23ª stops against the ledge 612. The lower end of the detector is thereby brought within the range of action of a continuously rotating fluted roll 613. Said roll is driven by means of a pulley 613ª (Fig. 18) fixed on the shaft of said roll, a belt 613ᵇ running over said pulley and a pulley 613ᶜ (Fig. 16) fixed on the shaft 54. The fluted roll swings the detector forward, thereby swinging the basket 607 into the position shown in Fig. 23. Such movement of the detector inaugurates the operation of stopping the winding, replenishing the column, tying a new thread to the exhausted thread, and again starting the winding. The first steps of the operation consist in (a) releasing the brake 471 472 and setting the brake 496; (b) setting the knotter-positioning pin 388 for the section in which the exhaust occurred; (c) selecting the wrist-pin-inserting plunger 220 corresponding to said section; (d) unlocking the cam shaft 40 by withdrawing the stop 554 from the tooth 555ª; and (e) throwing in the clutch 47. These steps take place simultaneously.

The pins 388 (Fig. 94) are operated by means of rods 614 extending between the baskets 607 and the bell cranks 389. Springs 615 assist at the proper time to return the pins 388 and the baskets 607 to normal position.

The proper plunger 220 is selected by the notched locking bars 225, said bars being moved into a different predetermined position for each plunger by means to be now described.

Attached to each basket 607 is a bolt 616 (Figs. 26 and 28), the free end of which is slotted as at 617. Each bolt has locking recesses 618 therein. A longitudinally movable basket-bolt feeler bar 619 is provided with nineteen lugs 620 to engage the nineteen bolts 616. Said lugs are equidistantly spaced apart, the distance between the lugs being slightly less than the distance between the bolts 616. Thus it will be seen that the feeler bar 619 will move a certain distance to engage one bolt 616, a different distance to engage the next bolt, a still different distance to engage the next bolt, and so on. The lugs 620 enter the recesses 618 and thus lock the basket in operated position. The feeler bar 619 is connected to a slide 621 which in turn is connected by a link 622 to one arm of a bell crank 623 fixed to the upper end of the shaft 230. A spring 624 attached to the other arm of the bell crank tends to move the feeler bar 619 into engagement with a bolt 616. Said feeler bar is normally held against movement by a detent 625 (Figs. 29 and 30) connected to a lever 626 arranged to be moved by a crank 627 fixed to one end of a rock shaft 628. Said shaft carries arms 629 that support a basket feeler bar 630 arranged to be struck by a finger 631 on each basket when the basket is swung forward by a fallen detector. It will be seen that when a basket is swung forward by a detector, the shaft 628 will be turned, thereby unlocking the basket-bolt feeler bar 619 a moment after the bolt 616 attached to said basket has been placed in the path of the lugs 620 on said bar 619. As soon as the bar 619 is unlocked, the spring 624 moves said bar into engagement with the basket bolt. The bars 225 (Fig. 33) are thereby moved a corresponding distance to place a notch 226 in register with the proper plunger 220, so that when the cam shaft 40 is driven said plunger shall be projected by the segment 221 to insert into the crank 206 the wrist-pin 218 that corresponds to the section to which the fallen detector belongs.

On one end of the rock shaft 628 is a crank arm 632 (Figs. 119, 120, 121) carrying a pin 633 the ends of which overlie the tails of the hooks 494 and 563. When the shaft 628 is turned, as just described, the pin 633 depresses said tails and causes the hooks 494 and 563 to release the bell crank 490 and the arm 560. As soon as the bell crank 490 is released the spring 491 causes the brake drum 464 to be released and the drum 495 to be arrested, thereby stopping the warp beam. The releasing of the arm 560 allows the clutch 47 to throw itself in and the stop 554 to be moved away from the tooth 555$^a$. The cam shaft 40 is then rotated through a single revolution.

Fixed to the rock shaft 628 are arms 634 (Fig. 21) carrying a guard rail 635. When the shaft 634 is turned through the falling of a detector, the rail 635 is moved under the series of detectors in order to prevent any other detector from dropping into contact with the continuously rotated fluted roll 613. The shaft 628 is locked in such position by a detent 636 (Fig. 122) arranged to engage a shoulder 637 on a locking sector 638 fixed on one end of the shaft 628. Said detent is operated by a bell crank 639, one arm of which is arranged to be engaged by a cam 540 (Figs. 37 and 38), the other arm being connected by a link 641 to the detent. A spring 642 tends to move the detent into locking position. A spring 643 tends to turn the shaft 628 into normal position.

The basket is unlocked and the basket-bolt feeler bar 619 is returned to normal position by an arm 644 (Figs. 26, 36 and 37) rigidly connected to an arm 645 which is arranged to be moved by a cam 646. The basket is moved into normal position by a bar 647 (Fig. 31) having notches through which the rods 614 extend, said bar being carried by a rock shaft 648, and being arranged to engage collars 649 on the rods 614. The shaft 648 is rocked by a cam 650 (Fig. 37) acting upon an arm 651 fixed to a shaft 652 (Fig. 36). To the shaft 652 is fixed an arm 653 which is connected by a link 654 to a crank arm 655 (Fig. 30) rigidly mounted on the shaft 648.

As soon as the cam shaft 40 starts turning, the fallen detector is raised into position to receive the new thread, by means of a bar 656 (Fig. 21) having a curved edge adapted to engage with a hook 657 on the detector. The bar 656 is coextensive with the series of detectors and is yieldingly mounted on a plurality of arms 658 fixed on a rock shaft 659. This shaft is rocked by a cam 660 (Fig. 37) acting upon an arm 661 fixed to a shaft 662 (Fig. 36). On the shaft 662 is an arm 663 which is connected by a link 664 to a crank arm 665 (Fig. 30) on the shaft 659.

The detector lift bar 656 is yieldingly mounted so that if a detector is down when said bar descends, the bar can pass the detector and thereafter lift it.

I have heretofore described the operations of stopping the rotation of the warp beam, setting the knotter-positioning pin, selecting the wrist-pin-inserting plunger, unlocking the cam shaft 40, and throwing in the clutch 47. After the cam shaft begins revolving, the following operations occur: The cam 356$^d$ raises the reserve thread into the knotter and into the shear 352, 353, and operates the shear to shear said thread and clamp the end thereof. The cam 185 moves the box elevators 172 downward into the plane of the rails 121 122, withdraws the carriage-locking and alining bar 172$^a$, lowers the device 445 (Figs. 78 and 80) to release the cariage arm, and lowers the thread support 348. The cam 38 raises the roll 20 and moves forward the roll 3. The cam 234 causes the selected wrist-pin to be inserted into the connecting rod 206. The cam 242 withdraws the locking pin 243 from the crank 205, and the connecting rod 206. The cam 660 lifts the fallen detector. The cam 493 begins to move the hook 494 into position to engage the bell crank 490. The cam 562 begins to move the hook 563 into position to engage the arm 560. The cam 212 and the gear wheel 41 turn the crank 205 through a half revolution to move the carriage to the column in which the exhaust occurred. (The path of lateral movement of the reserve thread supported on the carriage is indicated by the dotted line RT in Fig 137, where it will be seen that the thread travels below the elevated arm 27 and roll 20; see also Fig. 135.) The cam 532 moves downward the beam-advance rack-bar 528. The cam surface $b$ (Fig. 1$^b$) causes the carriage arm 279 to be unlocked. The cam 186 closes the air valve 316$^b$, thereby creating suction through the slot 302 at the knotter. The cam surfaces $d$ and $e$ (Fig. 1$^b$) cause the plungers 192 193 to push the bobbin box out of the carriage and into operative position in the column, the boxes below being thereby pushed down until the lowermost box drops onto the continuously operating conveyer 86 86. As the box is pushed down, the inclined strand extending therefrom to the slot 442 assumes a horizontal position behind the raised detector. The cam 38 begins to lower the roll 20 and retract the roll 3. The cam groove 342 causes the finger 333 to lift the exhausted thread into the tying bill C$^5$ and the knot-tightening and stripping arm E, and causes the clamp 351 353 to release the reserve thread, the finger 333 being immediately returned to its normal position. The cam groove 326 actuates the knotter to tie the two threads together, the trimmed-off ends of the exhausted and reserve threads being drawn up the tubular knotter support and through the carriage arm and connections to the waste tank 315. The cam 186 opens the air valve, thus breaking the suction at the knotter. The cam 493 releases the brake drum 495. The cam 532 begins to pull the rack bar 528 up, thus turning the warp beam a few inches to take up the slack in the united threads. The cam 386 closes the contacts (so that if no thread had been present at the feeler the clutch 59 would have been thrown out). The cam 646 resets the basket-bolt feeler bar 619, thus unlocking the basket. The cam 650 and the spring 615 pull down the knotter-positioning pin 388 and return the basket 607 to normal position. The cam 640 releases the rock shaft 628 to the action of the spring 643, whereupon said shaft is turned into normal position, and the detent 625 (Fig. 29) is moved into operative position. The cam groove 326 and the cam 370 cause the thread to be cast off the feeler and slack-take-up device 366 373. The cam surface $f$ causes the box down-push plungers 192 193 to rise sufficiently to be clear of the tops of the columns. The cam 215 and the gear wheel 41 start to turn the crank 206 to bring the carriage back to initial position. The cam 493 acts to brake the drum 464, whereupon the warp beam is driven at high speed. The cam 242 pushes the locking pin 243 into the connecting rod 206 and the crank 205, and pushes the wrist-pin out of the connecting rod. The cam groove 326 resets the knotter as the carriage approaches its initial position. Before the cariage reaches its initial position the cam surface $h$ has begun raising the box down-push plungers 192 193 to their normal position, this position being reached after the carriage has stopped. As soon as the cariage reaches its initial position, the cam 185 causes the box lifters 172 to raise a bobbin box into the carriage. The cam 660 lowers the elevated detector, the hooks thereof engaging the thread. As the cam 660 begins to operate, the cam 562 starts to throw out the clutch 47. The cam 646 moves the arm 644 away from the bell crank 623, thus allowing the spring 624 to pull the member 621 against the detent 625.

At the same time that the cam 185 causes a box to be lifted into the cariage, said cam also causes the member 445 to lock the forward end of the carriage arm 279 against vibration, and causes the plate 346 to rise, thereby stripping a thread off said plate and onto the hook 349.

At the time the cam shaft 40 started to revolve, a clamp carrier 125 was standing at the position marked M in Fig. 77. As soon as said shaft began turning, said clamp carrier began advancing, and continued traveling until it reached the position marked N, at which time the cam shaft stopped. During this traveling movement, the clamp 124 on said carrier has drawn the thread around the plate 348, thereby placing the strand $k$ that extends between said plate and the foremost box on the rails 121 and 122 in approximately the vertical plane indicated in Fig. 102. The strand $j$ that extends from the plate 348 to the clamp 124 lies alongside the shank of the hook 355. As soon as the carriage reaches its initial position, the elevators lift the box into the carriage and the plate 348 places the loop on the support 349, the raising of the box and the plate 348 causing the strand $k$ to rise into the horizontal plane indicated in Fig. 102. The slack created by the transfer of the loop from the plate 348 to the support 349 is taken up, partly, by the rising of the box into the position shown in Fig. 111, due to the deflection in the strand $a$ from the guide 441 to the box, and partly by reason of the continuing movement of the clamp carrier.

Just before the carriage starts upon another trip to a column, the hook 355 raises the strand $b$ into the knotter and into the shear 352, 353, and operates said shear to shear and clamp said thread. As the carriage starts, the crank 375 (Fig. 102) leaves the cam 376, whereupon the hook 377 moves in under the strand $a$, and the fingers 373 move the strand against the shoulders 367$^a$.

It will be seen that the bobbin boxes move in an endless path, which path comprises a plurality of shunts or parallel branches defined by the guiding structure which contains the vertical columns of boxes.

While I have described the present embodiment of the invention with considerable particularity, I would have it understood that the invention is not limited to the form and arrangement of mechanisms herein disclosed.

I claim as my invention:

1. A winder having, in combination, means for winding threads; means for stopping and subsequently restarting the winding means; and means for detecting exhaustion of the threads being wound, said detecting means controlling said stopping and restarting means.

2. A winder having, in combination, means for supporting and driving a warp beam; means for stopping and subsequently restarting the beam-driving means; and means for detecting exhaustion of the threads being wound, said detecting means controlling said stopping and restarting means.

3. A winder having, in combination, a beam-driving shaft; a power shaft; a gear train connecting said shafts; a brake for the beam-driving shaft; a brake for the gear train; and means actuated upon the occurrence of an exhaust for applying the first mentioned brake and releasing the second mentioned brake.

4. A winder having, in combination, a beam-driving shaft; a power shaft alined therewith; a reduction gear-train connecting the adjacent ends of said shafts; a brake for the beam-driving shaft; a brake for the gear train; and means actuated upon the occurrence of an exhaust for applying the first mentioned brake and releasing the second mentioned brake.

5. A winder having, in combination, a beam-rotating drum; means tending to rotate said drum; a brake for said drum; a bobbin-supporting structure; detector mechanism for the threads extending from said structure to the beam; thread-replenishing mechanism; cams controlling said replenishing mechanism and said brake; and means for driving said cams, said detector mechanism being arranged to connect said driving means to said cams.

6. A winder having, in combination, a beam-rotating drum; means tending to rotate said drum; a brake for said drum; means for applying the brake; means for releasing the brake; a bobbin-supporting structure; detector mechanism for the threads extending from said structure to the beam; thread-replenishing mechanism; a cam shaft; cams on said shaft for controlling said replenishing mechanism and operating said brake-releasing means; driving means; a clutch tending to connect the driving means to said cam shaft; means to hold the clutch out of action, said detector mechanism being arranged to operate the brake-applying means and release the clutch-holding means.

7. A winder having, in combination, a guide roll; a detector mechanism; a plurality of tension-reducing rolls, said detector mechanism being located between the tension-reducing rolls and the guide roll; a table provided with thread-guiding grooves, said tension-reducing rolls being located adjacent to one end of said table; a guide roller at the other end of said table; and means for winding a sheet of threads extending over said guide roll, thence into operative relation with the detector mechanism, thence between the tension-reducing rolls, thence through the grooves of the table, and thence over said guide roller.

8. The combination of a stationary vertical guide-way through which bobbin boxes may gravitate; a horizontal support; a column of bobbin boxes in said guideway the boxes being stacked one upon another; other bobbin boxes on said support; and means for conveying boxes from the support to the top of the column.

9. A winder having, in combination, a vertical guideway; a horizontal support; a column of bobbin boxes in said guideway; other bobbin boxes on said support; a carriage for conveying boxes from the support to the guideway; means for transferring boxes from the support to the carriage; and means for transferring boxes from the carriage to the guideway.

10. A winder having, in combination, a set of boxes for containing bobbins; means for unwinding yarn from bobbins in said set of boxes; a source of supply of boxes; and a carriage for conveying a box from the source of supply to the set of boxes.

11. A winder having, in combination, a column of bobbin boxes; means for unwinding yarn from bobbins in the boxes; a source of supply of boxes; a carriage for conveying a box from the source of supply to the column; and means on the carriage for placing such box in the column.

12. A winder having, in combination, a vertical column of bobbin boxes; means for unwinding yarn from bobbins in said boxes; a source of supply of bobbin boxes; a carriage for conveying a bobbin box from the source of supply to a point above the column; and means on the carriage for pushing a box out of the carriage and onto the top of the column and for depressing the column.

13. A winder having, in combination, a set of bobbin boxes; means for unwinding yarn from bobbins contained in said boxes; a source of supply of bobbin boxes; a carriage; means for moving a box from the source of supply into the carriage; means moving with said carriage for supporting the end of the thread on the bobbin in the box carried by the carriage; a knot-tying mechanism arranged to travel with said carriage; means for moving said carriage to convey a box to said set of boxes; and means for actuating the knot-tying mechanism to tie said thread to an exhausted thread.

14. A winder having, in combination, a vertical guideway, a horizontal support; a column of bobbin boxes in said guideway; other bobbin boxes on said support; a carriage for conveying boxes from the support to the guideway; means for transferring boxes from the support to the carriage; and means for pushing a box out of the carriage and against the upper end of the column of boxes.

15. A winder having, in combination, a vertical guideway; a horizontal support arranged approximately in the horizontal plane of the upper end of the guideway; a column of bobbin boxes in said guideway; other bobbin boxes on said support; a carriage reciprocable in a horizontal plane above said horizontal support and guideway for conveying boxes from said support to said guideway; means for transferring boxes from the support to the carriage; and means for transferring boxes from the carriage to the guideway.

16. A winder having, in combination, a vertical guideway; a horizontal support arranged approximately in the horizontal plane of the upper end of the guideway; a column of bobbin boxes in said guideway; other bobbin boxes supported on said support; a carriage reciprocable in a horizontal plane above said support and guideway for conveying boxes from said support to said guideway; an elevator for transferring boxes from the support to the carriage; and means for pushing a box out of the carriage and against the upper end of the column of boxes.

17. A winder having, in combination, a series of bobbin boxes; means forming an endless path for said boxes, said path comprising a plurality of shunts each consisting of a vertical guideway, each guideway being arranged to contain a plurality of boxes, and means for winding threads from boxes in said guideways.

18. A winder having, in combination, means forming a plurality of parallel vertical guideways; a column of bobbin boxes in each guideway; a conveyer receiving bobbin boxes from one end of all of said guideways; means to which the boxes are delivered by said receiving conveyer for transporting the boxes to a point adjacent the other end of the guideways; and means for conveying boxes from said point to the columns.

19. A winder having, in combination, means forming a plurality of parallel vertical guideways; a column of bobbin boxes in each guideway; a conveyer receiving bobbin boxes from the lower end of said guideways; means to which the boxes are delivered by said conveyer for transporting the boxes to a point adjacent to the upper end of the guideways; and means for conveying boxes from said point to the columns.

20. A winder having, in combination, means forming a plurality of parallel vertical guideways; a column of bobbin boxes in each guideway; means receiving bobbin boxes from one end of all of said guideways; means to which the boxes are delivered by said receiving means for transporting the boxes to a point adjacent the other end of the guideways; and a reciprocatory carriage for conveying boxes from said point to the columns.

21. A winder having, in combination, means forming a plurality of parallel vertical guideways; a column of bobbin boxes in each guideway; a conveyer receiving bobbin boxes from one end of all of said guideways; an elevator to which the boxes are delivered by said conveyer, means for transporting the boxes from the elevator to a point adjacent the other end of the guideways; and means for conveying boxes from said point to the columns.

22. A winder having, in combination, a vertical guideway; a column of bobbin boxes in said guideway; means for yieldingly supporting the boxes against the action of gravity and means for unwinding yarn from boxes contained in the guideway.

23. A winder having, in combination, a vertical guideway; a column of bobbin boxes in said guideway; a conveyer arranged beneath the column; means for yieldingly supporting the boxes against the action of gravity; and means for depressing the column to release the lowermost box to the action of gravity.

24. A winder having, in combination, a vertical guideway; a thread-guiding roll at the upper end of said guideway; a column of bobbin boxes in said guideway; means for holding the top box out of contact with the roll; and means urging the remainder of the column forward, and serving to yieldingly support the column against the action of gravity.

25. A winder having, in combination, a plurality of vertical guideways; a horizontal support; a column of bobbin boxes in each guideway; a row of bobbin boxes on said support; a reciprocatory carriage for conveying boxes from the support to the guideways; and means for adjusting the length of movement of said carriage.

26. A winder having, in combination, a plurality of vertical guideways; a horizontal support located approximately in the horizontal plane of the upper ends of said guideways; a column of bobbin boxes in each guideway; a row of bobbin boxes on said support; a reciprocatory carriage for conveying boxes from one end of said support to the guideways; and means for moving the row of boxes on said support toward the before-mentioned end thereof.

27. A winder having, in combination, means forming a plurality of parallel vertical guideways; a column of bobbin boxes in each guideway; a conveyer receiving bobbin boxes from the lower end of all of said guideways; an elevator which removes the boxes from the conveyer and elevates and inverts the boxes; means for righting the boxes and moving them to a point adjacent to the upper end of the guideways; and means for conveying boxes from said point to the columns.

28. The combination of a vertical guideway; a horizontal support; creel elements in said guideway; other creel elements on said support; and means for conveying creel elements from the support to the guideway.

29. A winder having, in combination, a reciprocatory carriage for transporting a bobbin box; stationary means below the path of movement of the carriage for supporting a bobbin box; and means for elevating a box off said supporting means and into said carriage.

30. A winder having, in combination, a reciprocatory carriage for transporting a bobbin box; stationary means below the path of movement of the carriage for supporting a bobbin box; means for elevating a box off said supporting means and into said carriage; and means for frictionally securing the box in the carriage.

31. A winder having, in combination, a carriage adapted to support a bobbin box; and means on the carriage for preventing a bobbin from rolling about in the box.

32. A winder having, in combination, a reciprocatory bobbin-box carriage, a box-ejector on the carriage, and means for accurately positioning and locking the carriage in the initial position.

33. A winder having, in combination, a reciprocatory bobbin-box carriage, a box-ejector on the carriage, and means for accurately positioning and locking the carriage in the final position.

34. A winder having, in combination, a reciprocatory carriage, uniting mechanism on said carriage; and means for driving said mechanism comprising a rack supported by the carriage, and an elongated pinion extending longitudinally of the path of movement of the carriage and of such length that the rack is always in mesh with the pinion.

35. A winder having, in combination, a bobbin-box carriage; an arm attached to the carriage to swing with relation to the carriage; a knot-tying mechanism supported by such arm; means for locking said arm against swinging movement; means for operating said lock to release the arm; and means for adjusting said arm with relation to the carriage.

36. A winder having, in combination, a bobbin-box carriage; an arm attached to the carriage to swing with relation to the carriage; a knot-tying mechanism supported by such arm; means for locking said arm against swinging movement; means for operating said lock to release the arm; means for winding a plurality of threads; a detector for each thread; and detector-controlled means for adjusting said arm with relation to the carriage.

37. A winder divided into sections, and having, in combination, means for winding a plurality of threads; a detector for each thread; a knot-tying mechanism; means for moving the knot-tying mechanism to a section; and detector-controlled means for variously positioning the knot-tying mechanism in the section.

38. A winder divided into sections, and having, in combination, means for winding a plurality of threads; a detector for each thread; means for raising a fallen detector; a knot-tying mechanism; means for moving the knot-tying mechanism to a section; and means moving with the knot-tying mechanism and adapted to be operated by a raised detector for variously positioning the knot-tying mechanism in the section.

39. A winder divided into sections, and having, in combination, means for winding a plurality of threads; a detector for each thread; means for raising a fallen detector; a knot-tying mechanism; means for moving the knot-tying mechanism to a section; means for variously positioning the knot-tying mechanism in the section; and a finger moving with the knot-tying mechanism and arranged to strike a raised detector for actuating said positioning means.

40. A winder divided into sections, and having, in combination, means for winding a plurality of threads; a detector for each thread; a knot-tying mechanism; means for moving the knot-tying mechanism to a section; a stop for each section; means moving with the knot-tying mechanism and adapted to co-act with said stop to position the knot-tying mechanism in the section; and detector-controlled means for adjusting the means that coacts with said positioning device.

41. A winder divided into sections, and having, in combination, means for winding a plurality of threads; a knot-tying mechanism; means for moving the knot-tying mechanism to a section; positioning means for each section; means moving with the knot-tying mechanism and adapted to co-act with said positioning means; and means for adjusting the means that co-acts with the positioning means.

42. A winder divided into sections, and having, in combination, means for winding a plurality of threads; a detector for each thread; means for raising a fallen detector; a knot-tying mechanism; means for moving the knot-tying mechanism to a section; positioning means for each section; devices moving with the knot-tying mechanism for co-acting with the positioning means; and means arranged to engage a raised detector for adjusting said devices.

43. A winder having, in combination, means for winding a plurality of threads; a detector for each thread; a knot-tying mechanism; a pivoted finger moving with said knot-tying mechanism and arranged to engage a raised detector; a pivoted sector also moving with said knot-tying mechanism; means for connecting said finger and sector so that the latter will be moved when the former engages a raised detector; means for disengaging the sector from the finger; means for locking the sector after disengagement from the finger; and means connected to the sector for positioning the knot-tying mechanism.

44. A winder divided into sections, and having, in combination, means for winding a plurality of threads; a knot-tying mechanism; means for moving the knot-tying mechanism to a section; a stop for each section; a member moving with the knot-tying mechanism and adapted to engage the stop; and means for adjusting said member with relation to the knot-tying mechanism.

45. A winder divided into sections, and having, in combination, means for winding a plurality of threads; a detector for each thread; a knot-tying mechanism; means for moving the knot-tying mechanism to a section; a stop for each section; a member moving with the knot-tying mechanism and adapted to engage the stop; and detector-controlled means for adjusting said member with relation to the knot-tying mechanism.

46. A winder divided into sections, and having, in combination, means for winding a plurality of threads; a detector for each thread; a knot-tying mechanism; means for moving the knot-tying mechanism to a section; a stop pin for each section; detector-controlled means for setting one of said pins in operative position; a member moving with the knot-tying mechanism and adapted to engage a set pin; and means for adjusting the position of said member with relation to the knot-tying mechanism.

47. A winder divided into sections, and having, in combination, means for winding a plurality of threads; a detector for each thread; a knot-tying mechanism; means for moving the knot-tying mechanism to a section; a stop pin for each section; detector-controlled means for setting one of said pins in operative position; a member moving with the knot-tying mechanism and adapted to engage a set pin; and detector-controlled means for adjusting the position of said member with relation to the knot-tying mechanism.

48. A winder having, in combination, a carriage for transporting a bobbin box; a knot-tying mechanism moving with the carriage; means for winding a plurality of threads; a detector for each thread; means for raising a fallen detector; detector-controlled means for positioning the knot-tying mechanism; and detector-controlled means for guiding the new thread into operative relation to the raised detector.

49. A winder having, in combination, a carriage for a bobbin box; a guide on the carriage for the thread extending from a bobbin contained in a box in the carriage; means for inserting a box into the carriage; and means for guiding the thread into said guide.

50. A winder having, in combination, a carriage for a bobbin box, a guide on the carriage for the thread extending from a bobbin contained in a box in the carriage; an elevator for inserting a box into the carriage; and means on the elevator for guiding the thread into said guide.

51. A winder having, in combination, a reciprocatory structure having a space therein to receive a bobbin box; a thread clamp on said structure; mechanism for moving bobbin boxes and thread ends to one end of the path of movement of said structure; and devices for placing a bobbin box in said space and a thread end in said clamp.

52. A winder having, in combination, a reciprocatory structure having a space to receive a bobbin box; a thread clamp located on said structure at a point removed from said space; means for moving a series of boxes toward a point adjacent to the initial position of said structure; a mechanism for conveying thread-ends of bobbins contained in said boxes to a point adjacent the initial position of said thread-clamp; and devices for moving bobbin boxes and thread-ends into said space and said thread clamp respectively.

53. A winder having, in combination, a carrier; a thread clamp mounted on said carrier; means for moving the carrier; a projection on the carrier; a carriage mounted for movement parallel with the direction of movement of the carrier; and clamp-operating means on the carriage.

54. A winder having, in combination, a carrier; a thread clamp mounted on said carrier; means for moving the carrier; a projection on the carrier; a carriage mounted for movement parallel with the direction of movement of the carrier; clamp-operating means on the carriage; and means on the carrier to move the carriage.

55. A winder having, in combination, a guide; a row of carriers mounted on said guide; a thread clamp on each carrier; means for pushing the row of carriers along the guide; a carriage mounted for movement parallel with the direction of movement of the row of carriers; clamp-operating means on said carriage; means for moving the carriage in the direction opposite to the direction of movement of the carriers; and means on the carriers for causing said carriage to travel with the carriers.

56. A winder having, in combination, a guide; a row of carriers mounted on said guide; a thread clamp on each carrier; means for pushing the row of carriers along the guide; a carriage mounted for movement parallel with the direction of movement of the row of carriers; clamp-operating means on said carriage; means for moving the carriage in the direction opposite to the direction of movement of the carriers; means on the carriers for causing said carriage to travel with the carriers; and means on said carriage for releasing the carriage from successive carriers.

57. A winder having, in combination, a traveling series of clamp carriers; a thread-clamp on each carrier; means tending to close each clamp; a carriage movable alongside the clamp carriers; a clamp-opening device on said carriage; means tending to move said carriage in the direction to open the clamps; means on the carriage arranged to engage each carrier for preventing such movement of the carriage; and means on the carriage for withdrawing said preventing means.

58. A winder having, in combination, a guide; a row of carriers mounted on said guide; a thread clamp on each carrier; means for pushing the row of carriers along the guide; a carriage mounted for movement parallel with the direction of movement of the row of carriers; clamp operating means on said carriage; a weight tending to move the carriage in the direction opposite to the direction of movement of the carriers; means on the carriers for causing said carriage to travel with the carriers; and means on said carriage for releasing the carriage from successive carriers.

59. A winder having, in combination, a carrier; a thread clamp mounted on the carrier; a carriage having an edge across which a thread extending through the clamp may be laid; means on the carrier tending to close said clamp; and means on the carriage for controlling said closing means.

60. A winder having, in combination, a carrier; a thread clamp mounted on the carrier; a carriage; means on the carrier tending to close said clamp; and means on the carriage for controlling said closing means.

61. A winder having, in combination, an endless rail; a plurality of clamp carriers movably mounted upon said rail; a thread-clamp upon each carrier; and means for moving the carriers along said rail.

62. A winder having, in combination, an endless rail; plurality of clamp carriers movably mounted on said rail; a thread-clamp on each carrier; an endless chain provided with means for engaging and moving the clamp carriers; and means for moving said chain.

63. A winder having, in combination, an endless rail; a plurality of clamp carriers movably mounted on said rail; a thread-clamp on each carrier; an endless chain provided with means for engaging and moving the clamp carriers; means for moving said chain, said chain extending lengthwise of and adjacent to a portion of said rail; and auxiliary means for moving the clamp carriers along the remainder of the rail.

64. A winder having, in combination, a carrier, a thread clamp mounted on said carrier; a spring tending to hold the clamp closed; and a stop on the carrier to limit the action of the spring.

65. A winder having, in combination, winding means, a creel, a carriage for transporting a yarn mass to the creel, a knotter on the carriage, and means for actuating the carriage and the knotter.

66. A winder having, in combination, a thread-support; a thread-clamp movable to place a loop of thread on said support; a knot-tying mechanism provided with a thread-support; and means for moving the first mentioned support to transfer the loop onto the second mentioned support.

67. A winder having, in combination, a thread support; means for placing a loop of thread on said support; a knot-tying mechanism provided with a thread support; and means for moving the first mentioned support to transfer the loop onto the second mentioned support.

68. A winder having, in combination, a knot-tying mechanism; a thread shear adjacent to said mechanism; a thread clamp movable to draw a thread into position adjacent to said mechanism and said shear; means for moving the thread laterally into the shear; and means for actuating the shear.

69. A winder having, in combination, a knot-tying mechanism; a thread shear adjacent to said mechanism; a thread clamp movable to draw a thread into position adjacent to said mechanism and said shear; means for moving the thread laterally into the shear; means for actuating the shear; means for opening the thread clamp to release the thread portion cut off by said shear; and exhaust means for removing said thread portion.

70. A winder having, in combination, a knot-tying mechanism provided with a thread support; a stripping member adjacent to said support; a support for a loop of thread, said supports being located adjacent to one another; and means for moving the second mentioned support to carry the loop against said stripper member and thus strip the loop off the second mentioned support and onto the first mentioned support.

71. A winder having, in combination, a carriage for a bobbin box; an arm attached at one end to said carriage; a knot-tying mechanism at the other end of said arm; and slack take-up means on said arm intermediate the carriage and the knot-tying mechanism.

72. A winder having, in combination, a carriage for a bobbin box; an arm attached at one end to said carriage; a knot-tying mechanism at the other end of said arm; and thread-detector means on said arm intermediate the carriage and the knot-tying mechanism.

73. A winder having, in combination, a carriage for a bobbin box; an arm attached at one end to said carriage; a knot-tying mechanism at the other end of said arm; and a thread-support on said arm intermediate the carriage and the knot-tying mechanism.

74. A winder having, in combination, a carriage for supporting a bobbin box; an arm attached at one end to said carriage; a knot-tying mechanism attached to the other end of said arm; slack take-up means on said arm intermediate the knot-tying mechanism and the carriage; said means comprising two sets of members between which sets a thread may extend; and means tending to move one of said sets into intermeshing relation with the other set, said moving means being restrained by the tension of the thread.

75. A winder having, in combination, a carriage for supporting a bobbin box; an arm attached at one end to said carriage; a knot-tying mechanism attached to the other end of said arm; slack take-up means on said arm intermediate the knot-tying mechanism and the carriage, said means comprising two sets of members between which sets a thread may extend; means tending to move one of said sets into intermeshing relation with the other set, said moving means being restrained by the tension of the thread; and means for casting the thread off from said members.

76. A winder having, in combination, a bobbin box carriage; an arm attached at one end to said carriage; a knot-tying mechanism at the other end of said arm; a thread-detector on said arm intermediate the knot-tying mechanism and the carriage; and means for casting off a thread from said detector.

77. A winder having, in combination a bobbin box carriage, an arm attached at one end to said carriage; a knot-tying mechanism at the other end of said arm; a circuit-closer on said arm; and means for operating said circuit closer to close a circuit, said means being arranged to be withheld from action by a thread extending between the knot-tying mechanism and the carriage.

78. A winder having, in combination, a guideway; a thread-guiding roll at one end of the guideway; a column of bobbin boxes in said guideway, one end of each of the boxes being grooved, the grooves extending longitudinally of the guideway, and the grooves in one box being alined with those of adjacent boxes, said grooves forming with the adjacent wall of the guideway a plurality of closed channels through which threads may pass from the boxes to the roll; and a grooved shim at the end of the guideway adjacent to said roll; the grooves in said shim being arranged to register with the grooves in the end of an adjacent box, said shim being arranged to keep said box out of contact with the roll.

79. A winder having, in combination, a plurality of vertical columns of bobbin boxes; a grooved table adjacent to the upper end of said columns; means for guiding threads from the bobbin boxes to said table; and means below the table for supporting and rotating a warp beam.

80. A winder having, in combination, a plurality of vertical columns of bobbin boxes; a table adjacent to the upper end of said columns, said table having thread grooves therein; means for guiding threads from the bobbin boxes to the grooves; tension-reducing rolls adjacent to said guide means; and means for winding the threads upon a warp beam.

81. A winder having, in combination, a plurality of vertical columns of bobbin boxes; a grooved table adjacent to the upper end of said columns; a bobbin-box carriage horizontally reciprocable over the upper ends of the columns; means on said carriage for transferring a bobbin box from the carriage to a column; means for guiding threads from the bobbin boxes to said table; and means for winding said threads upon a warp beam.

82. A winder having, in combination, a plurality of vertical columns of bobbin boxes; a grooved table adjacent to the upper end of said columns; a bobbin box carriage reciprocable horizontally over said columns; a knot-tying mechanism traveling with said carriage at the side of the table opposite to the side at which the columns are located; means for guiding threads from the bobbin boxes to said table; and means for winding said threads upon a warp beam.

83. A winder having, in combination, a table having a plurality of thread-guiding grooves therein; a knot-tying mechanism; means for moving said knot-tying mechanism and a reserve thread into position above one of said groves; means for lifting a thread from said groove into operative relation to the knot-tying mechanism; and means for actuating said mechanism to unite said threads.

84. A winder having, in combination, a table having a plurality of thread-guiding grooves therein; a knot-tying mechanism; means for moving said knot-tying mechanism and a reserve thread into position above one of said grooves; air exhaust means for lifting a thread from said groove into operative relation to the knot-tying mechanism; and means for actuating said mechanism to unite said threads.

85. A winder having, in combination, a table having a plurality of thread-guiding grooves therein; a detector mechanism located adjacent to one end of said grooves; a knot-tying mechanism movable in a path located adjacent to the opposite ends of said grooves; means moving with said knot-tying mechanism for supporting a reserve thread; means for lifting a thread from one of said grooves into operative relation to the knot-tying mechanism; and means for actuating said mechanism to unite said threads.

86. A winder having, in combination, a bobbin carriage; means for reciprocating said carriage; a knot-tying mechanism connected to said carriage; and means for adjusting the knot-tying mechanism with relation to the carriage.

87. A winder having, in combination, means for winding a sheet of threads, a bobbin carriage movable transversely of the sheet of threads; a knot-tying mechanism connected to said carriage; detector mechanism for the threads; and detector-controlled means for adjusting the knot-tying mechanism with relation to the carriage.

88. A winder having, in combination, winding means, detectors for detecting exhaustion of the threads being wound, and an intermittently-traveling normally-idle knotter for tying a reserve thread to an exhausted thread, said knotter being controlled by the detectors.

89. A winder having, in combination, means for winding a sheet of threads; a knot-tying mechanism reciprocable across the sheet of threads; and air-exhaust means moving with the knot-tying mechanism for moving an exhausted thread out of the sheet and into proximity to the knot-tying mechanism.

90. A winder having, in combination, a table having a plurality of parallel thread-guiding grooves therein; means for winding threads extending through said grooves; a knot-tying mechanism reciprocable over the table and transversely of the threads; and means moving with the knot-tying mechanism for lifting a thread out of its groove and into proximity to the knot-tying mechanism.

91. A winder having, in combination, means for winding a sheet of threads; two rolls between which said sheet passes, said rolls being driven at a speed greater than the speed of winding; a thread-carrying structure arranged to reciprocate over the sheet of threads; and means for separating said rolls to form a space for the passage of the thread carried by said structure.

92. A winder having, in combination, means for winding a sheet of threads; two rolls between which said sheet passes; a roller over which said sheet passes; a thread-carrying structure arranged to reciprocate over the sheet of threads; means for separating said rolls to form a space for the passage of the thread carried by said structure; and means for moving said roller to take up slack produced in the sheet of threads by the separation of said rolls.

93. A winder having, in combination, a structure for supporting bobbins; a reciprocatory carriage for conveying bobbins to said structure; a crank and connecting rod for reciprocating said carriage; and means for varying the connection between the connecting rod and the crank to alter the length of movement of the carriage.

94. A winder having, in combination, a knot-tying mechanism; a crank and connecting rod for reciprocating said knot-tying mechanism; and means for varying the connection between the connecting rod and the crank to alter the length of movement of the knot-tying mechanism.

95. A winder having, in combination, a structure for supporting bobbins; means for winding threads extending from said bobbins; detector mechanism for the threads; a reciprocatory carriage fo conveying bobbins to said structure; a crank and connecting rod for reciprocating said carriage; and detector-controlled means for varying the connection between the connecting rod and the crank to alter the length of movement of the carriage.

96. A winder having, in combination, a knot-tying mechanism; a crank and connecting rod for reciprocating said knot-tying mechanism; a wrist pin in said crank; and mechanisms for inserting the pin in the connecting rod and for withdrawing said pin from the rod.

97. A winder having, in combination, a structure for supporting bobbins; means for winding threads extending from said bobbins; detector mechanism for the threads; a reciprocatory carriage for conveying bobbins to said structure; a crank and connecting rod for reciprocating said carriage; a plurality of wrist pins set in said crank at different distances from the axis of the crank; and detector-controlled means for selectively inserting wrist pins into said connecting rod.

98. A winder having, in combination, a structure for supporting bobbins; means for winding threads extending from said bobbins; detector mechanism for the threads; a reciprocatory carriage for conveying bobbins to said structure; a crank and connecting rod for reciprocating said carriage; a plurality of wrist pins set in said crank at different distances from the axis of the crank; a plunger for each wrist pin; means for selecting a plunger; and means for moving the selected plunger against the corresponding wrist pin for inserting the latter into the connecting rod.

99. A winder having, in combination, a structure for supporting bobbins; means for winding threads extending from said bobbins; detector mechanism for the threads; a reciprocatory carriage for conveying bobbins to said structure; a crank and connecting rod for reciprocating said carriage; a plurality of wrist pins set in said crank at different distances from the axis of the crank; a plunger for each wrist pin; detector-controlled means for selecting a plunger; and means for moving the selected plunger against the corresponding wrist pin for inserting the latter into the connecting rod.

100. A winder having, in combination, a structure for supporting bobbins; means for winding threads extending from said bobbins; detector mechanism for the threads; a reciprocatory carriage for conveying bobbins to said structure; a crank and connecting rod for reciprocating said carriage; means for intermittently rotating the crank; a wrist pin in said crank; means for inserting the wrist pin into the connecting rod; and means for withdrawing the wrist pin from the connecting rod.

101. A winder having, in combination, a structure for supporting bobbins; means for winding threads extending from said bobbins; detector mechanism for the threads; a reciprocatory carriage for conveying bobbins to said structure; a crank and connecting rod for reciprocating said carriage; means for intermittently rotating the crank; a wrist pin in said crank; means for inserting the wrist pin into the connecting rod; means for withdrawing the wrist pin from the connecting rod; and means for locking the connecting rod when the wrist pin is withdrawn.

102. A winder having, in combination, means for winding a plurality of threads; detector mechanism for the threads; a knot-tying mechanism; a crank and connecting rod for reciprocating said mechanism; and detector-controlled means for adjusting the connection between the connecting rod and the crank to alter the length of movement of the knot-tying mechanism.

103. A winder having, in combination, means for winding a plurality of threads; detector mechanism for the threads; a knot-tying mechanism; a crank and connecting rod for reciprocating said mechanism; a plurality of wrist pins set in said crank at different distances from the axis of the crank; and detector-controlled means for selectively inserting wrist pins into said connecting rod.

104. A winder having, in combination, means for winding a plurality of threads; detector mechanism for the threads; a knot-tying mechanism; a crank and connecting rod for reciprocating said mechanism; a plurality of wrist pins set in said crank at different distances from the axis of the crank; a plunger for each wrist pin; means for selecting a plunger; and means for moving the selected plunger against the corresponding wrist pin to insert the latter into the connecting rod.

105. A winder having, in combination, means for winding a plurality of threads; detector mechanism for the threads; a knot-tying mechanism; a crank and connecting rod for reciprocating said knot-tying mechanism; means for intermittently rotating the crank; a wrist pin in said crank; means for inserting the wrist pin in the connecting rod; means for withdrawing the wrist pin from the connecting rod; and means for locking the connecting rod when the wrist pin is withdrawn.

106. A winder having, in combination, means for winding a sheet of threads upon a beam, detectors for detecting exhaustion of the threads, a normally stationary and normally idle knotter, and means controlled by the detectors for moving the knotter into proximity to an exhausted thread and for there actuating the knotter to tie a reserve thread to the exhausted thread.

107. A winder having, in combination, means for winding a series of threads, a normally idle knotter normally stationed at one side of the series of threads, and means for moving the knotter various distances out across the series of threads and then reversing the direction of travel of the knotter, the knotter being actuated to tie a reserve thread to an exhausted thread while at the end of its outward movement.

108. A winder having, in combination, winding means, a creel, a carriage for transporting a bobbin to the creel, a knotter on the carriage, means at the knotter for supporting the thread of the bobbin, and means for moving the carriage into proximity to an exhausted thread, actuating the knotter, and placing the bobbin in the creel.

109. A winder having, in combination, winding means, a creel, a normally stationary carriage for transporting a bobbin to the creel, a normally idle knotter on the carriage, means at the knotter for supporting the thread of the bobbin, and means for moving the carriage into proximity to an exhausted thread and there actuating the knotter and placing the bobbin in the creel.

110. A winder having, in combination, means for driving a warp beam; means for actuating said driving means to rotate the beam at high speed; means to disconnect the driving means from said actuating means upon the occurrence of an exhaust; means for uniting a thread to the exhausted thread; means for actuating the driving means to turn the beam to take up the slack in the thread; and means for connecting the actuating means to said driving means.

111. The combination of a vertical guideway; a column of bobbin boxes in said guideway; a horizontal support near the upper end of the guideway; other bobbin boxes on said support; a reciprocatory carriage for conveying boxes from the support to the guideway; means for transferring boxes from the support to the carriage; and means for transferring boxes from the carriage to the guideway.

112. A winder having, in combination a set of bobbin supports; means for unwinding yarn from bobbins carried by said set of supports; a source of supply of bobbin supports and means for conveying a support from the source of supply to the set of supports.

113. The combination of a column of bobbin boxes; a source of supply of boxes; a carriage for conveying a box from the source of supply to the column; and means on the carriage for placing such box in the column.

114. The combination of a vertical column of bobbin boxes; a source of supply of bobbin boxes; a carriage for conveying a bobbin box from the source of supply to a point above the column; and means on the carriage for pushing a box out of the carriage and onto the top of the column and for depressing the column.

115. A winder having, in combination, a creel; means for unwinding yarn from bobbins contained in said creel; a source of supply of creel elements; a carriage; means for moving a creel element from the source of supply into the carriage; means moving with said carriage for supporting the end of the thread on the bobbin in the creel element carried by the carriage; a knot-tying mechanism arranged to travel with said carriage; means for moving said carriage to convey a creel element to said creel; and means for actuating the knot-tying mechanism to tie said thread to an exhausted thread.

116. The combination of a vertical guideway; a horizontal support; a column of creel elements in said guideway; other creel elements on said support; a carriage for conveying creel elements from the support to the guideway; means for transferring creel elements from the support to the carriage; and means for pushing a creel element out of the carriage and against the upper end of the column.

117. A winder having, in combination, a series of bobbin boxes for rotatably supporting warp bobbins; means forming an endless path for said boxes, said path comprising a plurality of shunts; and means for winding upon a warp beam yarn from boxes contained in said shunts.

118. The combination of means forming a plurality of parallel vertical guideways; a column of creel elements in each guideway; means receiving creel elements from one end of all of said guideways; means to which the creel elements are delivered by said receiving means for transporting the creel elements to a point near the other end of the guideways; and means for conveying creel elements from said point to the columns.

119. The combination of a vertical guideway; a column of creel elements in said guideway; and means for yieldingly supporting the creel elements against the action of gravity.

120. The combination of a vertical guideway; a column of creel elements in said guideway; individual means for yieldingly supporting each creel element against the action of gravity; and means for depressing the column to release the lowermost creel element to the action of gravity.

121. A winder having, in combination, a vertical guideway; thread-guiding means at the upper end of said guideway; a column of creel elements in said guideway; means for holding the top creel element out of contact with the guiding means; and means urging the remainder of the column forward, and serving to yieldingly support the column against the action of gravity.

122. The combination of a plurality of vertical guideways; a horizontal support; a column of creel elements in each guideway; a row of creel elements on said support; a reciprocatory carriage for conveying creel elements from the support to the guideways; and means for adjusting the length of movement of said carriage.

123. The combination of a creel, a traveling creel-replenishing carriage, and means for placing a creel element in said carriage.

124. The combination of a creel, a reciprocatory creel-replenishing carriage; means below the path of movement of the carriage for supporting a creel element; and means for elevating a creel element off said supporting means and into said carriage.

125. A winder having, in combination, a carriage adapted to support a bobbin box; and a member movably connected to the carriage for yieldingly engaging a bobbin to prevent the bobbin from rolling about in the box.

126. The combination of a creel, a reciprocatory creel-replenishing carriage, and means for accurately positioning and locking the carriage in one of its positions.

127. A winder divided into sections, and having, in combination, means for winding a plurality of threads; a knot-tying mechanism; means for moving the knot-tying mechanism to a section; and means for variously positioning the knot-tying mechanism in the section.

128. A winder having, in combination, a plurality of detectors, a knot-tying mechanism; means for positioning the knot-tying mechanism; and a finger moving with the knot-tying mechanism and arranged to strike an abnormally-positioned detector for actuating said positioning means.

129. A winder divided into sections, and having, in combination, a plurality of detectors; a knot-tying mechanism; means for moving the knot-tying mechanism to a section; a stop for each section; means moving with the knot-tying mechanism and adapted to co-act with said stop to position the knot-tying mechanism in the section; and detector-controlled means for adjusting the means that co-acts with said positioning device.

130. A winder divided into sections, and having, in combination, a plurality of detectors; a knot-tying mechanism; means for moving the knot-tying mechanism to a section; positioning means for each section; devices moving with the knot-tying mechanism for co-acting with the positioning means; and means arranged to engage an abnormally-positioned detector for adjusting said devices.

131. A winder divided into sections and having, in combination, a plurality of detectors; a knot-tying mechanism; means for moving the knot-tying mechanism to a section; a stop for each section; a member moving with the knot-tying mechanism and adapted to engage the stop; and detector-controlled means for adjusting said member with relation to the knot-tying mechanism.

132. A winder having, in combination, a plurality of detectors; means for abnormally positioning a detector; a knotter, detector-controlled means for positioning the knotter; and detector-controlled means for guiding the new thread into operative relation to the abnormally positioned detector.

133. A winder having, in combination, a carriage for a creel element; a guide on the carriage for the thread extending from a bobbin contained in a creel element in the carriage; means for inserting a creel element into the carriage; and means for guiding the thread into said guide.

134. A winder having, in combination, a reciprocatory structure; a thread clamp on said structure; mechanism for moving a thread end to one end of the path of movement of said structure; and means for placing the thread end in said clamp.

135. A winder having, in combination, a reciprocatory structure; a thread clamp located on said structure; means for moving a series of creel elements to a point near the initial position of said structure; a mechanism for conveying thread-ends of bobbins contained in said creel elements to a point near the initial position of said thread-clamp; and devices for moving creel elements and thread-ends to said structure and said thread clamp, respectively.

136. The combination of a guide; a row of carriers mounted on said guide; a thread clamp on each carrier; means for moving the row of carriers along the guide; and clamp-operating means mounted for movement parallel with the direction of movement of the row of carriers.

137. The combination of a traveling series of clamp carriers; a thread-clamp on each carrier; means tending to close each clamp; a carriage movable alongside the clamp carriers; a clamp-opening device on said carriage; and means tending to move said carriage in the direction to open the clamps.

138. The combination of a carrier; a thread clamp mounted on the carrier; a carriage having an edge across which a thread extending through the clamp may be laid; and means on the carrier for closing said clamp.

139. The combination of an endless support; a plurality of clamp carriers movably mounted on said support; a thread-clamp on each carrier; an endless driving means for engaging and moving the clamp carriers; said driving means extending lengthwise of and adjacent a portion of said support; and auxiliary means for moving the clamp carriers along the remainder of the support.

140. The combination of a thread-support; means movable to place a thread on said support; a knot-tying mechanism provided with a thread-support; and means for moving the first mentioned support to transfer the thread onto the second mentioned support.

141. A winder having, in combination, a winder replenishing carriage; a knot-tying mechanism carried at one side of said carriage; and slack take-up means traveling with the carriage intermediate the carriage and the knot-tying mechanism.

142. A winder having, in combination, a winder-replenishing carriage; a support attached to said carriage; a knot-tying mechanism on said support; and thread-detector means on said support intermediate the carriage and the knot-tying mechanism.

143. A winder having, in combination, a traveling winder-replenishing structure; means on said structure to receive a creel element; a knot-tying mechanism on said structure; and a thread-support on said structure intermediate the creel-element-receiving means and the knot-tying mechanism.

144. A winder having, in combination, a support for a creel element; a knot-tying mechanism; slack take-up means intermediate the knot-tying mechanism and the support, said means comprising two sets of members between which sets a thread may extend; and means tending to move one of said sets into intermeshing relation with the other set, said moving means being restrained by the tension of the thread.

145. A winder having, in combination, a support for a creel element; a knot-tying mechanism; slack take-up means intermediate the knot-tying mechanism and the support, said means comprising two sets of members between which sets a thread may extend; means tending to move one of said sets into intermeshing relation with the other set, said moving means being restrained by the tension of the thread; and means for casting the thread off from said members.

146. A winder having, in combination, a support for a creel element; a knot-tying mechanism; a thread-detector intermediate the knot-tying mechanism and the support; and means for casting off a thread from said detector.

147. A winder having, in combination, a support for a creel element; a knot-tying mechanism; a circuit-closer; and means for operating said circuit closer to close a circuit, said means being arranged to be withheld from action by a thread extending between the knot-tying mechanism and the carriage.

148. A winder having, in combination, a knot-tying mechanism; means for supporting a reserve thread in operative relation to the knot-tying mechanism; and suction means for moving another thread into operative relation to the knot-tying mechanism.

149. A winder having, in combination, a table having a plurality of thread-guiding grooves therein; a knot-tying mechanism movable transversely of said grooves; means moving with said knot-tying mechanism for supporting a reserve thread; means for lifting a thread from one of said grooves into operative relation to the knot-tying mechanism; and means for actuating said mechanism to unite said threads.

150. A winder having, in combination, means for winding a sheet of threads; a knot-tying mechanism; and suction means for moving an exhausted thread out of the sheet and into proximity to the knot-tying mechanism.

151. A winder having, in combination, means for winding a sheet of threads; two rolls between which said sheet passes, a thread-carrying element arranged to reciprocate across the sheet of threads; and means for causing relative movement between said rolls to form a space for the passage of the thread carried by said element.

152. A winder having, in combination, means for winding a sheet of threads; two rolls between which said sheet passes; a roller over which said sheet passes; a thread-carrying element arranged to reciprocate across the sheet of threads, means for causing relative movement between said rolls to form a space for the passage of the thread carried by said element; and means for moving said roller to take up slack produced in the sheet of threads by the relative movement of said rolls.

153. A winder having, in combination, a reciprocatory uniting carriage; a crank and connecting rod for reciprocating said carriage; and means for varying the connection between the connecting rod and the crank to alter the length of movement of the carriage.

154. A winder having, in combination, detector mechanism for the threads being wound; a reciprocatory uniting carriage; a crank and connecting rod for reciprocating said carriage; a plurality of wrist pins set in said crank at different distances from the axis of the crank; and detector-controlled means for selectively inserting wrist pins into said connecting rod.

155. A winder having, in combination, means for winding a sheet of threads, two rolls between which the sheet passes, means for moving a reserve thread into position adjacent to an exhausted thread of the sheet, and means for separating the rolls to form a space for the passage of the reserve thread.

156. A winder having, in combination, knot-tying mechanism arranged to travel, a member for positioning the knot-tying mechanism, and detector mechanism controlling the operation of said member.

157. A winder having, in combination, a uniting carriage, means for moving the carriage, and means for adjusting the moving means to vary the length of travel of the carriage.

158. A winder having, in combination, a carriage, means for moving the carriage, means for adjusting the moving means to vary the length of travel of the carriage, and detector mechanism controlling the operation of said adjusting means.

159. A winder having, in combination, means for winding a sheet of threads upon a beam, detectors for detecting exhaustion of the threads, a normally idle knotter normally stationed at one side of the sheet of threads, and means controlled by the detectors for moving the knotter into proximity to an exhausted thread and for there actuating the knotter to tie a reserve thread to an exhausted thread.

160. A winder having, in combination, a creel consisting of a guideway and a series of creel-sections in the guideway, a carriage for transporting a creel-section to the guideway, and means for transferring the creel section from the carriage to the guideway.

161. A winder having, in combination, a creel framework, a plurality of individual creel elements in the framework, and means for selectively supplying creel elements to different portions of the framework.

162. A winder having, in combination, a creel, and means for selectively supplying yarn masses to different portions of the creel.

163. A winder having, in combination, means for supporting and driving a warp beam; means for stopping and restarting the beam; means for detecting exhaustion of the threads being wound; and a normally idle knotter for tying a reserve thread to an exhausted thread, said detecting means controlling said stopping and restarting means and the knotter.

164. A winder having, in combination, a normally idle winder-replenishing carriage; a knotter on said carriage; means for actuating the knotter and the carriage; and detector mechanism controlling said actuating means.

165. A winder having, in combination, a carriage, means for locking the carriage in one of its positions, and detector mechanism controlling the operation of said locking means.

166. A winder having, in combination, two thread-guiding rolls, means to carry a thread between the rolls, and means for separating said rolls to form a space for the passage of said thread.

167. A winder having, in combination, means for winding a sheet of threads, two rolls between which said sheet passes, a thread-carrying element arranged to reciprocate across the sheet of threads; means for separating said rolls to form a space for the passage of the thread carried by said element, and detector mechanism controlling said separating means.

168. A winder having, in combination, means for winding a sheet of threads, two rolls between which said sheet passes, a roller over which said sheet passes, a thread-carrying element arranged to reciprocate across the sheet of threads, means for separating said rolls to form a space for the passage of the thread carried by said element, means for moving said roller to take up slack produced in said sheet of threads by the separation of said rolls, and detector mechanism controlling the operation of said separating means and roller-moving means.

169. A winder having, in combination, means for rotating a warp beam, two independent means for actuating said rotating means, and detector mechanism controlling both of said actuating means.

170. A textile machine having, in combination, a column of bobbin boxes stacked one upon another, a structure in which the column is located, and means for pushing another bobbin box against the upper end of the column.

171. A textile machine having, in combination, a column of bobbin boxes stacked one upon another, a structure in which the column is located and yieldingly held against downward movement, and means for pushing another bobbin box against the upper end of the column and thereby depressing the column.

172. A textile machine having, in combination, a column of bobbin boxes stacked one upon another, a structure within which the column is located, a carriage adapted to support a bobbin box, means for moving the carriage to and from a position over the column, and means for discharging the last mentioned box from the carriage into the upper end of the column.

173. A textile machine having, in combination, a column of bobbin boxes stacked one upon another, a structure within which the column is located, a carriage adapted to support a bobbin box, means for moving the carriage to and from a position over the column, and means for pushing the box out of the carriage.

174. A textile machine having, in combination, a column of creel elements stacked one upon another, a structure within which the column is located, a carriage adapted to support a creel element, means for moving the carriage to and from a position over the column, and means on the carriage for pushing the creel element out of the carriage.

175. The combination of a reciprocatory structure having a space to receive a creel element, means for moving a series of creel elements to a point adjacent to the initial position of said structure, and means for moving a creel element from said point to said space.

176. A winder having, in combination, a detector adapted to be supported upon a thread, means for moving the detector out of normal position, and a carriage for laterally moving a thread into position alongside the detector so that upon the return of the detector to normal position, the detector will be supported upon the thread.

177. A winder having, in combination, a plurality of detectors, knot-tying mechanism, and means controlled by an abnormally-positioned detector for positioning the knot-tying mechanism.

178. A winder divided into sections and having, in combination, a knot-tying mechanism, means for moving the knot-tying mechanism to a section, and means controlled by an abnormally-positioned detector for variously positioning the knot-tying mechanism in the section.

179. A winder having, in combination, a reciprocatory support; means for adjusting the extent of movement of the support; a knotter on the support; and means for adjusting the position of the knotter on the support.

180. A winder having, in combination, a knotter, means for effecting a coarse adjustment of the position of the knotter with relation to its work, and additional means for effecting a fine adjustment of the position of the knotter with relation to its work.

181. The combination of a creel consisting of a plurality of sections, a creel-replenishing carriage, and means for adjusting the length of movement of said carriage to correspond with the location of the section to be replenished.

182. The combination of a creel and a reciprocatory creel-replenishing carriage.

183. The combination of a cheel; winding means; mechanism to detect exhaustion of the threads being wound; and a traveling creel-replenishing carriage controlled by said detector mechanism.

184. A winder having, in combination, a drum for rotating a warp beam, means to drive the drum, mechanisms for uniting a reserve thread to an exhausted thread, a device for disconnecting the driving means from the drum, and a single set of detectors arranged to control the uniting mechanisms and the disconnecting device.

185. A winder having, in combination, means for winding a thread, means for tying a new thread to the other thread, means for driving the tying means, and a clutch mechanism arranged automatically to discontinue the operation of the tying means after said threads have been united.

In testimony whereof I affix my signature in presence of two witnesses.

HOWARD D. COLMAN.

Witnesses:
 EARL C. CARLSON,
 GEORGE L. CHINDAHL.

It is hereby certified that in Letters Patent No. 1,239,670, granted September 11, 1917, upon the application of Howard D. Colman, of Rockford, Illinois, for an improvement in "Winders," errors appear in the printed specification requiring correction as follows: Page 22, line 26, for the reference-numeral "540" read *640;* same page, line 80, and page 23, lines 32, 37, and 48, for the word "cariage" read *carriage;* page 28, line 36, claim 62, before the word "plurality" insert the article *a;* page 36, claim 183, for the word "cheel" read *creel;* and that the said Letters Patent should be read with these corrections therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 28—14.